(12) United States Patent
Murphy et al.

(10) Patent No.: US 11,184,446 B2
(45) Date of Patent: Nov. 23, 2021

(54) METHODS AND APPARATUS FOR INCENTIVIZING PARTICIPATION IN FOG NETWORKS

(71) Applicant: Micron Technology, Inc., Boise, ID (US)

(72) Inventors: Richard Cameron Murphy, Boise, ID (US); Fa-Long Luo, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/211,029

(22) Filed: Dec. 5, 2018

(65) Prior Publication Data

US 2020/0186607 A1 Jun. 11, 2020

(51) Int. Cl.
*G06F 15/16* (2006.01)
*H04L 29/08* (2006.01)
(Continued)

(52) U.S. Cl.
CPC .......... *H04L 67/16* (2013.01); *G06F 16/2272* (2019.01); *G06Q 40/12* (2013.12);
(Continued)

(58) Field of Classification Search
CPC ................................ H04L 69/22; G07F 17/32
See application file for complete search history.

(56) References Cited

U.S. PATENT DOCUMENTS 4,380,046 A 4/1983 Frosch et al.
4,435,792 A 3/1984 Bechtolsheim
(Continued)

FOREIGN PATENT DOCUMENTS

CN 102141905 A 8/2011
EP 0214718 A2 3/1987
(Continued)

OTHER PUBLICATIONS

Adibi., et al., "Processing-in-Memory Technology for Knowledge Discovery Algorithms," Proceeding of the Second International Workshop on Data Management on New Hardware, Jun. 25, 2006, 10 pages, Retrieved from the internet [URL: http://www.cs.cmu.edu/~damon2006/pdf/adibi06inmemory.pdf].
(Continued)

*Primary Examiner* — Yves Dalencourt
(74) *Attorney, Agent, or Firm* — Gazdzinski & Associates, PC

(57) ABSTRACT

Methods and apparatus for incentivizing device participation within a distributed network. In one exemplary embodiment, devices of a fog network may provide for example, computational, storage, and/or network resources in exchange for fungible tokens. In one such variant, the user contributions are recorded in a blockchain data structure, thereby enabling users to be compensated for their contributions of resources to the network at a later time. Unlike traditional networking techniques which often rely on centralized networks directing and/or commandeering user equipment for network bandwidth, the various aspects of the present disclosure are directed to ensuring that crediting and debiting of participation can be performed at the edge of the network (within the fog) without requiring authentication or trust exchanges. More directly, various aspects of the present disclosure are directed to verification and/or validation of work performed by peer devices.

21 Claims, 20 Drawing Sheets

(51) Int. Cl.
  *H04W 4/24* (2018.01)
  *G06F 16/22* (2019.01)
  *H04L 9/06* (2006.01)
  *G06Q 40/00* (2012.01)
  *H04L 12/14* (2006.01)
  *H04L 12/24* (2006.01)
  *H04W 84/18* (2009.01)

(52) U.S. Cl.
  CPC ........ *H04L 9/0637* (2013.01); *H04L 12/1428* (2013.01); *H04L 67/1097* (2013.01); *H04L 67/22* (2013.01); *H04W 4/24* (2013.01); *H04L 41/5096* (2013.01); *H04W 84/18* (2013.01)

(56) References Cited

U.S. PATENT DOCUMENTS

| | | |
|---|---|---|
| 4,435,793 A | 3/1984 | Ochii |
| 4,727,474 A | 2/1988 | Batcher |
| 4,843,264 A | 6/1989 | Galbraith |
| 4,958,378 A | 9/1990 | Bell |
| 4,977,542 A | 12/1990 | Matsuda et al. |
| 5,023,838 A | 6/1991 | Herbert |
| 5,034,636 A | 7/1991 | Reis et al. |
| 5,201,039 A | 4/1993 | Sakamura |
| 5,210,850 A | 5/1993 | Kelly et al. |
| 5,253,308 A | 10/1993 | Johnson |
| 5,276,643 A | 1/1994 | Hoffmann et al. |
| 5,325,519 A | 6/1994 | Long et al. |
| 5,367,488 A | 11/1994 | An |
| 5,379,257 A | 1/1995 | Matsumura et al. |
| 5,386,379 A | 1/1995 | Ali-Yahia et al. |
| 5,398,213 A | 3/1995 | Yeon et al. |
| 5,440,482 A | 8/1995 | Davis |
| 5,446,690 A | 8/1995 | Tanaka et al. |
| 5,473,576 A | 12/1995 | Matsui |
| 5,481,500 A | 1/1996 | Reohr et al. |
| 5,485,373 A | 1/1996 | Davis et al. |
| 5,506,811 A | 4/1996 | McLaury |
| 5,615,404 A | 3/1997 | Knoll et al. |
| 5,638,128 A | 6/1997 | Hoogenboom et al. |
| 5,638,317 A | 6/1997 | Tran |
| 5,654,936 A | 8/1997 | Cho |
| 5,678,021 A | 10/1997 | Pawate et al. |
| 5,724,291 A | 3/1998 | Matano |
| 5,724,366 A | 3/1998 | Furutani |
| 5,751,987 A | 5/1998 | Mahant-Shetti et al. |
| 5,787,458 A | 7/1998 | Miwa |
| 5,854,636 A | 12/1998 | Watanabe et al. |
| 5,867,429 A | 2/1999 | Chen et al. |
| 5,870,504 A | 2/1999 | Nemoto et al. |
| 5,915,084 A | 6/1999 | Wendell |
| 5,935,263 A | 8/1999 | Keeth et al. |
| 5,986,942 A | 11/1999 | Sugibayashi |
| 5,991,209 A | 11/1999 | Chow |
| 5,991,785 A | 11/1999 | Alidina et al. |
| 6,005,799 A | 12/1999 | Rao |
| 6,009,020 A | 12/1999 | Nagata |
| 6,038,339 A | 3/2000 | Hubel et al. |
| 6,092,186 A | 7/2000 | Betker et al. |
| 6,122,211 A | 9/2000 | Morgan et al. |
| 6,125,071 A | 9/2000 | Kohno et al. |
| 6,134,164 A | 10/2000 | Lattimore et al. |
| 6,147,514 A | 11/2000 | Shiratake |
| 6,151,244 A | 11/2000 | Fujino et al. |
| 6,157,578 A | 12/2000 | Brady |
| 6,163,862 A | 12/2000 | Adams et al. |
| 6,166,942 A | 12/2000 | Vo et al. |
| 6,172,918 B1 | 1/2001 | Hidaka |
| 6,175,514 B1 | 1/2001 | Henderson et al. |
| 6,181,698 B1 | 1/2001 | Hariguchi |
| 6,208,544 B1 | 3/2001 | Beadle et al. |
| 6,226,215 B1 | 5/2001 | Yoon |
| 6,301,153 B1 | 10/2001 | Takeuchi et al. |
| 6,301,164 B1 | 10/2001 | Manning et al. |
| 6,304,477 B1 | 10/2001 | Naji |
| 6,389,507 B1 | 5/2002 | Sherman |
| 6,418,498 B1 | 7/2002 | Martwick |
| 6,466,499 B1 | 10/2002 | Blodgett |
| 6,510,098 B1 | 1/2003 | Taylor |
| 6,563,754 B1 | 5/2003 | Lien et al. |
| 6,578,058 B1 | 6/2003 | Nygaard, Jr. |
| 6,731,542 B1 | 5/2004 | Le et al. |
| 6,754,746 B1 | 6/2004 | Leung et al. |
| 6,768,679 B1 | 7/2004 | Le et al. |
| 6,807,614 B2 | 10/2004 | Chung |
| 6,816,422 B2 | 11/2004 | Hamade et al. |
| 6,819,612 B1 | 11/2004 | Achter |
| 6,894,549 B2 | 5/2005 | Eliason |
| 6,943,579 B1 | 9/2005 | Hazanchuk et al. |
| 6,948,056 B1 | 9/2005 | Roth et al. |
| 6,950,771 B1 | 9/2005 | Fan et al. |
| 6,950,898 B2 | 9/2005 | Merritt et al. |
| 6,956,770 B2 | 10/2005 | Khalid et al. |
| 6,961,272 B2 | 11/2005 | Schreck |
| 6,965,648 B1 | 11/2005 | Smith et al. |
| 6,985,394 B2 | 1/2006 | Kim |
| 6,987,693 B2 | 1/2006 | Cernea et al. |
| 7,020,017 B2 | 3/2006 | Chen et al. |
| 7,028,170 B2 | 4/2006 | Saulsbury |
| 7,045,834 B2 | 5/2006 | Tran et al. |
| 7,054,178 B1 | 5/2006 | Shiah et al. |
| 7,061,817 B2 | 6/2006 | Raad et al. |
| 7,079,407 B1 | 7/2006 | Dimitrelis |
| 7,173,857 B2 | 2/2007 | Kato et al. |
| 7,187,585 B2 | 3/2007 | Li et al. |
| 7,196,928 B2 | 3/2007 | Chen |
| 7,260,565 B2 | 8/2007 | Lee et al. |
| 7,260,672 B2 | 8/2007 | Garney |
| 7,372,715 B2 | 5/2008 | Han |
| 7,400,532 B2 | 7/2008 | Aritome |
| 7,406,494 B2 | 7/2008 | Magee |
| 7,447,720 B2 | 11/2008 | Beaumont |
| 7,454,451 B2 | 11/2008 | Beaumont |
| 7,457,181 B2 | 11/2008 | Lee et al. |
| 7,480,792 B2 | 1/2009 | Janzen et al. |
| 7,529,888 B2 | 5/2009 | Chen et al. |
| 7,535,769 B2 | 5/2009 | Cernea |
| 7,546,438 B2 | 6/2009 | Chung |
| 7,562,198 B2 | 7/2009 | Noda et al. |
| 7,574,466 B2 | 8/2009 | Beaumont |
| 7,602,647 B2 | 10/2009 | Li et al. |
| 7,663,928 B2 | 2/2010 | Tsai et al. |
| 7,685,365 B2 | 3/2010 | Rajwar et al. |
| 7,692,466 B2 | 4/2010 | Ahmadi |
| 7,752,417 B2 | 7/2010 | Manczak et al. |
| 7,791,962 B2 | 9/2010 | Noda et al. |
| 7,796,453 B2 | 9/2010 | Riho et al. |
| 7,805,587 B1 | 9/2010 | Van Dyke et al. |
| 7,808,854 B2 | 10/2010 | Takase |
| 7,827,372 B2 | 11/2010 | Bink et al. |
| 7,869,273 B2 | 1/2011 | Lee et al. |
| 7,898,864 B2 | 3/2011 | Dong |
| 7,924,628 B2 | 4/2011 | Danon et al. |
| 7,937,535 B2 | 5/2011 | Ozer et al. |
| 7,957,206 B2 | 6/2011 | Bauser |
| 7,979,667 B2 | 7/2011 | Allen et al. |
| 7,996,749 B2 | 8/2011 | Ding et al. |
| 8,042,082 B2 | 10/2011 | Solomon |
| 8,045,391 B2 | 10/2011 | Mokhlesi |
| 8,059,438 B2 | 11/2011 | Chang et al. |
| 8,095,825 B2 | 1/2012 | Hirotsu et al. |
| 8,117,462 B2 | 2/2012 | Snapp et al. |
| 8,164,942 B2 | 4/2012 | Gebara et al. |
| 8,208,328 B2 | 6/2012 | Hong |
| 8,213,248 B2 | 7/2012 | Moon et al. |
| 8,223,568 B2 | 7/2012 | Seo |
| 8,238,173 B2 | 8/2012 | Akerib et al. |
| 8,274,841 B2 | 9/2012 | Shimano et al. |
| 8,279,683 B2 | 10/2012 | Klein |
| 8,310,884 B2 | 11/2012 | Iwai et al. |
| 8,332,367 B2 | 12/2012 | Bhattacherjee et al. |
| 8,339,824 B2 | 12/2012 | Cooke |
| 8,339,883 B2 | 12/2012 | Yu et al. |

(56) References Cited

U.S. PATENT DOCUMENTS

| | | |
|---|---|---|
| 8,347,154 B2 | 1/2013 | Bahali et al. |
| 8,351,292 B2 | 1/2013 | Matano |
| 8,356,144 B2 | 1/2013 | Hessel et al. |
| 8,417,921 B2 | 4/2013 | Gonion et al. |
| 8,462,532 B1 | 6/2013 | Argyres |
| 8,484,276 B2 | 7/2013 | Carlson et al. |
| 8,495,438 B2 | 7/2013 | Roine |
| 8,503,250 B2 | 8/2013 | Demone |
| 8,526,239 B2 | 9/2013 | Kim |
| 8,533,245 B1 | 9/2013 | Cheung |
| 8,555,037 B2 | 10/2013 | Gonion |
| 8,588,803 B2 | 11/2013 | Hakola et al. |
| 8,599,613 B2 | 12/2013 | Abiko et al. |
| 8,605,015 B2 | 12/2013 | Guttag et al. |
| 8,625,376 B2 | 1/2014 | Jung et al. |
| 8,644,101 B2 | 2/2014 | Jun et al. |
| 8,650,232 B2 | 2/2014 | Stortz et al. |
| 8,717,462 B1 | 5/2014 | Linzer |
| 8,817,129 B1 | 8/2014 | Linzer et al. |
| 8,873,272 B2 | 10/2014 | Lee |
| 8,964,496 B2 | 2/2015 | Manning |
| 8,971,124 B1 | 3/2015 | Manning |
| 9,015,390 B2 | 4/2015 | Klein |
| 9,047,193 B2 | 6/2015 | Lin et al. |
| 9,165,023 B2 | 10/2015 | Moskovich et al. |
| 9,343,155 B1 | 5/2016 | De Santis et al. |
| 9,430,735 B1 | 8/2016 | Vali et al. |
| 9,436,402 B1 | 9/2016 | De Santis et al. |
| 9,659,605 B1 | 5/2017 | Zawodny et al. |
| 9,659,610 B1 | 5/2017 | Hush |
| 9,697,876 B1 | 7/2017 | Tiwari et al. |
| 9,761,300 B1 | 9/2017 | Willcock |
| 10,340,947 B2 | 7/2019 | Oh et al. |
| 10,430,493 B1 | 10/2019 | Kendall |
| 10,440,341 B1 | 10/2019 | Luo et al. |
| 10,558,518 B2 | 2/2020 | Nair et al. |
| 10,621,267 B2 | 4/2020 | Strachan et al. |
| 10,719,296 B2 | 7/2020 | Lee et al. |
| 10,878,317 B2 | 12/2020 | Hatcher et al. |
| 10,896,715 B2 | 1/2021 | Golov |
| 2001/0007112 A1 | 7/2001 | Porterfield |
| 2001/0008492 A1 | 7/2001 | Higashiho |
| 2001/0010057 A1 | 7/2001 | Yamada |
| 2001/0028584 A1 | 10/2001 | Nakayama et al. |
| 2001/0043089 A1 | 11/2001 | Forbes et al. |
| 2002/0059355 A1 | 5/2002 | Peleg et al. |
| 2003/0167426 A1 | 9/2003 | Slobodnik |
| 2003/0216964 A1 | 11/2003 | MacLean et al. |
| 2003/0222879 A1 | 12/2003 | Lin et al. |
| 2003/0231260 A1 | 12/2003 | Pate et al. |
| 2004/0003337 A1 | 1/2004 | Cypher |
| 2004/0073592 A1 | 4/2004 | Kim et al. |
| 2004/0073773 A1 | 4/2004 | Demjanenko |
| 2004/0085840 A1 | 5/2004 | Vali et al. |
| 2004/0095826 A1 | 5/2004 | Perner |
| 2004/0154002 A1 | 8/2004 | Ball et al. |
| 2004/0205289 A1 | 10/2004 | Srinivasan |
| 2004/0240251 A1 | 12/2004 | Nozawa et al. |
| 2005/0015557 A1 | 1/2005 | Wang et al. |
| 2005/0078514 A1 | 4/2005 | Scheuerlein et al. |
| 2005/0097417 A1 | 5/2005 | Agrawal et al. |
| 2005/0146733 A1 | 7/2005 | Lohweg et al. |
| 2005/0160311 A1 | 7/2005 | Hartwell et al. |
| 2005/0286282 A1 | 12/2005 | Ogura |
| 2006/0047937 A1 | 3/2006 | Selvaggi et al. |
| 2006/0069849 A1 | 3/2006 | Rudelic |
| 2006/0146623 A1 | 7/2006 | Mizuno et al. |
| 2006/0149804 A1 | 7/2006 | Luick et al. |
| 2006/0181917 A1 | 8/2006 | Kang et al. |
| 2006/0215432 A1 | 9/2006 | Wickeraad et al. |
| 2006/0225072 A1 | 10/2006 | Lari et al. |
| 2006/0291282 A1 | 12/2006 | Liu et al. |
| 2007/0103986 A1 | 5/2007 | Chen |
| 2007/0171747 A1 | 7/2007 | Hunter et al. |
| 2007/0180006 A1 | 8/2007 | Gyoten et al. |
| 2007/0180184 A1 | 8/2007 | Sakashita et al. |
| 2007/0195602 A1 | 8/2007 | Fong et al. |
| 2007/0261043 A1 | 11/2007 | Ho et al. |
| 2007/0285131 A1 | 12/2007 | Sohn |
| 2007/0285979 A1 | 12/2007 | Turner |
| 2007/0291532 A1 | 12/2007 | Tsuji |
| 2008/0019209 A1 | 1/2008 | Lin |
| 2008/0025073 A1 | 1/2008 | Arsovski |
| 2008/0037333 A1 | 2/2008 | Kim et al. |
| 2008/0052711 A1 | 2/2008 | Forin et al. |
| 2008/0071939 A1 | 3/2008 | Tanaka et al. |
| 2008/0137388 A1 | 6/2008 | Krishnan et al. |
| 2008/0165601 A1 | 7/2008 | Matick et al. |
| 2008/0178053 A1 | 7/2008 | Gorman et al. |
| 2008/0215937 A1 | 9/2008 | Dreibelbis et al. |
| 2008/0234047 A1* | 9/2008 | Nguyen ............... G07F 17/32 463/42 |
| 2008/0235560 A1 | 9/2008 | Colmer et al. |
| 2009/0006900 A1 | 1/2009 | Lastras-Montano et al. |
| 2009/0067218 A1 | 3/2009 | Graber |
| 2009/0129586 A1 | 5/2009 | Miyazaki et al. |
| 2009/0154238 A1 | 6/2009 | Lee |
| 2009/0154273 A1 | 6/2009 | Borot et al. |
| 2009/0254697 A1 | 10/2009 | Akerib et al. |
| 2010/0067296 A1 | 3/2010 | Li |
| 2010/0091582 A1 | 4/2010 | Vali |
| 2010/0157079 A1 | 6/2010 | Atanassov et al. |
| 2010/0172190 A1 | 7/2010 | Lavi et al. |
| 2010/0210076 A1 | 8/2010 | Gruber et al. |
| 2010/0226183 A1 | 9/2010 | Kim |
| 2010/0308858 A1 | 12/2010 | Noda et al. |
| 2010/0332895 A1 | 12/2010 | Billing et al. |
| 2011/0051523 A1 | 3/2011 | Manabe et al. |
| 2011/0063919 A1 | 3/2011 | Chandrasekhar et al. |
| 2011/0093662 A1 | 4/2011 | Walker et al. |
| 2011/0099216 A1 | 4/2011 | Sun et al. |
| 2011/0103151 A1 | 5/2011 | Kim et al. |
| 2011/0119467 A1 | 5/2011 | Cadambi et al. |
| 2011/0122695 A1 | 5/2011 | Li et al. |
| 2011/0140741 A1 | 6/2011 | Zerbe et al. |
| 2011/0219260 A1 | 9/2011 | Nobunaga et al. |
| 2011/0267883 A1 | 11/2011 | Lee et al. |
| 2011/0317496 A1 | 12/2011 | Bunce et al. |
| 2012/0005397 A1 | 1/2012 | Lim et al. |
| 2012/0017039 A1 | 1/2012 | Margetts |
| 2012/0023281 A1 | 1/2012 | Kawasaki et al. |
| 2012/0120705 A1 | 5/2012 | Mitsubori et al. |
| 2012/0134216 A1 | 5/2012 | Singh |
| 2012/0134225 A1 | 5/2012 | Chow |
| 2012/0134226 A1 | 5/2012 | Chow |
| 2012/0140540 A1 | 6/2012 | Agam et al. |
| 2012/0148044 A1 | 6/2012 | Fang et al. |
| 2012/0182798 A1 | 7/2012 | Hosono et al. |
| 2012/0198310 A1 | 8/2012 | Tran et al. |
| 2012/0239991 A1 | 9/2012 | Melik-Martirosian |
| 2012/0246380 A1 | 9/2012 | Akerib et al. |
| 2012/0265964 A1 | 10/2012 | Murata et al. |
| 2012/0281486 A1 | 11/2012 | Rao et al. |
| 2012/0303627 A1 | 11/2012 | Keeton et al. |
| 2013/0003467 A1 | 1/2013 | Klein |
| 2013/0061006 A1 | 3/2013 | Hein |
| 2013/0107623 A1 | 5/2013 | Kavalipurapu et al. |
| 2013/0117541 A1 | 5/2013 | Choquette et al. |
| 2013/0124783 A1 | 5/2013 | Yoon et al. |
| 2013/0132702 A1 | 5/2013 | Patel et al. |
| 2013/0138646 A1 | 5/2013 | Sirer et al. |
| 2013/0163362 A1 | 6/2013 | Kim |
| 2013/0173888 A1 | 7/2013 | Hansen et al. |
| 2013/0205114 A1 | 8/2013 | Badam et al. |
| 2013/0219112 A1 | 8/2013 | Okin et al. |
| 2013/0227361 A1 | 8/2013 | Bowers et al. |
| 2013/0283122 A1 | 10/2013 | Anholt et al. |
| 2013/0286705 A1 | 10/2013 | Grover et al. |
| 2013/0326154 A1 | 12/2013 | Haswell |
| 2013/0332707 A1 | 12/2013 | Gueron et al. |
| 2013/0332799 A1 | 12/2013 | Cho et al. |
| 2014/0089725 A1 | 3/2014 | Ackaret et al. |
| 2014/0101519 A1 | 4/2014 | Lee et al. |
| 2014/0143630 A1 | 5/2014 | Mu et al. |

(56) References Cited

U.S. PATENT DOCUMENTS

| | | |
|---|---|---|
| 2014/0185395 A1 | 7/2014 | Seo |
| 2014/0215185 A1 | 7/2014 | Danielsen |
| 2014/0219003 A1 | 8/2014 | Ebsen et al. |
| 2014/0245105 A1 | 8/2014 | Chung et al. |
| 2014/0250279 A1 | 9/2014 | Manning |
| 2014/0258646 A1 | 9/2014 | Goss et al. |
| 2014/0344934 A1 | 11/2014 | Jorgensen |
| 2015/0016191 A1 | 1/2015 | Tsai et al. |
| 2015/0063052 A1 | 3/2015 | Manning |
| 2015/0078108 A1 | 3/2015 | Cowles et al. |
| 2015/0120987 A1 | 4/2015 | Wheeler |
| 2015/0134713 A1 | 5/2015 | Wheeler |
| 2015/0270015 A1 | 9/2015 | Murphy et al. |
| 2015/0279466 A1 | 10/2015 | Manning |
| 2015/0288710 A1 | 10/2015 | Zeitlin et al. |
| 2015/0324290 A1 | 11/2015 | Leidel et al. |
| 2015/0325272 A1 | 11/2015 | Murphy |
| 2015/0356009 A1 | 12/2015 | Wheeler et al. |
| 2015/0356022 A1 | 12/2015 | Leidel et al. |
| 2015/0357007 A1 | 12/2015 | Manning et al. |
| 2015/0357008 A1 | 12/2015 | Manning et al. |
| 2015/0357019 A1 | 12/2015 | Wheeler et al. |
| 2015/0357020 A1 | 12/2015 | Manning |
| 2015/0357021 A1 | 12/2015 | Hush |
| 2015/0357022 A1 | 12/2015 | Hush |
| 2015/0357023 A1 | 12/2015 | Hush |
| 2015/0357024 A1 | 12/2015 | Hush et al. |
| 2015/0357047 A1 | 12/2015 | Tiwari |
| 2016/0062672 A1 | 3/2016 | Wheeler |
| 2016/0062673 A1 | 3/2016 | Tiwari |
| 2016/0062692 A1 | 3/2016 | Finkbeiner et al. |
| 2016/0062733 A1 | 3/2016 | Tiwari |
| 2016/0063284 A1 | 3/2016 | Tiwari |
| 2016/0064045 A1 | 3/2016 | La Fratta |
| 2016/0064047 A1 | 3/2016 | Tiwari |
| 2016/0098208 A1 | 4/2016 | Willcock |
| 2016/0098209 A1 | 4/2016 | Leidel et al. |
| 2016/0110135 A1 | 4/2016 | Wheeler et al. |
| 2016/0118137 A1 | 4/2016 | Zhang |
| 2016/0125919 A1 | 5/2016 | Hush |
| 2016/0154596 A1 | 6/2016 | Willcock et al. |
| 2016/0155482 A1 | 6/2016 | La Fratta |
| 2016/0188250 A1 | 6/2016 | Wheeler |
| 2016/0196142 A1 | 7/2016 | Wheeler et al. |
| 2016/0196856 A1 | 7/2016 | Tiwari et al. |
| 2016/0225422 A1 | 8/2016 | Tiwari et al. |
| 2016/0231935 A1 | 8/2016 | Chu |
| 2016/0255502 A1 | 9/2016 | Rajadurai et al. |
| 2016/0266873 A1 | 9/2016 | Tiwari et al. |
| 2016/0266899 A1 | 9/2016 | Tiwari |
| 2016/0267951 A1 | 9/2016 | Tiwari |
| 2016/0275658 A1 | 9/2016 | Klein et al. |
| 2016/0292080 A1 | 10/2016 | Leidel et al. |
| 2016/0306584 A1 | 10/2016 | Zawodny et al. |
| 2016/0306614 A1 | 10/2016 | Leidel |
| 2016/0350230 A1 | 12/2016 | Murphy |
| 2016/0365129 A1 | 12/2016 | Willcock |
| 2016/0371033 A1 | 12/2016 | La Fratta et al. |
| 2016/0375360 A1 | 12/2016 | Poisner et al. |
| 2017/0026185 A1 | 1/2017 | Moses |
| 2017/0052906 A1 | 2/2017 | Lea |
| 2017/0178701 A1 | 6/2017 | Willcock et al. |
| 2017/0188030 A1 | 6/2017 | Sakurai et al. |
| 2017/0192691 A1 | 7/2017 | Zhang et al. |
| 2017/0192844 A1 | 7/2017 | Lea et al. |
| 2017/0192936 A1 | 7/2017 | Guo et al. |
| 2017/0213597 A1 | 7/2017 | Micheloni |
| 2017/0220526 A1 | 8/2017 | Buchanan |
| 2017/0228192 A1 | 8/2017 | Willcock et al. |
| 2017/0235515 A1 | 8/2017 | Lea et al. |
| 2017/0236564 A1 | 8/2017 | Zawodny et al. |
| 2017/0242902 A1 | 8/2017 | Crawford, Jr. et al. |
| 2017/0243623 A1 | 8/2017 | Kirsch et al. |
| 2017/0262369 A1 | 9/2017 | Murphy |
| 2017/0263306 A1 | 9/2017 | Murphy |
| 2017/0269865 A1 | 9/2017 | Willcock et al. |
| 2017/0269903 A1 | 9/2017 | Tiwari |
| 2017/0277433 A1 | 9/2017 | Willcock |
| 2017/0277440 A1 | 9/2017 | Willcock |
| 2017/0277581 A1 | 9/2017 | Lea et al. |
| 2017/0277637 A1 | 9/2017 | Willcock et al. |
| 2017/0278559 A1 | 9/2017 | Hush |
| 2017/0278584 A1 | 9/2017 | Rosti |
| 2017/0285988 A1 | 10/2017 | Dobelstein et al. |
| 2017/0293434 A1 | 10/2017 | Tiwari |
| 2017/0293912 A1 | 10/2017 | Furche et al. |
| 2017/0301379 A1 | 10/2017 | Hush |
| 2017/0309314 A1 | 10/2017 | Zawodny et al. |
| 2017/0329577 A1 | 11/2017 | Tiwari |
| 2017/0336989 A1 | 11/2017 | Zawodny et al. |
| 2017/0337126 A1 | 11/2017 | Zawodny et al. |
| 2017/0337953 A1 | 11/2017 | Zawodny et al. |
| 2017/0352391 A1 | 12/2017 | Hush |
| 2017/0371539 A1 | 12/2017 | Mai et al. |
| 2018/0012636 A1 | 1/2018 | Alzheimer et al. |
| 2018/0024769 A1 | 1/2018 | Howe et al. |
| 2018/0024926 A1 | 1/2018 | Penney et al. |
| 2018/0025759 A1 | 1/2018 | Penney et al. |
| 2018/0025768 A1 | 1/2018 | Hush |
| 2018/0032458 A1 | 2/2018 | Bell |
| 2018/0033478 A1 | 2/2018 | Tanaka et al. |
| 2018/0039484 A1 | 2/2018 | La Fratta et al. |
| 2018/0046405 A1 | 2/2018 | Hush et al. |
| 2018/0046461 A1 | 2/2018 | Tiwari |
| 2018/0060069 A1 | 3/2018 | Rosti et al. |
| 2018/0074754 A1 | 3/2018 | Crawford, Jr. |
| 2018/0075899 A1 | 3/2018 | Hush |
| 2018/0075926 A1 | 3/2018 | Sagiv et al. |
| 2018/0088850 A1 | 3/2018 | Willcock |
| 2018/0102147 A1 | 4/2018 | Willcock et al. |
| 2018/0108397 A1 | 4/2018 | Venkata et al. |
| 2018/0129558 A1 | 5/2018 | Das |
| 2018/0130515 A1 | 5/2018 | Zawodny |
| 2018/0136871 A1 | 5/2018 | Leidel |
| 2018/0242190 A1 | 8/2018 | Khoryaev et al. |
| 2018/0301189 A1 | 10/2018 | Hu et al. |
| 2018/0336552 A1 | 11/2018 | Bohli et al. |
| 2018/0350433 A1 | 12/2018 | Hu et al. |
| 2019/0036772 A1 | 1/2019 | Agerstam et al. |
| 2019/0066780 A1 | 2/2019 | Hu et al. |
| 2019/0080108 A1 | 3/2019 | Gomez Claros et al. |
| 2019/0179869 A1 | 6/2019 | Park et al. |
| 2019/0205741 A1 | 7/2019 | Gupta et al. |
| 2019/0246418 A1* | 8/2019 | Loehr ................. H04W 76/14 |
| 2019/0333056 A1 | 10/2019 | Wilkinson et al. |
| 2019/0349426 A1* | 11/2019 | Smith ................. H04L 69/22 |
| 2019/0354421 A1 | 11/2019 | Brandt et al. |
| 2019/0391829 A1 | 12/2019 | Cronie et al. |
| 2020/0004583 A1 | 1/2020 | Kelly et al. |
| 2020/0012563 A1 | 1/2020 | Yang |
| 2020/0020393 A1 | 1/2020 | Al-Shamma |
| 2020/0027061 A1* | 1/2020 | Kurian ................. H04L 63/083 |
| 2020/0051628 A1 | 2/2020 | Joo et al. |
| 2020/0065650 A1 | 2/2020 | Tran et al. |
| 2020/0143470 A1 | 5/2020 | Pohl et al. |
| 2020/0193280 A1 | 6/2020 | Torng et al. |
| 2020/0201697 A1 | 6/2020 | Torng et al. |
| 2020/0210516 A1 | 7/2020 | Espig et al. |
| 2020/0213091 A1 | 7/2020 | Mai |
| 2020/0226233 A1 | 7/2020 | Penugonda et al. |
| 2020/0279012 A1 | 9/2020 | Khaddam-Aljameh et al. |
| 2021/0149984 A1 | 5/2021 | Luo |

FOREIGN PATENT DOCUMENTS

| | | |
|---|---|---|
| EP | 2026209 A2 | 2/2009 |
| JP | H0831168 A | 2/1996 |
| JP | 2009259193 A | 11/2009 |
| KR | 100211482 B1 | 8/1999 |
| KR | 20100134235 A | 12/2010 |
| KR | 20130049421 A | 5/2013 |
| WO | WO-0165359 A2 | 9/2001 |
| WO | WO-2010079451 A1 | 7/2010 |
| WO | WO-2013062596 A1 | 5/2013 |

(56) References Cited

FOREIGN PATENT DOCUMENTS

| WO | WO-2013081588 A1 | 6/2013 |
|----|------------------|--------|
| WO | WO-2013095592 A1 | 6/2013 |
| WO | WO-2017137888 A1 | 8/2017 |
| WO | WO-2017220115 A1 | 12/2017 |

OTHER PUBLICATIONS

Boyd et al., "On the General Applicability of Instruction-Set Randomization", IEEE Transactions on Dependable and Secure Computing, Jul.-Sep. 2010, vol. 7 (3), 14 pages.

Debnath B., "Bloomflash: Bloom Filter on Flash-Based Storage," 31st Annual Conference on Distributed Computing Systems, Jun. 20-24, 2011, 10 pages.

Derby., et al., "A High-Performance Embedded DSP Core with Novel SIMD Features", IEEE International Conference on Accoustics, Speech, and Signal Processing, Apr. 6-10, 2003, vol. 2, pp. 301-304.

Draper., et al., "The Architecture of the DIVA Processing-in-Memory Chip," International Conference on Supercomputing, Jun. 22-26, 2002, 12 pages, Retrieved from the internet [URL: http://www.isi.edu/~draper/papers/ics02.pdf].

Dybdahl et al., "Destructive-Read in Embedded DRAM, Impact on Power Consumption," Journal of Embedded Computing-Issues in Embedded Single-chip Multicore Architectures, Apr. 2006, vol. 2 (2), 10 pages.

Elliot., et al., "Computational RAM: Implementing Processors in Memory", IEEE Design and Test of Computers Magazine, Jan.-Mar. 1999, vol. 16 (1), 10 pages.

Kogge., et al., "Processing in Memory: Chips to Petaflops," May 23, 1997, 8 pages, Retrieved from the internet [URL: http://www.cs_uctedu/courses/cda5106/summer02/papers/kogge97PIM.pdf].

Message Passing Interface Forum 1.1 "4.9.3 MINLOC and MAXLOC", Jun. 12, 1995, 5 pages, Retrieved from the internet [URL: http://www.mpi-forum.org/docs/mpi-1.1/mpi-11-html/node79.html].

Pagiamtzis., et al., "Content-Addressable Memory (CAM) Circuits and Architectures: A Tutorial and Survey", IEEE Journal of Solid-State Circuits, Mar. 2006, vol. 41 (3), 16 pages.

Pagiamtzis K., "Content-Addressable Memory Introduction", Jun. 25, 2007, 6 pages, Retrieved from the internet [URL: http://www.pagiamtzis.com/cam/camintro].

Stojmenovic., "Multiplicative Circulant Networks Topological Properties and Communication Algorithms", Discrete Applied Mathematics 1997, vol. 77, pp. 281-305.

"Wi-Fi Peer-to-Peer (P2P) Specification".

Cai R., et al., "Memristor-Based Discrete Fourier Transform for Improving Performance and Energy Efficiency," 2016 IEEE Computer Society Annual Symposium on VLSI, 2016, pp. 643-648.

Cardarilli G.C., et al., "Design of a fault tolerant solid state mass memory," IEEE Transactions on Reliability, Dec. 2003, vol. 52(4), pp. 476-491.

Chi P., et al., "PRIME: A Novel Processing-in-memory Architecture for Neural Network Computation in ReRAM-based Main Memory," 2016 ACM/IEEE 43rd Annual International Symposium on Computer Architecture, 2016, pp. 27-39.

Hongxia L., et al., "High Performance Algorithm for Twiddle Factor of Variable-size FFT Processor and Its Implementation," 2012 International Conference on Industrial Control and Electronics Engineering, 2012, pp. 1078-1081.

Mittal S., "A Survey of ReRAM-Based Architectures for Processing-In-Memory and Neural Networks," Machine Learning & Knowledge Extraction, 2018, vol. 1, pp. 75-114.

\* cited by examiner

METHODS AND APPARATUS FOR INCENTIVIZING PARTICIPATION IN FOG NETWORKS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The following relates generally to the field of data networks and wireless devices, and specifically in one exemplary aspect to a network architecture in which user devices self-organize and/or participate in decentralized wireless networks without the benefits of centralized network management.

2. Description of Related Technology

Wireless radio networks have provided the underlying means of connection for radio-based communication networks to user devices and have become a necessary part of computing in commercial and everyday uses. For example, cellular networks provide ubiquitous connectivity throughout all of the United States, and most of the world. Historically, user devices were significantly constrained in computational power, memory, and/or power, thus network management was performed centrally at e.g., a core network, or access point. However, the continued advance of technology has introduced powerful new components and techniques, some of which may be leveraged within user devices.

For example, modern user devices (e.g., smartphone, tablet, phablet, laptop, smartwatch, or other wireless-enabled devices, mobile or otherwise) generally support multiple radio interfaces that enable the user devices to connect to one another, or to networks (e.g., the Internet, intranets, or extranets). In particular, user devices can wirelessly access a variety of different wireless networks (e.g., cellular, wireless area networks (WAN), metropolitan area networks (MAN), personal area networks (PAN), etc.) via networked hardware generally referred to as a "base station" and/or "wireless access points" (AP). Typically, wireless networks can enable access to terrestrial networks via e.g., a backend or backhaul portion of service provider network (e.g., a cable network).

As demand for mobile communication to wireless networks have grown and evolved, so have infrastructures and standards for wireless networking. It is projected that mobile data traffic will grow by at least an order of magnitude over the next decade. To accommodate, transfer rates, latency, and data capacity must grow to keep up with the demand. Incipient standards for so-called 5G (fifth generation) wireless communications (e.g., Release 15 as further described below) aim to pave the way for significant improvements over existing 4G (fourth generation) wireless communications. More specifically, 5G aims to leverage, inter alia, ultra-high data rates, ultra-high reliability and ultra-low latency (e.g., faster data rates over 4G (multi-Gbps, e.g., 10 Gbps) and faster response times (pings as low as 1 ms)), greater connection density for efficient signaling (e.g., via beamforming) and traffic capacity, more cost-effective data plans for consumers and subscribers of cellular service providers, and a much greater network efficiency that optimizes network energy consumption with more efficient processing of data.

One proposed technology for 5G networks is so-called "fog networking." Fog networking is a design paradigm that attempts to decentralize and distribute computing burden and data storage to minimize overall network burden. For example, data that is locally consumed may be stored locally near its consumer, whereas data that is widely distributed may be centrally stored. Fog computing extends cloud computing and services to the edge of the network, bringing the advantages and power of the cloud closer to where data is created and acted upon.

SUMMARY

The present disclosure provides, inter alia, methods and apparatus for performing tasks within a decentralized network.

In one aspect, a method for performing tasks within a decentralized network is disclosed. In one embodiment, the method includes: performing, at a client device within the decentralized network, one or more tasks on behalf of an other client device within the decentralized network and in direct data communication with the client device; generating, at the client device within the decentralized network, a record for the one or more tasks within a digital ledger that is accessible by at least the client device and the other client device of the decentralized network; causing the record to be validated by the decentralized network; and in response to a validation by the decentralized network, receiving one or more tokens for the one or more tasks performed at the client device.

In one variant, the method further includes generating a manifest of the one or more tasks that can be performed for client devices of the decentralized network for one or more tokens. In one such exemplary variant, the method includes receiving a request for the one or more tasks from the other client device via protocol layer signaling. For example, the method may include receiving a request for the one or more tasks from the other client device via a software agent signaling.

In another variant, the method includes: causing the record to be validated by the decentralized network includes transmitting a cryptographic value determined by the client device to an additional device within the decentralized network; and causing a comparison of the cryptographic value determined by the client device and a cryptographic value determined by the additional device within the decentralized network. In one such variant, the cryptographic value determined by the client device includes a result of a memory search performed by the client device.

In one aspect, a client device is disclosed. In one embodiment, the client device includes: a processor apparatus; one or more wireless network interfaces coupled with the processor apparatus and configured to perform data communication in a first decentralized network; a non-transitory computer-readable apparatus including a storage medium having at least one computer program thereon. In one exemplary embodiment, the at least one computer program includes a plurality of instructions configured to, when executed by the processor apparatus, cause the client device to: receive a request for one or more tasks from an other client device of the first decentralized network; generate a record for the one or more tasks on behalf of the other client device in direct data communication with the client device; in response to the record for the one or more tasks being validated by a community of client devices of the first decentralized network, perform the one or more tasks on behalf of the other client device in direct data communication with the client device; and receive one or more tokens for the one or more tasks.

In one variant, the plurality of instructions are further configured to, when executed by the processor apparatus, cause the client device to: perform control plane signaling to establish a data plane communication based on a distributed ledger data structure. In one such variant, the control plane signaling to establish a data plane communication is transmittable without prior authentication.

In another variant, the plurality of instructions are further configured to, when executed by the processor apparatus, cause the client device to receive and locally store a distributed ledger data structure associated with the community of client devices of the first decentralized network.

In another variant, the plurality of instructions are further configured to, when executed by the processor apparatus, cause the client device to: validate the distributed ledger data structure; and register within the first decentralized network based at least in part on a validation of the distributed ledger data structure.

In another variant, the plurality of instructions are further configured to, when executed by the processor apparatus, cause the client device to: establish data communication with a second decentralized network different from the first decentralized network; and exchange the one or more tokens to one or more second tokens associated with the second decentralized network.

In another variant, the community of client devices of the first decentralized network is untrusted; and the one or more tokens may be redeemed at a trusted service provider for the client device.

In one aspect, a non-transitory computer-readable apparatus including a storage medium having at least one computer program thereon is disclosed. In one exemplary embodiment, the at least one computer program includes a plurality of instructions configured to, when executed by a processor apparatus disposed within a network component, cause the network component to: receive a distributed ledger data structure including a record; wherein the record includes data indicative of one or more tasks performed on behalf of a first client device by a second client device; validate the record in view of the distributed ledger data structure; and credit the second client device with one or more tokens and debit the first client device the one or more tokens in accordance with the record based at least in part on determining that the record is valid.

In one variant, the plurality of instructions are configured to, when executed by a processor apparatus disposed within a network component, cause the network component to: provide the record to an accounting entity of a service provider associated with either the first or the second client device.

In one variant, the plurality of instructions are configured to, when executed by a processor apparatus disposed within a network component, cause the network component to notify an accounting entity of a service provider associated with either the first or the second client device of either the credit to the second client device or the debit to the first client device.

In one variant, the plurality of instructions are configured to, when executed by a processor apparatus disposed within a network component, cause the network component to: allocate one or more network resources to the first client device or the second client device; and wherein the one or more tasks performed on behalf of the first client device by the second client device consume the one or more network resources. In one such variant, the one or more network resources includes network bandwidth. In another such variant, the one or more network resources are reused to service one or more other client devices.

In one variant, the plurality of instructions are configured to, when executed by a processor apparatus disposed within a network component, cause the network component to: determine a network resource usage; credit the second client device with the one or more tokens based on the network resource usage; and debit the first client device with the one or more tokens based on the network resource usage.

In another aspect of the disclosure, a computerized wireless access node apparatus configured for providing wireless access to a plurality of computerized wireless-enabled mobile devices via radio frequency (RF) spectrum is disclosed. In one embodiment, the computerized wireless access node includes: a wireless interface configured to transmit and receive RF waveforms in the spectrum portion; digital processor apparatus in data communication with the wireless interface; and a storage device in data communication with the digital processor apparatus and including at least one computer program.

In an additional aspect of the disclosure, computer readable apparatus is described. In one embodiment, the apparatus includes a storage medium configured to store one or more computer programs. In one embodiment, the apparatus includes a program memory or HDD or SDD on a computerized controller device. In another embodiment, the apparatus includes a program memory, HDD or SSD on a computerized access node.

In another aspect, methods for incentivizing a network user to participate in the network are disclosed. In various embodiments thereof, the network user may save charges related to operator costs, or make financial gain via use of the network.

In another aspect, methods of reducing power usage of a client device while participating in a fog network are disclosed. In various embodiments thereof, power savings may depend on current power usage, energy currently expended over a radio link, rate of charging, hardware or software capabilities, position or mobility of the client device, subscription of the client device to a network, and/or criticality or popularity of the data being served, received, or exchanged.

In another aspect, systems for accounting network resource usage via a decentralized digital ledger is disclosed. In some embodiments, the accounting methods are used to track fungible "tokens" and "credits" accumulated and spent by one or more client devices in one or more different networks. Such a ledgering system that uses credits, tokens, points, or other measurable units may be used to "keep track" of consumption and creation of network resources by a given client device.

These and other aspects shall become apparent when considered in light of the disclosure provided herein.

Figure 1A:
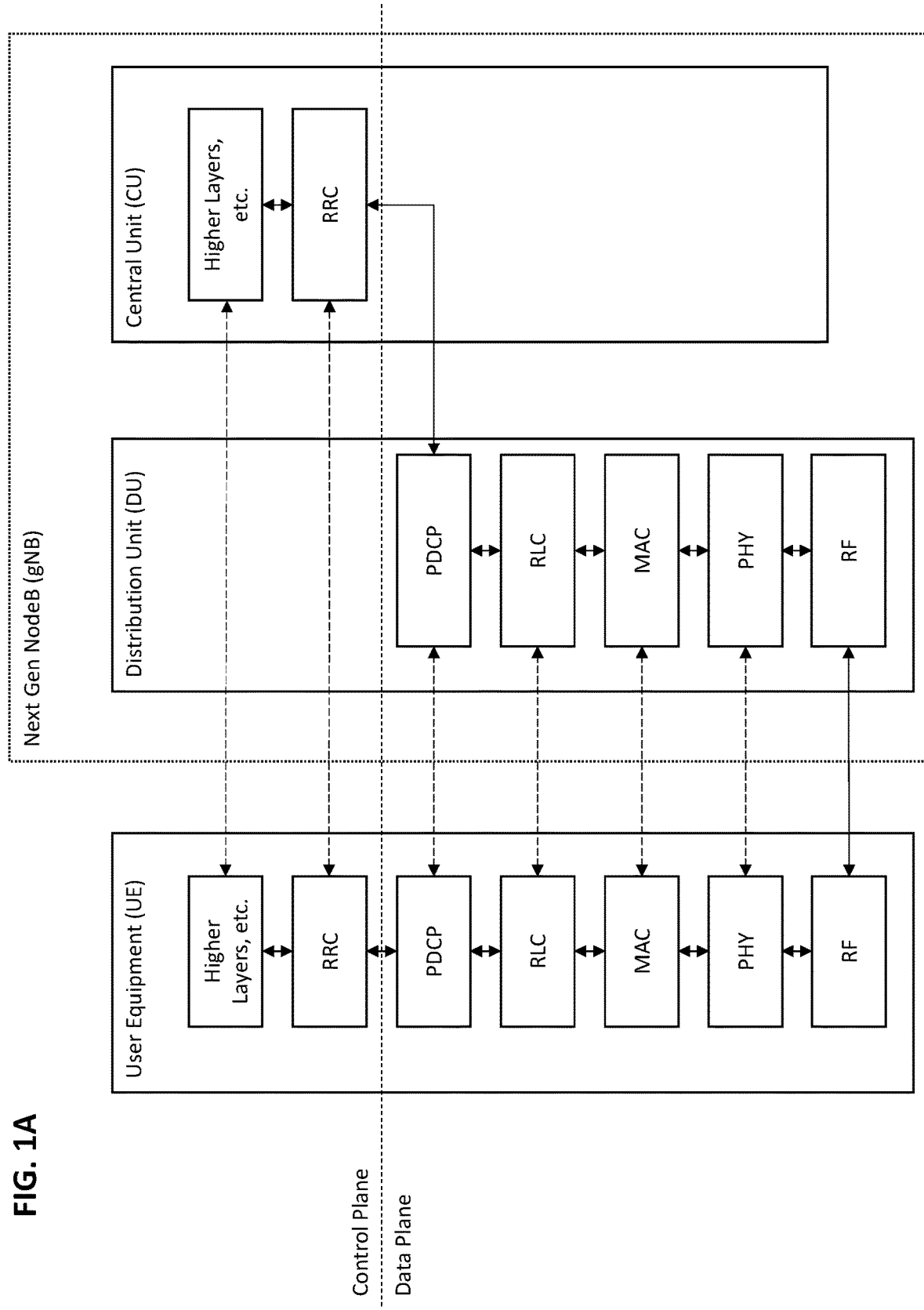
FIG. 1A is a logical block diagram of one exemplary Next Generation Radio Access Network (NG-RAN) communication stack protocol, useful to illustrate various aspects of the present disclosure.

All figures © Copyright 2018 Micron Technology, Inc. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a next-generation Node B (gNB) (also referred to next-generation evolved Node B (eNB)), an Long Term Evolution (LTE) eNB, a Wi-Fi Access Point (AP), etc.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable application that runs within an operating system environment.

As used herein, the term "central unit" (CU) refers without limitation to a centralized logical node within a wireless network infrastructure. For example, a CU might be embodied as a next-generation Node B (gNB) CU (gNB-CU) that controls the operation of one or more next-generation Node B (gNB) distribution units (gNB-DUs) defined below.

As used herein, the term "token" refers without limitation to an indication of or data representative of recognition for work or tasks or acts performed by a client device. As discussed elsewhere herein, an amount of tokens may be earned or obtained by performing corresponding tasks, or otherwise receiving them from another network entity. Tokens may be redeemed in exchange for work performed by another client device or network entity. Tokens may also be converted to different forms usable in different networks, locations, and/or circumstances.

As used herein, the terms "client device" or "user device" or "UE" may include, but are not limited to, mobile devices such as handheld computers, PDAs, personal media devices (PMDs), tablets, "phablets", smartphones, and vehicle infotainment systems or portions thereof, as well as set-top boxes (e.g., DSTBs), gateways, modems, personal computers (PCs), and minicomputers, whether desktop, laptop, or otherwise.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Register Transfer Language (RTL), VHSIC (Very High Speed Integrated Circuit) Hardware Description Language (VHDL), Verilog, and the like.

As used herein, the term "decentralized" or "distributed" refers without limitation to a configuration or network architecture involving multiple computerized devices that are able to perform data communication with one another, rather than requiring a given device to communicate through a designated (e.g., central) network entity, such as a server device. For example, a decentralized network enables direct peer-to-peer data communication among multiple UEs (e.g., wireless user devices) making up the network.

As used herein, the term "distributed unit" (DU) refers without limitation to a distributed logical node within a wireless network infrastructure. For example, a DU might be embodied as a next-generation Node B (gNB) DU (gNB-DU) that is controlled by a gNB CU described above. One gNB-DU may support one or multiple cells; a given cell is supported by only one gNB-DU.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc. 5G-servicing core networks and network components (e.g., DU, CU, gNB, small cells or femto cells, 5G-capable external nodes) residing in the backhaul, fronthaul, crosshaul, or an "edge" thereof proximate to residences, businesses and other occupied areas may be included in "the Internet."

As used herein, the term "ledger" (or "blockchain") refers to, without limitation, a digital data structure that stores data and "proof-of-work" (POW) in "blocks", the blocks are chained together to form a blockchain. In one embodiment, the POW may be generated as algorithmic outputs from a one-way memory search. In other embodiments, POW may be generated as algorithmic outputs from a one-way hashing algorithm. Blockchain proof-of-work (POW) is asymmetric in that a solution is difficult to find, but very easy to verify. Hence, the contents of the ledger or blockchain accumulate complexity ("entropy") at a rate that makes it impractical to generate false consensus or "attack" an entry (e.g., attempt to modify or restructure the ledger or blockchain) within a decentralized system or network. Blockchains may be designed for e.g., scalability, security, and/or immutability; for example, a blockchain may be a publicly shared ledger that can be trusted among anonymous parties (which do not directly trust one another). In another example, the blockchain may only be accessible by users or devices having certain credentials (e.g., private membership).

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, and other wireless data standards, including GSM, UMTS, CDMA2000, etc. (as applicable).

As used herein, the terms "5G NR, "5G," and "New Radio" refer without limitation to 3GPP Release 15 and TS 38.XXX Series and subsequent or related standards and releases (e.g., Release 16 and beyond), as further discussed throughout the present disclosure.

As used herein, the term "memory" includes any type of integrated circuit or other storage device adapted for storing digital data including, without limitation, random access memory (RAM), pseudostatic RAM (PSRAM), dynamic RAM (DRAM), synchronous dynamic RAM (SDRAM) including double data rate (DDR) class memory and graphics DDR (GDDR) and variants thereof, ferroelectric RAM (FeRAM), magnetic RAM (MRAM), resistive RAM (RRAM), read-only memory (ROM), programmable ROM (PROM), electrically erasable PROM (EEPROM or EPROM), DDR/2 SDRAM, EDO/FPMS, reduced-latency DRAM (RLDRAM), static RAM (SRAM), "flash" memory (e.g., NAND/NOR), phase change memory (PCM), 3-dimensional cross-point memory (3D Xpoint), and magnetoresistive RAM (MRAM), such as spin torque transfer RAM (STT RAM). Memory devices may be volatile or non-volatile. Non-volatile memory (e.g., flash memory) can store data for extended periods of time even in the absence of an external power source. Volatile memory devices (e.g., DRAM) may lose their stored state over time unless they are periodically refreshed by an external power source. A binary memory device may, for example, include a charged or discharged capacitor. A charged capacitor may, however, become discharged over time through leakage currents, resulting in the loss of the stored information. Certain features of volatile memory may offer performance advantages, such as faster read or write speeds, while features of non-volatile memory, such as the ability to store data without periodic refreshing, may be advantageous. Memory devices are widely used to store information in various electronic devices such as computers, wireless communication devices, cameras, digital displays, and the like. Information is stored by programing different states of a memory device. For example, binary devices have two states, often denoted by a logic "1" or a logic "0." In other systems, more than two states may be stored. To access the stored information, the electronic device may read, or sense, the stored state in the memory device. To store information, the electronic device may write, or program, the state in the memory device. Memory resources may also be provided as internal, semiconductor, integrated circuits in computers or other electronic systems.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" or "network service provider" refer to a cellular, satellite phone, WMAN (e.g., 802.16), or other network service provider having infrastructure required to deliver services including without limitation voice and data over those mediums. The term "MNO" as used herein is further intended to include mobile virtual network operators (MVNOs), mobile virtual network aggregators (MVNAs), and mobile virtual network enablers (MVNEs).

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives (e.g., hard disk drives (HDD), solid state drives (SDD)), Flash drives, DVR device, memory, RAID devices or arrays, optical media (e.g., CD-ROMs, Laserdiscs, Blu-Ray, etc.), or any other devices or media capable of storing content or other information, including semiconductor devices (e.g., those described herein as memory) capable of maintaining data in the absence of a power source. Common examples of memory devices that are used for storage include, without limitation: DRAM (e.g., SDRAM, DDR SDRAM, DDR2 SDRAM, DDR3 SDRAM, DDR4 SDRAM, GDDR, RLDRAM, LPDRAM, etc.), DRAM modules (e.g., RDIMM, VLP RDIMM, UDIMM, VLP UDIMM, SODIMM, SORDIMM, Mini-DIMM, VLP Mini-DIMM, LRDIMM, NVDIMM, etc.), managed NAND, NAND Flash (e.g., SLC NAND, MLC NAND, TLS NAND, Serial NAND, 3D NAND, etc.), NOR Flash (e.g., Parallel NOR, Serial NOR, etc.), multichip packages, hybrid memory cube, memory cards, solid state storage (SSS), and any number of other memory devices.

As used herein, the term "Wi-Fi" refers to, without limitation and as applicable, any of the variants of IEEE Std. 802.11 or related standards including 802.11 a/b/g/n/s/v/ac or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, analog cellular, CDPD, satellite systems, millimeter wave or microwave systems, acoustic, and infrared (i.e., IrDA).

As used herein, the term "work" refers to one or more tasks performed by a computerized device (e.g., a client device, a network entity, a storage device), and more specifically, various components thereof (e.g., a processor apparatus, a storage device, a modem, a chipset). By way of example, and without limitation, such tasks may include computational tasks, calculations, algorithmic determinations and evaluations of data, and execution of instructions by a processor apparatus. The tasks may include storage of data in volatile storage (in, e.g., DRAM) or non-volatile storage (in e.g., flash, HDD, SDD), determination of length of storage, determination of locations (e.g., sectors) associated with data stored and data to be stored (e.g., from another device). The tasks may include measurement of bandwidth usage, including downlink and uplink data transfers between client devices, storage devices, management entities and controllers, etc. Various other types of tasks will become apparent given the present disclosure.

Overview

Various user concerns must be resolved before paving the way to enable greater network efficiency. For example, users may not want anyone else in the fog mesh using their client device to access processing and storage resources due to privacy and/or ownership concerns. Similarly, allowing other users to utilize their device's resources may be undesirable e.g., due to increased power consumption, and reduced memory and/or processing capacity. In other words, existing solutions for passive engagement in a fog network consume power and/or open up security concerns. More directly, existing fog networks do not compensate or incentivize users to participate. Without providing any form of incentive for users to participate, proposed technologies for fog networks are unlikely to become popular.

Accordingly, improved apparatus and methods for, inter alia, incentivizing device participation within a distributed network (e.g., a 5G network) are needed. Specifically, techniques for incentivizing users to participate in the fog networks by providing, for example, computational, storage, and/or network resources are needed. Such solutions should bolster network usage, improve network speeds (maximizing ultra-fast and ultra-responsive properties of 5G), and enable efficient processing of data by compensating user devices for their contribution of resources to the network.

Various embodiments of the present disclosure incentivize device participation within a distributed network. In one exemplary embodiment, devices of a fog network may provide for example, computational, storage, and/or network resources. In one such variant, the user contributions are recorded, thereby enabling users to be compensated for their contributions of resources to the network at a later time. In one such implementation, user contributions are recorded within a blockchain type data structure. Various other implementations may use other forms of distributed recordation.

As described in greater detail hereinafter, the blockchain technology enables a fog network to self-organize resource allocations without the benefit of centralized network management. Moreover, as described in greater detail hereinafter, another benefit of the blockchain technology is that it may specifically prevent and/or penalize malicious behavior and/or reduce counterparty risk where there are no definitively trusted participants. More directly, blockchain data structures can be used to credit and/or debit user contributions among any arbitrary community of user devices without requiring authentication or trust exchanges.

In one exemplary embodiment, a user device may provide processing power, data storage, and/or bandwidth to another user device or the network operator (e.g., transferring data from or to other client devices or even a "cloud" sever). These contributions are generally referred to as "credited" work for the fog network "backhaul". More directly, the user device can participate in the fog network backhaul. Similarly, when a user device consumes processing power, data storage, and/or bandwidth, the user is "debited" work. The rates of crediting and/or debiting work for network participation may be dynamically adjusted. For example, during certain high use periods (e.g., peak hours), the credit and debit rates may be increased so as to incentivize the user device participation. Similarly, during low use periods (e.g., off-peak hours), the credit and debit rates may be decreased.

Unlike traditional networking techniques which often rely on centralized networks directing and/or commandeering user equipment for network bandwidth, the various aspects of the present disclosure enable users to opt-in, opt-out, and/or otherwise consent to network participation on the basis of a variety of considerations. In some embodiments, the network operator may choose to dynamically increase and/or decrease incentive schemes (e.g., offering cheaper bandwidth, prioritization, and/or cost incentives). In some embodiments, the user device may include a set of heuristics by which the participation may be increased or decreased. For example, a user may configure their user device to participate within a fog network when the credit rate offered by the network exceeds a minimum threshold. Similarly, a user may configure their user device to consume fog network resources when the debit rate offered by the network does not exceed a maximum threshold. More directly, allowing network operators and users to participate in a market of credits and debits for resource contributions should bolster network usage and improve network speeds (maximizing ultra-fast and ultra-responsive properties of 5G).

As previously noted, various aspects of the present disclosure are directed to ensuring that crediting and debiting of participation can be performed at the edge of the network (within the fog) without requiring authentication or trust exchanges. More directly, various aspects of the present disclosure are directed to verification and/or validation of work performed by peer devices. When the other client device(s) verifies the work performed (and/or reaches a consensus among multiple devices in the network), the working client device gets the tokens that can be spent on other requested work.

Various embodiments of the present disclosure are directed to user devices and/or network devices that are configured to enable fog network backhaul participation. By enabling widespread fog network backhaul participation, future network technologies can provide high speed and/or broad coverage via a fog network, even in areas of relatively scarce traditional network coverage.

Detailed Description of Exemplary Embodiments

Exemplary embodiments of the apparatus and methods of the present disclosure are now described in detail. While these exemplary embodiments are described in the context of the previously mentioned wireless access points (e.g., 5G-enabled central units (CUs) and distribution units (DUs), base stations, user client devices) associated with, e.g., a managed network (e.g., hybrid fiber coax (HFC) cable architecture having a multiple systems operator (MSO), digital networking capability, IP delivery capability, and a plurality of client devices), the general principles and advantages of the disclosure may be extended to other types of radio access networks and architectures that are configured to deliver digital data (e.g., text, images, games, software applications, video and/or audio). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., outdoors, commercial/retail, or enterprise domain (e.g., businesses), or even governmental uses, such as those outside the proscribed "incumbent" users such as U.S. DoD and the like. Yet other applications are possible.

While the present disclosure is described generally with respect to usage in wireless mobile client devices connected to a network of other mobile devices, the present disclosure is not so limited, and may be implemented via wired networking, local intranet(s), and non-mobile devices (e.g., desktop PC, mainframe), including mobile-to-stationary devices (e.g., data communication between mobile device and 5G-enabled external radio access node).

Other features and advantages of the present disclosure will immediately be recognized by persons of ordinary skill in the art with reference to the attached drawings and detailed description of exemplary embodiments as given below.

5G (5$^{th}$ Generation) and NG-RAN (Next Generation Radio Access Network)—

Proposals for 5$^{th}$ Generation (5G) radio technologies include Next Generation Radio Access Network (NG-RAN) technologies that are specified by the 3$^{rd}$ Generation Partnership Project (3GPP). The 3GPP is currently completing the specifications of its Releases 15 NG-RAN which includes radio access network components and/or interactions among the involved nodes including so-called next generation Node Bs (gNBs). Releases 16, 17, and beyond will be finalized as 5G New Radio (5G NR) ecosystems are deployed commercially. Nonetheless, the 5G-implemented embodiments described herein may be implemented using Release 15 or higher.

NG-RAN will provide high-bandwidth, high-reliability, low-latency wireless communication and efficiently utilize, depending on application, both licensed and unlicensed spectra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure. Thus, compatibility with existing and new Long Term Evolution (LTE) entities may be supported to varying degrees. For example, an NG-RANs may need to support LTE evolved NodeBs (eNBs).

FIG. 1A is a logical block diagram of one exemplary NG-RAN communication stack protocol. As shown therein, the communication stack for the gNB communicates with the communication stack of a user equipment (UE) with at least the following layers: the Radio Resource Control (RRC) layer, the Packet Data Convergence Protocol (PDCP) layer, the Radio Link Control (RLC) layer, the Medium Access Control (MAC) layer, and the Physical Layer (PHY). Additionally, the illustrated gNB is functionally divided between a Central Unit (CU) and a Distribution Unit (DU).

As a brief aside, the traditional communication stack paradigm is composed of multiple modular software layers that are "stacked" together. Each layer of the communication stack separately manages its own implementation specific considerations, and provides an abstract communication interface to its upper and/or lower layers. For example, a higher layer (e.g., the Packet Data Convergence Protocol (PDCP) layer) may control a lower layer of the same device (e.g., the Radio Link Control (RLC) layer) using a limited set of control protocols. Additionally, each layer of the communication stack also communicates with a peer layer in other devices. For example, the RRC layer of one device coordinates and negotiates radio resources with the RRC layers of other devices. In this manner, different applications can communicate freely across different devices over an abstraction of the underlying network transport.

Software layers are loosely categorized into so-called "control plane" and "data plane" functionality. The so-called "control plane" layers refer to layers of the protocol stack that carry signaling traffic used for network routing. Control plane traffic originates from, or are destined for, a router or other network entity. In contrast, the so-called "data plane" layers carry signaling traffic used for individual network "hops" (i.e., a portion of the network path between source and destination). Data plane traffic is generated and consumed at each hop of the network. For example, according to the 3GPP Release 15, data plane functions may include data forwarding and flow control, whereas control plane functions may include interface management and error handling (e.g., setup, reset, removal, configuration update), connected mode mobility management (handover procedures, sequence number status transfer, UE context retrieval), and support of RAN paging, etc.

Referring back to FIG. 1A, the CU (also known as gNB-CU) is a logical node within the NR architecture that communicates with an NG Core, and includes gNB functions such as transfer of user data, session management, mobility control, RAN sharing, and positioning. Other functions are allocated exclusively to the DU (also known as gNB-DU(s)) per various "split" options described subsequently herein in greater detail. The CU communicates user data and controls the operation of the DU(s), via the data plane and control plane interfaces. The illustrated DU and CU split the gNB communication stack between the Radio Resource Control (RRC) layer and the Packet Data Convergence Protocol (PDCP) layer. Such a configuration is also referred to as an "Option 1" split. Under Option 1, the RRC (Radio Resource Control) is in the CU while PDCP (packet data convergence protocol), RLC (Radio Link Control), MAC (Medium Access Control), physical layer (PHY) and Radio Frequency (RF) are kept in the DU, thereby maintaining the entire data plane in the DU.

Other implementations of the NG-RAN architecture may use other splits. For example, under Option 2 the PDCP and RLC are split. Option 2 operation is additionally subdivided into two possible variants. In one such variant, the RRC and PDCP are maintained in the CU, while RLC, MAC, PHY and RF are in the DU. In a second variant, the RRC and PDCP are maintained in the CU with split data plane and control plane stacks, and RLC, MAC, physical layer and RF remain in the DU.

Under Option 3 (Intra RLC Split), two splits are possible: (i) a split based on ARQ (Automatic Retransmission Request); and (ii) a split based on Transmit (TX) RLC and Receive (RX) RLC. Both of these protocol layers are located within the RLC layer.

Under Option 4 (RLC-MAC split), the RRC, PDCP, and RLC are maintained in the CU, while the MAC, PHY, and RF are maintained in the DUs.

Under Option 5 (Intra-MAC split), the RF, physical layer and lower part of the MAC layer (Low-MAC) are in the DUs, while the higher part of the MAC layer (High-MAC), RLC and PDCP are in the CU.

Under Option 6 (MAC-PHY split), the MAC and upper layers are in the CU, while the PHY layer and RF are in the DUs. The interface between the CU and DUs carries data, configuration, and scheduling-related information (e.g. Modulation and Coding Scheme (MCS), layer mapping, beamforming and antenna configuration, radio and resource block allocation, etc.) as well as measurements.

Under Option 7 (Intra-PHY split), different sub-options for UL (uplink) and DL downlink) may occur independently. For example, in the UL, FFT (Fast Fourier Transform) and CP removal may reside in the DUs, while remaining functions reside in the CU. In the DL, IFFT and CP addition may reside in the DU, while the remainder of the PHY resides in the CU.

Finally, under Option 8 (PHY-RF split), the RF and the PHY layer may be separated to, inter alia, permit the centralization of processes at all protocol layer levels, resulting in a high degree of coordination of the RAN. This allows an optimized support of functions such as coordinated multi-point (CoMP), multiple input multiple output (MIMO), load balancing, and mobility.

The aforementioned split options are intended to enable flexible hardware implementations which allow scalable cost-effective solutions, as well as coordination for e.g., performance features, load management, and real-time performance optimization. Moreover configurable functional splits enable dynamic adaptation to various use cases and operational scenarios. Factors considered in determining how/when to implement such options can include: (i) QoS requirements for offered services (e.g. low latency, high throughput); (ii) support of requirements for user density and load demand per given geographical area (which may affect RAN coordination); (iii) availability of transport and backhaul networks with different performance levels; (iv) application type (e.g. real-time or non-real time); (v) feature requirements at the Radio Network level (e.g. Carrier Aggregation).

Figure 1B:
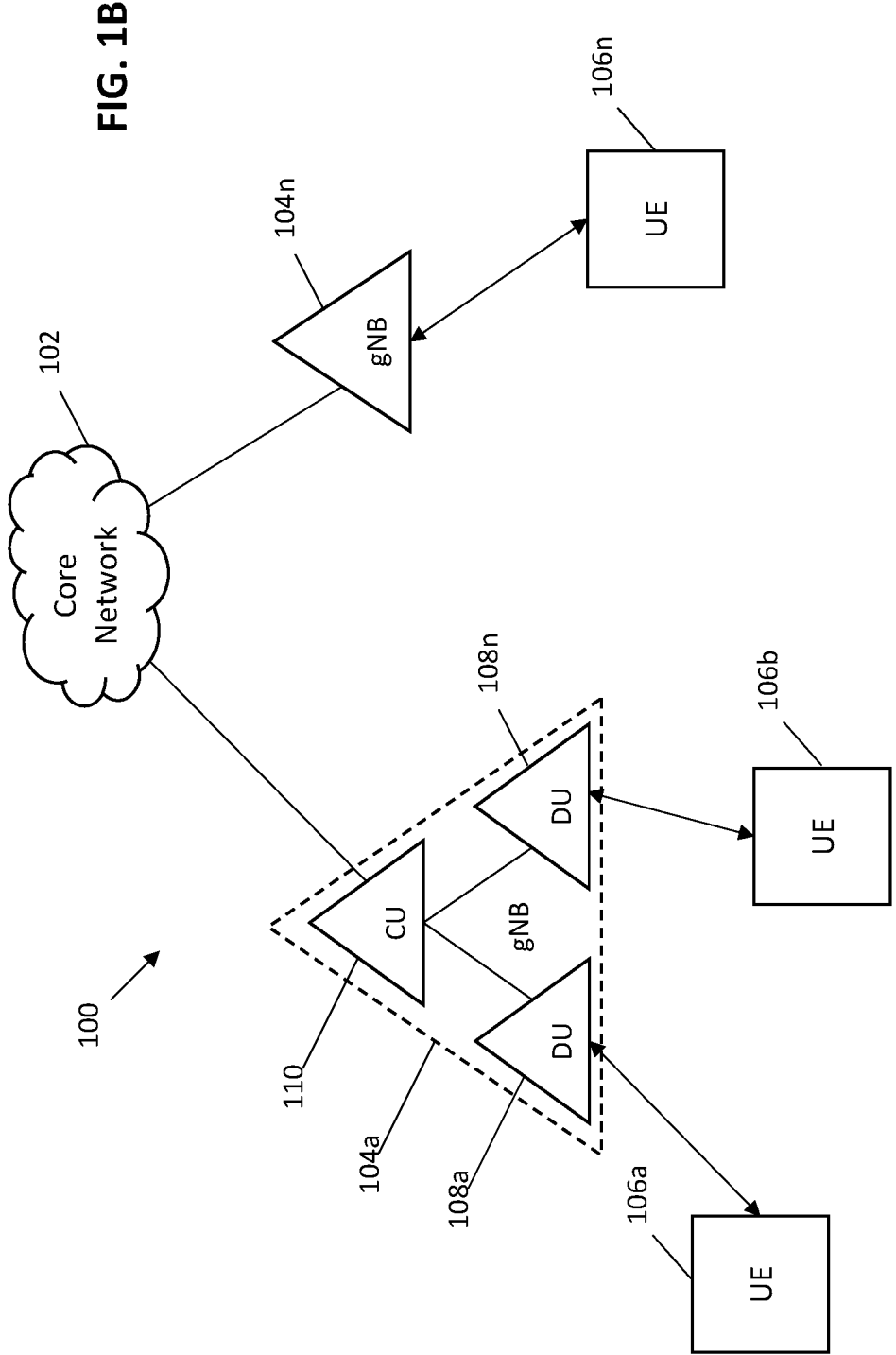
FIG. 1B is a logical block diagram of one exemplary Next Generation Radio Access Network (NG-RAN) architecture, useful to illustrate various aspects of the present disclosure.

FIG. 1B illustrates a typical network architecture 100 utilizing a core network 102, one or more next generation Node Bs (gNBs) 104*a*, 104*n*, and user equipment (UEs) 106*a*, 106*b*, 106*n*. UEs 106 may include mobile client devices, e.g., smartphones, tablets, laptops, phablets, smartwatches, personal digital assistants, smart home devices (e.g., able to read out statically programmed or dynamically formed words), and the like. As shown in FIG. 1B, a gNB (such as gNB 104*a*) may be further subdivided into distributed units (DUs) 108*a*, 108*b* that are managed by a central unit (CU) 110. Alternatively, a gNB may be a single network entity (such as gNB 104*n*).

As used herein, the term "backhaul" refers to the portion of the mobile network that connects geographically dispersed cell sites (e.g., gNBs 104) to the core network 102. In contrast, the term "fronthaul" refers to Radio Access Network (RAN) architectures that separate the cell sites into a centralized baseband controllers (e.g., a CU) and standalone remote radio heads (e.g., DU or RRH) installed at remote cell sites located kilometers to tens of kilometers away. For example, the gNB 104*a* may include a "fronthaul" RAN. It is also appreciated that the "backhaul" and the "fronthaul" in a 5G transport network may be fused together into a functionally split "crosshaul" that is dynamically reconfigurable and flexibly implemented based on various factors. For example, at one end of the scale, a 5G-enabled network may accommodate a backhaul and legacy access point or base station used in, e.g., a traditional "cloud" network. At the other end, a "fog" network (described in greater detail hereinafter) may be configured to exchange data through densely distributed wireless radio access nodes. These widely distributed access nodes may further leverage the enhanced communication protocol with the ubiquity of access nodes to achieve the aforementioned ultra-high data rate and ultra-low latency. A "crosshaul" may have properties of both a backhaul and a fronthaul, in which the infrastructure supports data exchange with a centralized server, e.g., disposed at a backend portion in the core network, as well as with various "edge" devices. For example, new data that is not contained within the fog may be delivered to a DU that "seeds" the new data to one or more edge devices.

The network architecture 100 may be used to provide Internet access and/or access to the core network 102 via gNBs 104 or other radio access nodes thereof (e.g., CU 106 and DUs 108). While the present disclosure is presented within the context of 3GPP wireless technologies, the various aspects of the present disclosure may be used with equivalent success in other technologies. For example, future networks may incorporate and/or blend e.g., personal area networks (e.g., Bluetooth), cellular networks, satellite networks, Wi-Fi networks and/or WiMAX networks.

Internet access generally entails the delivery of packet data (e.g., digital data carried within a packet or frame structure or protocol), however the architecture can also be used for a variety of other services including e.g., cellular coverage (e.g., voice services). In addition to Internet data and voice services, the network architecture 100 may also be used to provide content delivery via e.g., on-demand and broadcast content (e.g., live video programming), OTT (over-the-top) services, and other services of the type well known in the digital communication and broadcasting arts.

As can be seen in FIG. 1B, the network architecture 100 is typically a "tree-and-branch" structure, and hence multiple tiered wireless access nodes may be linked to each other or cascaded via higher order tree and branch topologies. For example, a gNB 104*n* may be in data communication with one or more child nodes upstream (connected to the core network 102 or other intermediate nodes) or downstream (connected to a UE 106*n*). Artisans of ordinary skill in the related arts will readily appreciate that tree topologies have some advantages; for example, they are highly flexible and enable centralized monitoring and point-to-point connection. Unfortunately, tree topologies can be difficult to dynamically configure and there may be cascading points of failure (e.g., a failed tree node will cause a blackout in service for all of its subsidiary branches.)

Tree topologies were well suited to the traditional centralized operation of cellular networks. For example, the core network 102 could control a user's network wide access via the aforementioned control plane. Additionally, overall network operation could be centrally managed by the network operator based on e.g., prevailing operational conditions in the network, changes in user population and/or makeup of users at the venue, business models (e.g., to maximize profitability or provide other benefits), spectrum channel changes or withdrawals, or even simply to enhance user experience using one radio access network (e.g., 3GPP-based 3G/4G/4.5G network) when another radio access network (e.g., WLAN) is sub-optimal for whatever reason.

For example, the service provider network 100 aggregated and/or analyzed subscriber- or account-specific data (including inter alia, particular mobile devices associated with such subscriber or accounts) as part of the provision and planning for services to users. As but one example, device-specific IDs (e.g., MAC address, unique device or component identifier, or the like) were used to identify subscriber account data maintained at, e.g., the network headend(s) within the core network 102 so as to permit or at least facilitate, among other things, (i) user authentication; (ii) correlation to particular subscriber groups or demographics, such as for accounting of data usage; and/or (iii) determination of subscriber privileges and access. Notably however, for various privacy and/or security reasons, such sensitive information and control has historically been performed only within the core network with stringent security.

Fog Networks and Edge Device Participation—

Figure 2A:
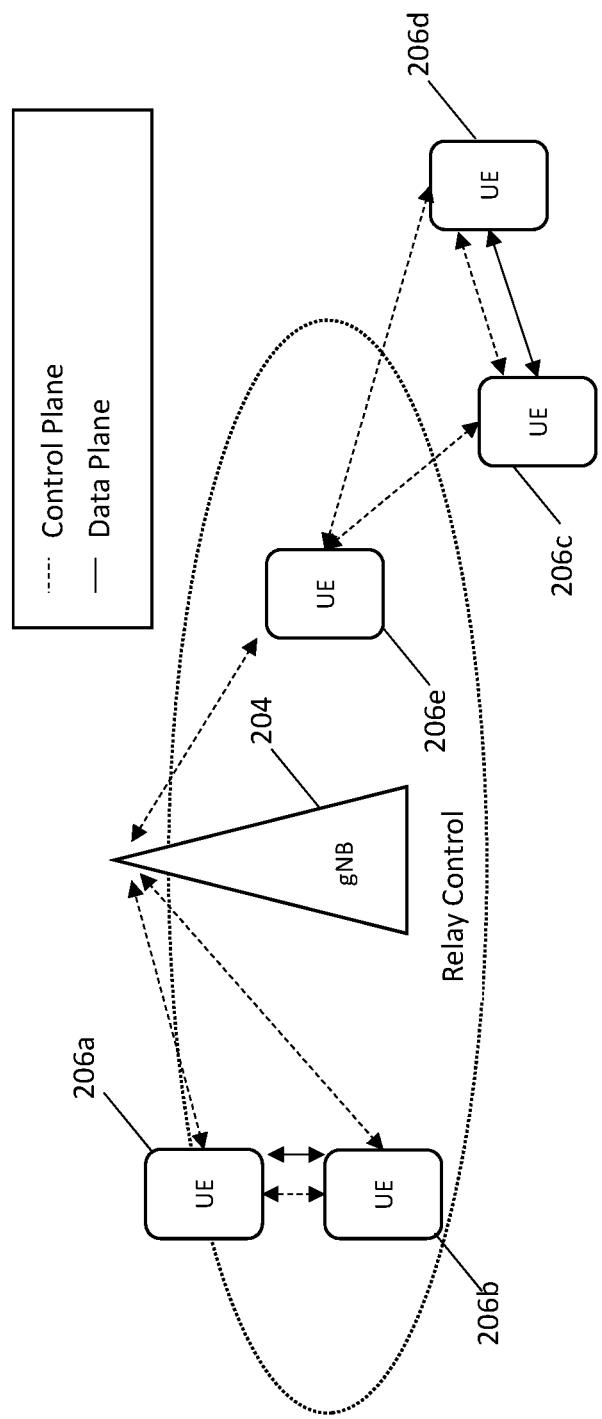
FIG. 2A is a logical block diagram of device-to-device (D2D) communication within an exemplary Next Generation Radio Access Network (NG-RAN) architecture, useful to illustrate various aspects of the present disclosure.

Incipient research into so-called "fog" networks has attempted to leverage device-to-device (D2D) proximity based service provisioning. For example, FIG. 2A is one graphical representation of an exemplary network architecture useful to illustrate D2D communications. As shown therein, the gNB 204 controls operation of multiple UEs 206 either via direct communication, or indirectly via relay communication. For example, UE 206*a* can communicate via D2D communications with UE 206*b*; this pair of UEs is in direct communication with the gNB 204 for control plane operation. In contrast, UE 206*c* can communicate via D2D communications with UE 206*d*; however, UE 206*c* and UE 206*d* are out of direct communication with gNB 204 and receive their control plane instructions via UE 206*e*. Common examples of relay devices include without limitations, e.g., a base stations (such as the gNB 204), user devices (such as the UEs 206), access points, distribution unit apparatuses, routers, and/or other similarly capable devices.

As an aside, a "fog network" as described herein generally refers to a network architecture, interconnected via wireless or wired means, that utilizes two or more client devices located near the "edge" of the network (i.e., proximate to user devices, usage premises, etc.) to enable a given client device to execute operations related to computations, storage operations, and/or data communication, particularly with respect to one or more other client devices. Such operations are performed locally rather than routed through a server entity over the Internet backbone, as was done in previous network architectures (e.g., cloud-based networks), thereby reducing the amount of data transported to the cloud for processing, analysis, storage, etc. Such operations may also be done in conjunction with cloud-based networks; e.g., resource-intensive operations may still be performed at cloud servers despite being disposed further from the endpoint.

Referring back to FIG. 2A, relay devices may pass control information via the control plane. Control information enables UEs to setup and transact data between one another in device-to-device (D2D) links. For example, the gNB 204 may provide control plane signaling to UE 206*e*, which is relayed to UEs 206*c*, 206*d*. Subsequently thereafter, UE 206*c* and UE 206*d* can use control plane data to establish a direct D2D data connection; thereafter data may be exchanged via the data plane.

As a simple example of a "fog networking" scenario, a client device (e.g., UE 206*c*) may request data resident on a second client device (such as e.g., UE 206*d*). Assuming that the client device UE 206*c* has access privileges to the data, the second client device UE 206*d* may transmit the data directly to the client device UE 206*c* (or be relayed through one or more other client devices and/or base stations) within the "fog" network, obviating the use of a server or backend. 5G-based implementations of the fog network can dramatically improve user experience, e.g., allowing for much greater data transfer speeds (multi-Gbps) and lower latency (down to 1 ms or less).

Figure 2B:
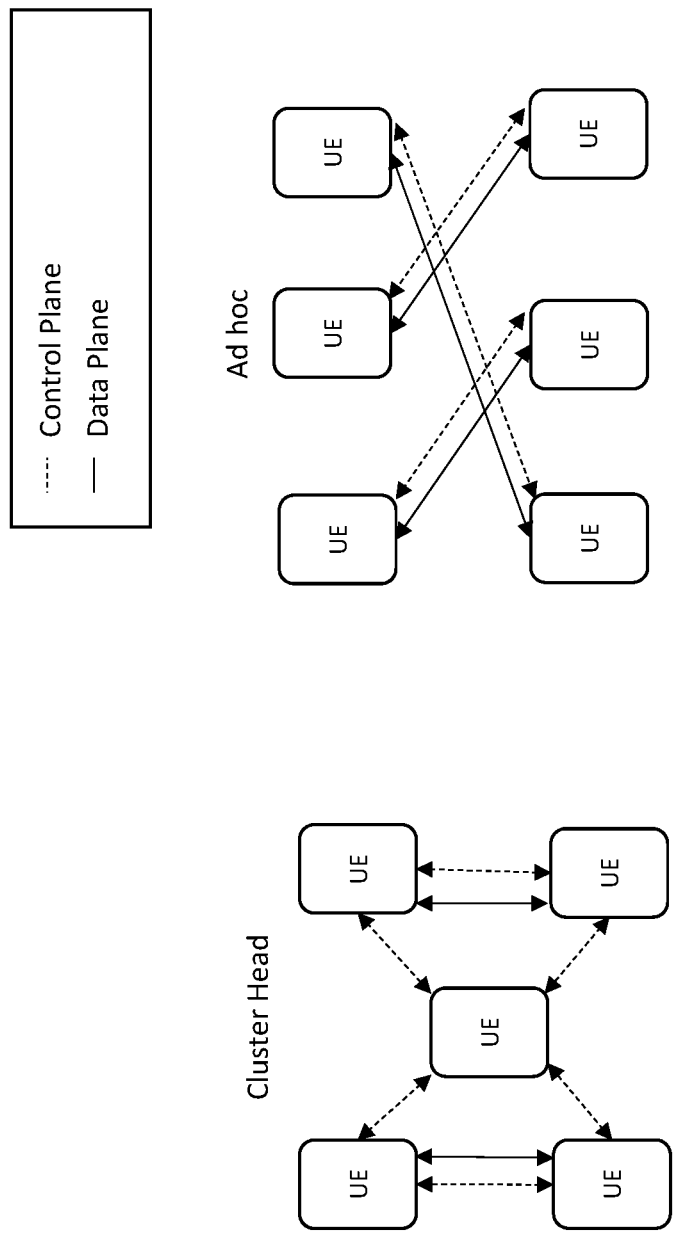
FIG. 2B is a logical block diagram of various types of device-to-device (D2D) proximity based service provisioning, useful to illustrate various aspects of the present disclosure.

FIG. 2B illustrates some common examples of device-to-device (D2D) proximity based service provisioning. For example, so-called "cluster head" network configurations identify a group of UEs that are "clustered" together. The cluster is "established" by selecting a "cluster head" for the cluster; typically a cluster head selection is selected to minimize network management overhead (e.g., a cluster head should have the most direct connections of the cluster, for as long as possible).

Another common configuration is an "ad hoc" network, wherein each UE identifies and establishes an ad hoc communication to another UE on a temporary ad hoc basis. In some ad hoc networks, the devices must be sufficiently proximate so as to be immediately detectable via beacons or other types of signals that prompt nearby devices to send a return message (including, e.g., a Service Set Identifier (SSID) in the message). In other ad hoc networks, a user device may connect to another user device that is too distant for a direct communication link, yet able to communicate via intermediary devices in the fog. Most ad hoc networks are limited to two entities (a point-to-point connection); although higher order ad hoc networks may be used with equal success (partial and/or full mesh networks). Historically, higher order ad hoc networks often require more resources than was available on mobile devices (e.g., power and/or bandwidth capabilities), however device capabilities have greatly improved enabling such operation.

Both cluster head and ad hoc configurations enable D2D exchange of data via wireless means by transmitting data directly to another user device. Such wireless means may include 3GPP-based protocols (e.g., 3G, 4G, 5G, 4.5G, 4G/5G hybrid protocols as described elsewhere herein). However, the present disclosure is not so limited and at least portions may be implemented with various other types of long- and short-range wireless connectivity, e.g., WLAN (e.g., Wi-Fi or based on other IEEE Std. 802.11, MulteFire, etc.), Bluetooth (including Bluetooth Low Energy (BTLE)), 3G cellular, infrared, radio-frequency identification (RFID), near-field communication (NFC), and Global Positioning System (GPS).

As a brief aside, cellular networks were designed to provide wireless coverage in geographic areas called "cells." Traditionally, cellular base stations provide data to mobile devices via a "downlink" frequency and receive data from mobile devices via an "uplink" frequency. Due to the expensive costs for leasing radio frequency bands from the government and the substantial capital outlays for base stations, cellular network operators tightly control frequency usage.

Figure 2C:
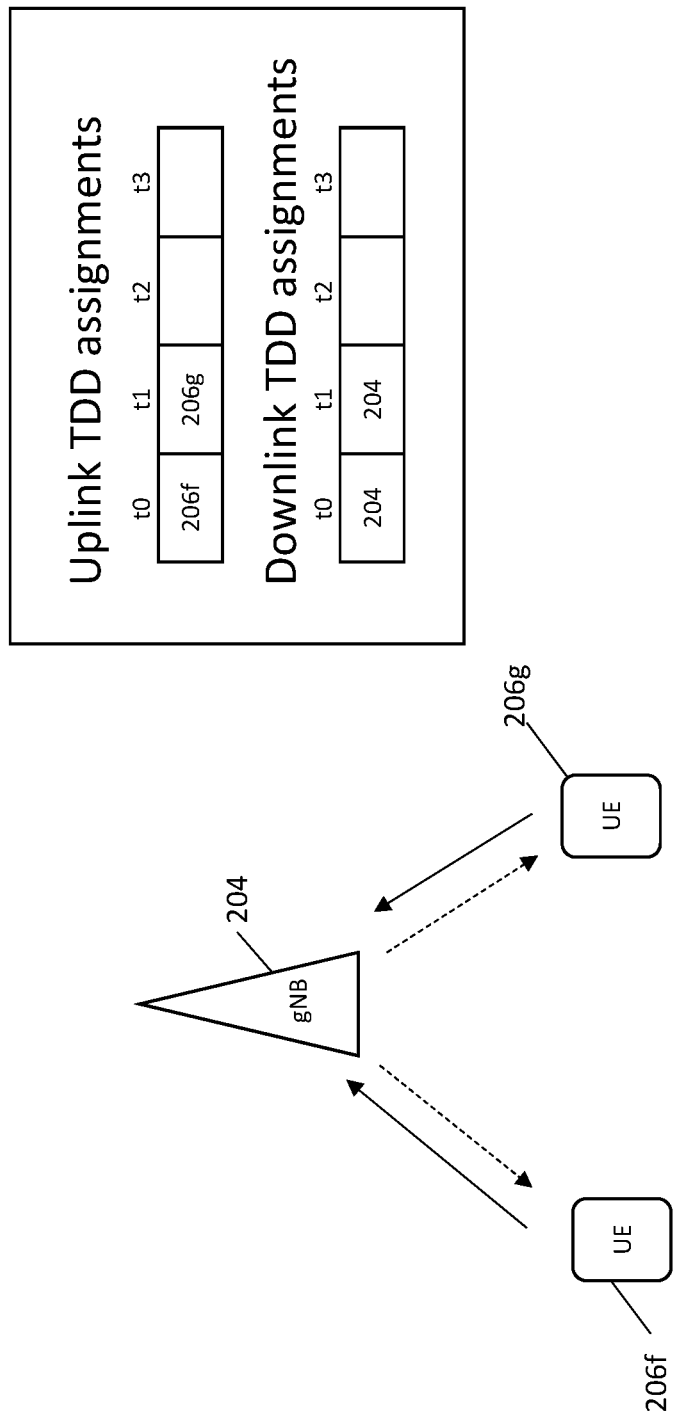
FIGS. 2C-2F are graphical representations exemplary a bidirectional packet exchange, useful to illustrate various aspects of the present disclosure.

FIG. 2C illustrates a bidirectional packet exchange between two UEs. As shown therein, each UE 206 is allocated a time slot. As shown therein, UE 206f and UE 206g transmit their packets during their respective timeslots; thus, UE 206f transmits at timeslot t0, and UE 206g transmits at timeslot t1. The gNB 204 has dedicated resources and can transmit during its any of the timeslots (t0, t1).

Figure 2D:
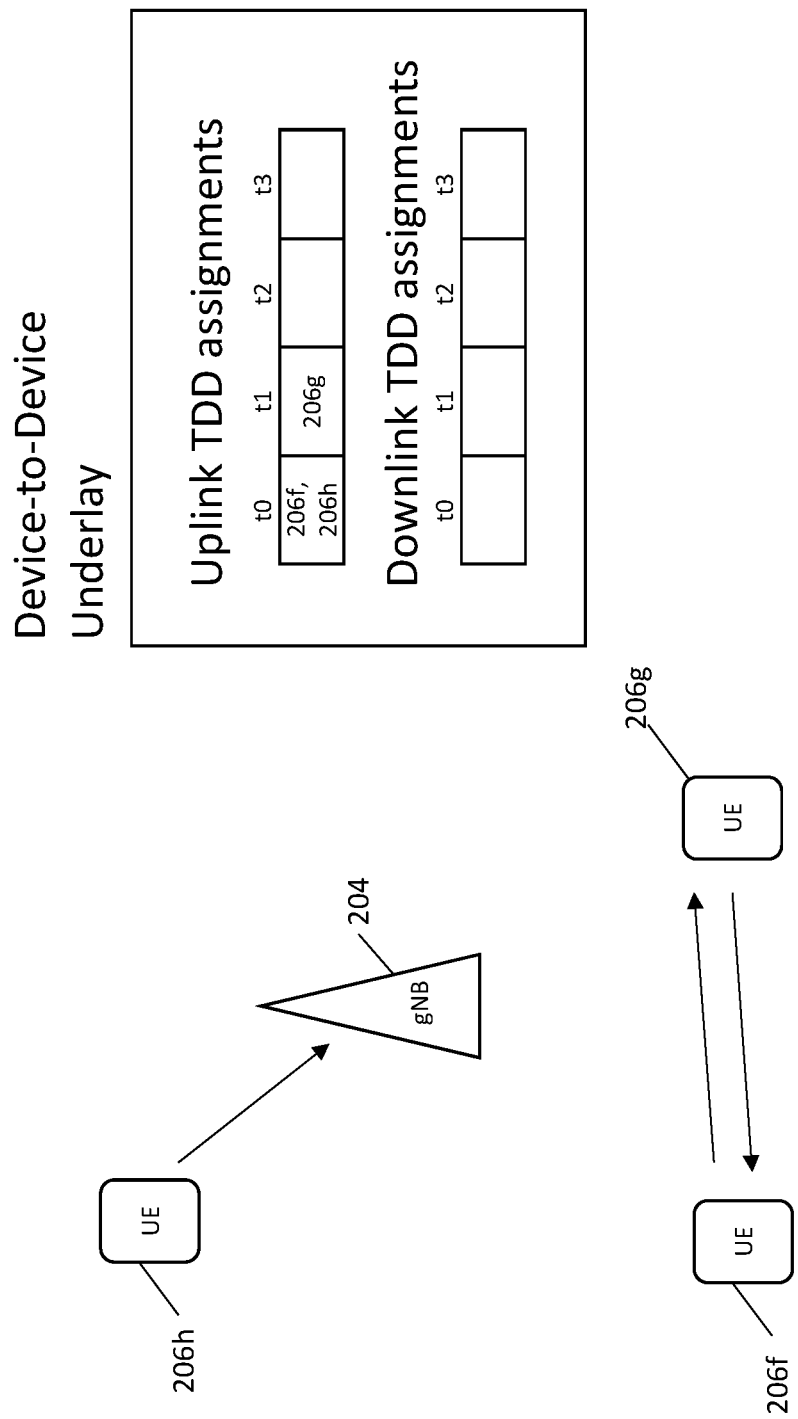

In contrast, FIG. 2D illustrates a bidirectional packet exchange using a D2D "underlay". As shown therein, UE 206f is assigned a first uplink timeslot (t0) and UE 206g is assigned a second uplink timeslot (t1). However, rather than using the timeslots for transmissions to the gNB, UE 206f and UE 206g directly communicate with one another without the benefit of further gNB 204 control. Notably, once the gNB 204 has assigned time slots to the UEs 206, the UEs 206 individually manage their shared resources. In some cases, the gNB 204 can even reuse resources that would otherwise be used to manage UE 206f and UE 206g; for example, by allocating those resources to a different UE (e.g., UE 206h). This style of networking is also referred to as "D2D underlay."

As used herein, the term "underlay" refers to an interfering allocation of resources. In contrast, the term "overlay" refers to an allocation of resources that preserves orthogonality and minimizes interference. Generally, underlay type operation results in worse performance but can be used to support a larger population with "reuse gain" (e.g., resources that would otherwise be reserved can be reused with interference mitigation).

Figure 2E:
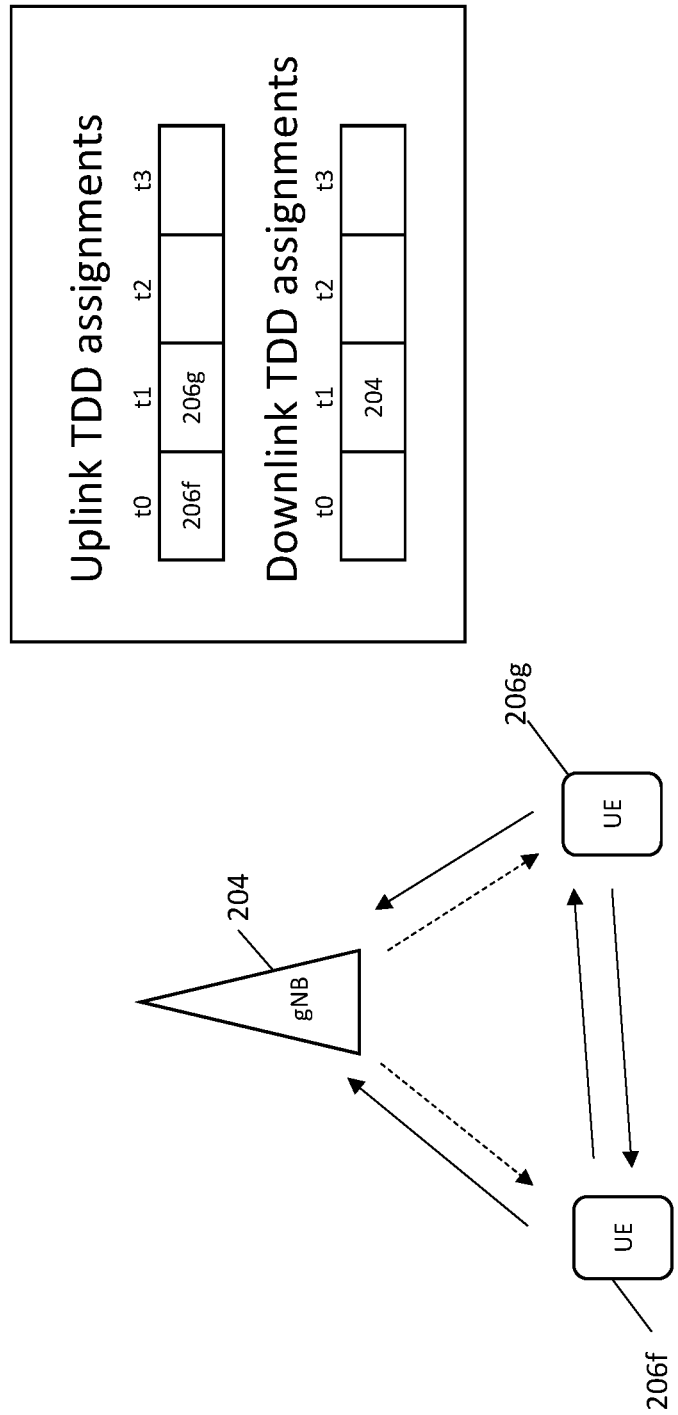

FIG. 2E illustrates yet another network topology where UE 206f, UE 206g, and gNB each broadcast their transmissions. As shown therein, during timeslot t0, UE 206f broadcasts data to both the gNB 204 and the UE 206g. Similarly, during timeslot t1 UE 206g broadcasts data to both the gNB 204 and the UE 206f. Finally, during timeslot t1 the gNB 204 broadcasts data to both the UEs.

Figure 2F:
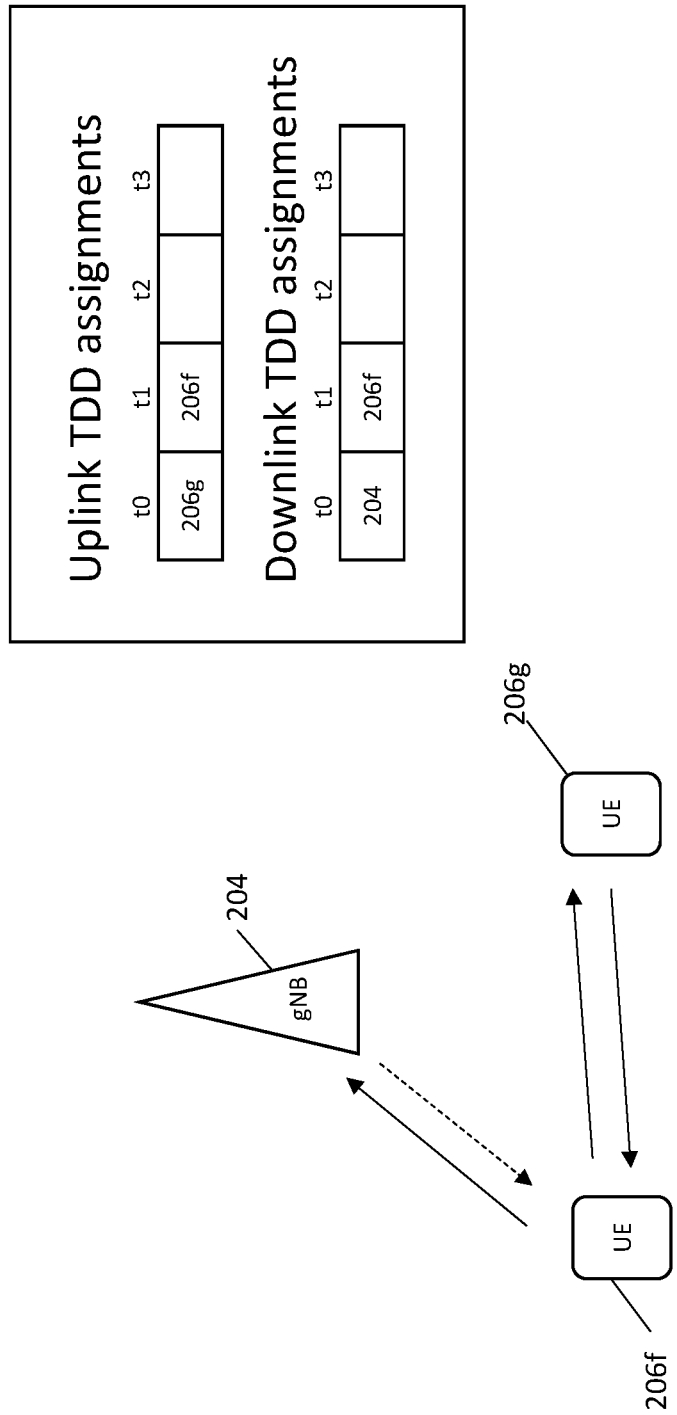

FIG. 2F illustrates a "relay" topology. As shown therein, during timeslot t0, the UE 206g and gNB 204 each transmit data. Then during timeslot t1, the UE 206f transmits on both uplink (toward gNB 204) and downlink (toward UE 206g). Notably, in FIG. 2F the UE 206f uses both uplink and downlink frequency bands (the UEs 206 in FIGS. 2C-2E only used uplink frequency bands).

Artisans of ordinary skill in the related arts will readily appreciate that fog networking entails more than mere improvements to UE device capability. Fog networks are designed to enable communication, computation, and/or storage at the point of the network that is closest to likely use. For example, D2D communications are locally managed, rather than via a central network. Similarly, data is cached nearest to where it is used rather than in the cloud. Moreover, device-specific processing is performed at the edge rather than in the "cloud." More directly, fog networks seek to self-organize in a manner that efficiently enables activity.

Unfortunately, one significant limitation for fog networking is participation rate. Even though centralized network architectures are expensive, ownership for centralized networks can be consolidated and centrally controlled. In contrast, fog networking relies on edge device participation (e.g., user devices, access points, distribution unit apparatuses, routers, and/or other similarly capable devices) in order to provide functionality. Caching content, sharing processing resources, and/or communication bandwidth at an edge device requires that the owner of the edge device agrees to participate. Historically, user participation has failed to achieve widespread adoption for a variety of reasons. For example, some cellular communication networks have attempted to sell picocells to users under the pretense that the user would receive better service at their home; ultimately however, picocells failed because the cellular network maintained control of the deployed picocells and users did not perceive the benefits promised and/or were unwilling to shoulder the cost for a device that would be communally shared.

In view of the foregoing fog paradigm, greater participation by user devices in the fog mesh is desired to improve the overall performance of the network, as more nodes will generally increase the opportunities for fog based operations, as well as expand the amount of storage distributed across the network and provide more options for accessing data (including bulk data, e.g., video files in demand). According to the present disclosure, network operators may provide incentives to encourage users to participate in and contribute to the fog network in exchange for fungible tokens. In other words, such a scheme can dynamically and securely incentivize user devices to share their bandwidth, storage, computational, and/or other resources with other user devices.

Exemplary Ledger Operation—

Various aspects of the present disclosure enable users to opt-in, opt-out, and/or otherwise consent to network participation. User participation may further be recorded as credits and debits of tokens within a distributed ledger system. In some embodiments, the incentive schemes can be dynamically adjusted to increase or decrease user device participation. As described in greater detail hereinafter, crediting and debiting of participation can be performed at the edge of the network (within the fog) without requiring authentication or trust exchanges or other centralized controls.

Figure 3A:
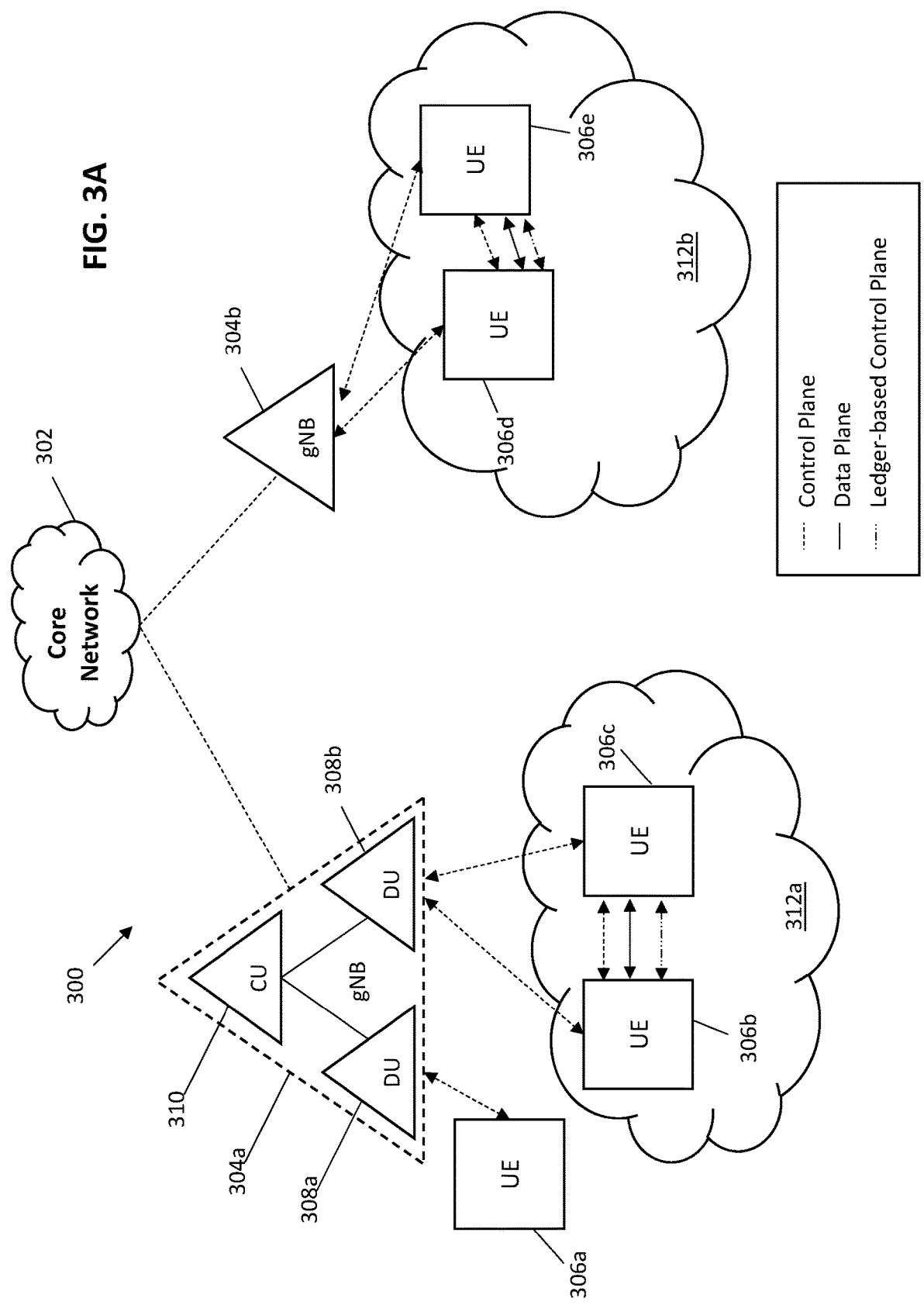
FIGS. 3A-3B are logical block diagrams of exemplary network architectures configured to incentivize and track user participation in a decentralized manner, in accordance with the various principles described herein.

FIG. 3A illustrates an exemplary network architecture 300 configured to incentivize and track user participation in a decentralized manner, in accordance with the various principles described herein. As shown therein, the network architecture 300 includes one of more gNBs 304 and user equipment 306. The exemplary gNBs may be either a singular entity, or may be further subdivided into distribution units (DUs) 308 that are controlled by a central unit (CU) 310. As shown therein, the network architecture 300 further includes two (2) fog networks 312a and 312b.

As shown in FIG. 3A, control and data plane functionality is present and operates in an analogous manner to existing technologies. However, an additional credit/debit ledger control plane is shown for the edge devices (e.g., UEs 306). As will be described in greater detail hereinafter, the credit/debit ledger control plane enables device-to-device (D2D)

data communications for the aforementioned benefits of fog networking, even where there is no centralized network control. More directly, credits and debits can be securely tracked via tokens in a distributed ledger, in a manner which enables fungible crediting and debiting of user device participation.

In various embodiments, network configuration 300 may be used in one or more exemplary embodiments of the present disclosure to enable receipt and provision of Internet access directly from participants of the network, including via gNBs 304 and UEs 306. For example, the UE 306b may stream or otherwise receive requested digital data (e.g., video file) from another UE 306c via a data plane transaction. The requested digital data transaction may be recorded within the distributed ledger; e.g., the UE 306c may be credited with participation tokens, and UE 306b may be debited a corresponding amount of participation tokens.

As another example, one client device may perform computations or provide storage on behalf of another client device in exchange for fungible tokens or any other unit of exchange. For example, UE 306d may compute or process data from another UE 306e via a data plane transaction. The requested computation may be recorded within the distributed ledger; e.g., the UE 306d may be credited with participation tokens, and UE 306e may be debited a corresponding amount of participation tokens.

In some exemplary variants, participation tokens may be fully fungible e.g., there may be no distinction between storing data, computing data, and/or providing bandwidth or other resources. In other variants, participation tokens may be further denominated according to different forms of participation. In some cases, the credited and debited amount may be the same, in other cases, the credited and debited amount may differ. For example, fog computations may be valued differently than fog storage, etc. In some such variants, different denominations of participation tokens may be dynamically exchanged according to fluctuating exchanges. Such fluctuations may enable arbitrage and/or intelligent tradeoffs. For example, some devices may be able to earn storage tokens and trade for processing tokens at advantageous or even profitable rates, etc.

In one exemplary embodiment, the distributed ledger is based on a blockchain. As a brief aside, the virtual domain contains no physical conservation laws. In the physical world, a token of value (e.g., a physical coin) cannot be "double spent". Specifically, Alice cannot give a coin to Bob, and then give the same coin to Charlie because of conservation of matter. In contrast, there is nothing that prevents Alice from sending the same digital token to both Bob and Charlie. "Proof-of-work" (POW) is a virtualized representation of physical entropy (e.g., computational work, memory searches, etc.). A blockchain is a data structure that records accumulated POW; in modern use, blockchains accumulate POW at rates that introduce physical conservation laws into the virtual domain. More directly, a blockchain represents the accumulation of entropy on scales that are physically impractical for malicious parties to attack.

Within the context of fog networks, the blockchain data structure can be leveraged by a community of untrusted peer devices (such as the UEs 306 of the network 300) to transact participation tokens within a common shared ledger of transactions. Referring back to FIG. 3A, participation credits and debits may be tracked and secured with proof-of-work (POW) within a decentralized ledger using the aforementioned ledger-based control plane. The decentralized ledger is maintained and validated through the consensus of the participating devices themselves (e.g., a majority of participants must agree to change the ledger contents), without a centralized network controller. As will be described in greater detail hereinafter, the distributed ledger of participation incentivizes user participation by offering compensation that is fungible and/or transferable to other networks. In some cases, compensation may be further weighted so as to encourage the participants that compete for limited network resources to offer their available resources to others, thereby increasing the enabling greater and faster performance holistically.

Figure 3B:
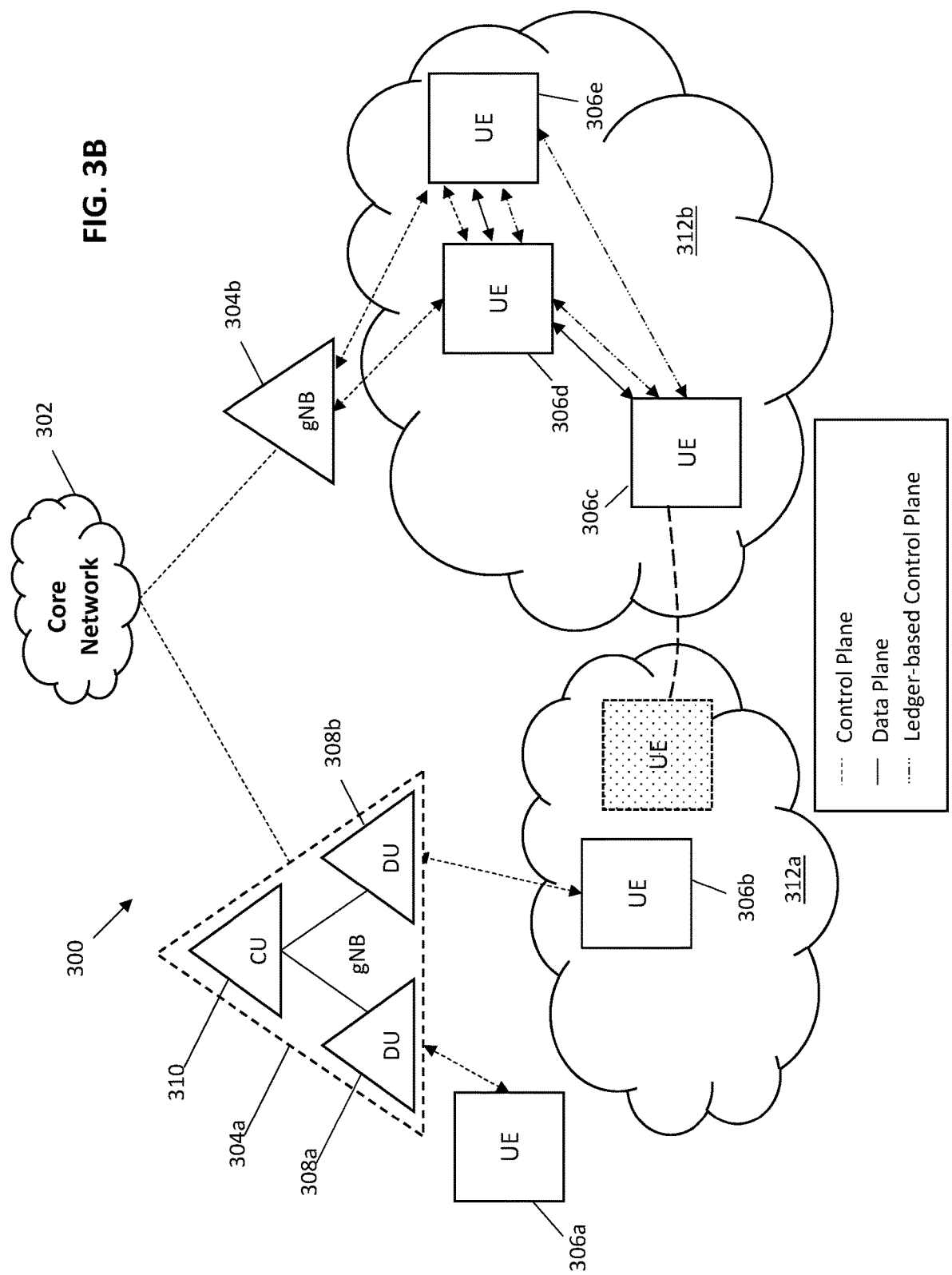

For example, as shown in FIG. 3B, participation tokens can be used when a UE 306c moves from a first fog network 312a to a second fog network 312b. As shown therein, the first and second fog networks (312a, 312b) are logically distinct networks; e.g., a given fog network has a set of participants. Thus, UE 306c must enter the second fog network 312b before it can communicate with any of the second fog network participants (e.g., UE 306d, UE 306e). Even though UE 306c is shown exiting the first fog network 312a for clarity, it is readily appreciated that the UE 306c may concurrently exist in both the first and second fog networks (312a, 312b). In other words, the fluid nature of fog networks may enable (and significantly benefit from) overlapping fog network connectivity which is a significant departure from existing cellular RRC operation (traditional networks only allowed a UE to maintain a single Radio Resource Control (RRC) connection at a time).

As shown in FIG. 3B, once the UE 306c has joined the second fog network 312b via the ledger-based control plane, the UE 306c can use its participation tokens therein. More directly, UE 306c may earn tokens in the first fog network 312a, and spend those tokens in the second fog network 312b. The fog networks 312a, 312b can trust the ledger account even though the UE 306c has neither authenticated and/or authorized itself to the gNB 304b nor the core network 302. For example, UE 306c can receive service via UE 306d, via a relay-type or "tethered" type transaction. This transaction is recorded in the blockchain as two distinct transactions: (i) UE 306d will receive token, and (ii) UE 306c will be debited a corresponding amount of tokens. Both transactions are individually secured with blockchain POW and published to other devices (e.g., a peer device such as UE 306e). Since all participation unit transactions are recorded within a blockchain ledger, neither party can falsify its ledger before the other party has published its ledger elsewhere. More directly, both parties can be assured that the recorded transactions will be honored later because it is practically impossible for the other party to claim otherwise.

Artisans of ordinary skill in the related arts will readily appreciate, given the contents of the present disclosure, that as the number of nodes (e.g., gNBs, UEs) increases within the network, options for data pathways between these entities also increase exponentially. Under centrally managed paradigms, the exponential growth in fog network connectivity is infeasible to manage as the centrally organized network would need to collect information and re-distribute resource allocations.

In contrast, the decentralized schemes described herein enable each node to individually take into account its own individual network considerations. In one exemplary embodiment, each node determines its opportunity cost/benefit based on a then-optimal path and/or resource contribution (e.g., computation, storage, bandwidth, etc.) for its neighbor nodes. The opportunity cost/benefit can be individually determined by each node based on balancing (i) its computational load, (ii) the amount of traffic currently present, (iii) software or hardware capabilities (e.g., inbound/downlink and outbound/uplink bandwidth availabilities, number of simultaneous connections it can sustain, 5G enabled), (iv) any authentication levels required for protected or encrypted data, and/or (v) the level of privacy and level of access allowed, and/or (vi) authorization requirements with the core network (if any), among other factors that will become apparent to those having ordinary skill in the art given the present disclosure.

During decentralized operation, the best or optimal data path will arise as an "emergent property" of communal control (i.e., it emerges from the collaboration of many disparate entities). For example, consider a data transfer that must traverse a fog network via a number of hops. Each network hop corresponds to a portion of the overall fog cost, and each node within the data transfer seeks to minimize its overall opportunity cost and maximize its benefits. Routing parameters are evaluated and exchanged at each hop between the hop participants. As a result, only the nodes having a favorable opportunity cost/benefit will participate in the data transfer; other nodes will wait for other opportunities with better trade-offs. As a practical matter, the reduced network overhead for decentralized control allows for dynamic path selection to occur magnitudes faster than what would be possible with a centrally organized network.

Exemplary Ledger-Based Control Plane—

In one exemplary embodiment, a ledger-based control plane can be used to initiate data plane transactions without the control plane. More directly, various aspects of the present disclosure only require the data plane and associated layers for device-to-device (D2D) transfer. These layers include e.g., the Packet Data Convergence Protocol (PDCP) layer, the Radio Link Control (RLC) layer, the Medium Access Control (MAC) layer, and the Physical Layer (PHY). However, centralized network control layers may not be available e.g., the Radio Resource Control (RRC), thus various embodiments of the present disclosure further envision a device-to-device (D2D) RRC layer that relies on a blockchain ledger.

As a brief aside, the Radio Resource Control (RRC) layer is typically used to control connection status in 3GPP networks. Specifically, the major functions of the RRC protocol include connection establishment and release functions, broadcast of system information, radio bearer establishment, reconfiguration and release, RRC connection mobility procedures, paging notifications and some limited power control. The RRC protocol is used by the network to configure the user and control planes according to the network status so as to implement various Radio Resource Management strategies.

Figure 4A:
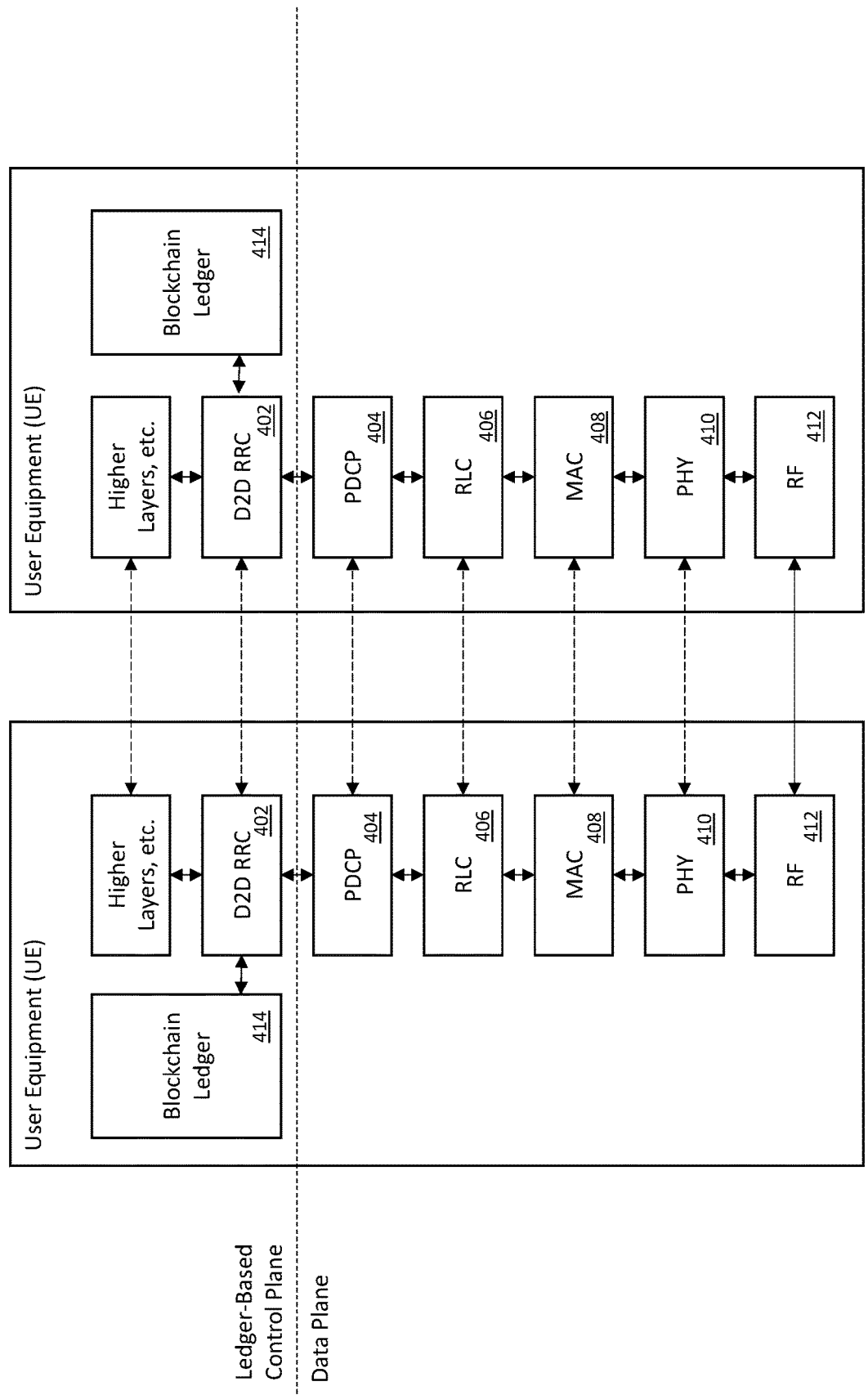
FIGS. 4A-4B are logical block diagrams of communication stack protocols configured to incentivize and track user participation in a decentralized manner, in accordance with the various principles described herein.

FIG. 4A is a logical block diagram of one exemplary device-to-device (D2D) 3GPP communication stack protocol 400. As shown therein, the 3GPP communication stack of one UE communicates with the communication stack of another UE using at least the following layers: the D2D RRC layer 402, the PDCP layer 404, the RLC layer 406, the MAC layer 408, the PHY layer 410, and the RF layer 412. Additionally, the D2D RRC layer 402 has access to a distributed ledger 414 of credits and/or debits. In the illustrated embodiment, the distributed ledger is locally stored; in other embodiments, the distributed ledger may be accessible e.g., via an external drive or other interface.

In one exemplary embodiment of the present disclosure, the D2D RRC layer 402 is configured to enable two or more devices to establish a radio resource control (RRC) connection between one another independently of the control plane. More directly, rather than relying on a gNB to allocate radio resources for devices via traditional RRC connections, mobile devices can flexibly share their frequency allocations to e.g., perform various fog networking functionality. When fog networks are sufficiently isolated from nearby cellular traffic, they can communicate via D2D underlays (leveraging frequency reuse in isolation to minimize network interference). Resource allocations can be tracked within the distributed ledger 414 thereby ensuring that the devices are appropriately credited/debited once the device rejoins cellular network provider coverage. Similarly, when the fog networks are connected in whole, or in part, with existing cellular networks they can aggregate and internally manage the resource allocations of their UEs. For example, the time and/or frequency resources of one UE can be used to augment another UEs resource allocations (with appropriate credits and debits).

In one exemplary embodiment, the D2D communication stack is distinct from the existing 3GPP communications stack (e.g., a 5G 3GPP communication stack). In other embodiments, the D2D communication stack is subsumed or otherwise integrated within the 3GPP communication stack. Integrated implementations may enable coexistence type operations and/or enable concurrent operation between e.g., a D2D communication stack and a 5G 3GPP stack. In one exemplary variant, the D2D RRC layer 402 is distinct from the RRC layer of existing 3GPP communications stacks. In other variants, the D2D RRC layer 402 is a portion of (or subsumed within) the RRC layers used for other communications (e.g., a D2D RRC subsumed within a 3GPP RRC layer).

The ledger-based control plane packets are interpreted by the D2D RRC layer 402 to control the connection status in a fog network and/or with a peer device. Specifically, the major functions of the D2D RRC protocol include, without limitation: reception of a data structure that identifies services and/or capabilities of the fog network connection, fog network connection establishment and release functions, and paging notifications from other devices.

The PDCP layer 404 controls lower layers (e.g., the RLC layer 406, etc.) to send and receive data. The PDCP layer 404 packs and unpacks data into/out-of PDCP data packets that are transacted with the D2D RRC layer 402. The PDCP packets may include a variety of information and/or include data plane packets, control plane packets, etc. In the exemplary embodiment, the PDCP packets may include ledger-based control plane packets. The D2D RRC layer 402 may discover the presence of a nearby peer device and/or a fog network via notifications from the lower layers (e.g., PDCP 404). Additionally, the D2D RRC layer 402 may broadcast its own presence to nearby peer devices and/or a fog network via the lower layers. In some cases, the D2D RRC layer 402 may additionally perform authentication and/or authorization with the nearby peer entities; in other variants, no authentication and/or authorization process is performed.

Successful discovery of the nearby peer device and/or fog network may result in the transfer of a data structure (e.g., a "manifest") containing services and/or capabilities that the device can access and/or provide via the peer device and/or fog network. For example, the manifests may identify locally cached data, computational capacity, and/or network bandwidth (to e.g., an external Internet). These manifests are provided to higher layer software (e.g., user applications, networking stacks, operating systems, etc.). In addition to, or included within, the manifest, the device may also receive a listing of various participation unit pricings. For example, the device may receive various unit pricings for sharing data, compute, and/or bandwidth. In some cases, the participation unit pricing may be specific to the fog network (for example, the participants of the fog network may set a flat rate for all data transfers), alternatively the pricing may be specific to the devices of the fog (e.g., a participant may have cheap access to the memory, but would like to off-load processing burden, etc.).

More generally, the device receives a data structure that identifies the various opportunity costs and benefits associated with service provisioning in the fog network. In some cases, such information may be provided within existing RRC messaging. For example, manifests may be provided within a System Information Block (SIB) that is broadcast, multicast, or unicast via the fog network to new participants.

In some embodiments, manifest information is not explicitly delivered but may be inferred from the shared blockchain ledger 414. In some variants, the blockchain is a public record of all fog network transactions which is openly viewable. For example, a device can inspect the blockchain record for peer device transactions which could be of interest (e.g., a recently consumed video, website, and/or music, etc.) In these examples, the device may be able to request the data of interest from the peer device under the assumption that the peer device may have a locally cached copy.

In other variants, the blockchain is a public record of all fog network transactions that have been anonymized and/or otherwise encrypted. Under such an implementation, the device may receive a key from the peer device, that allows the device to review the peer device's blockchain transactions (or a subset thereof). Under such implementations, each device maintains control of their privacy and can dynamically adjust the visibility of their transactions to peer devices of the fog network.

Unlike traditional RRC connections which are singular and generally provide service for any data access request, the fog network may support multiple D2D RRC connections manifests for multiple devices and/or fog networks may be stored. Multiple manifests can enable a device to intelligently determine which nodes of the fog network can provide the best service for its requests. For example, one peer device may have locally cached content of interest and/or large amounts of storage memory but another peer device may have access to external internets, each of which may be requesting and/or charging different participation tokens.

Once the device has a manifest of services and capabilities, the higher layer software can request and receive provided service from a peer device of the fog network. Similarly, responsive to a paging request or notification from another device's higher layers requesting services, the device can determine whether or not the device can provide service to the peer device of the fog network. In particular, the device can determine according to its current credit amount whether or not it should procure more tokens, or alternatively consume tokens for services. As previously noted, the device may consider many factors in deciding whether or not to participate. For example, the opportunity cost/benefit analysis may balance (i) its computational load, (ii) the amount of traffic currently present, (iii) software or hardware capabilities (e.g., inbound/downlink and outbound/uplink bandwidth availabilities, number of simultaneous connections that it can sustain, 5G enabled), (iv) any authentication levels required for protected or encrypted data, and/or (v) the level of privacy and level of access allowed, and/or (vi) authorization requirements with the core network (if any).

When the device determines that it would like to participate in the fog network (e.g., via either providing or consuming services or data), it generates a record of the transaction and associated blockchain POW. This record is proposed to other members of the blockchain community (e.g., the fog network) as a new block to be added. When enough members of the blockchain community have agreed to the addition (consensus), then the block is added to the blockchain ledger. Once the block has been added by the fog network community, the services can be procured or consumed.

The foregoing discussion of FIG. 4A is presented in the context of 3GPP cellular communications stack architectures. However, the various principles described therein maybe broadly applied to a variety of other technologies. For example, FIG. 4B illustrates an alternative implementation useful within IEEE communication stack architectures commonly used in e.g., IEEE 802.3 Ethernet, IEEE 802.11 Wi-Fi, and IEEE 802.16 WiMax technologies.

As a brief aside, the IEEE communication stack eschews the security and ciphering functionality of e.g., the 3GPP PDCP layer, relying instead on higher layer software agents for this functionality (if required at all). Similarly, the radio bearer management functionality provided by the 3GPP RLC handles radio link control; such functionality is subsumed by the technology specific IEEE MAC, etc. While the IEEE communication stack divides communication stack functionality differently than 3GPP communication stack, artisans of ordinary skill in the related arts will readily appreciate that many of the underlying capabilities and functionalities of the communications stack are present in both technologies.

Figure 4B:
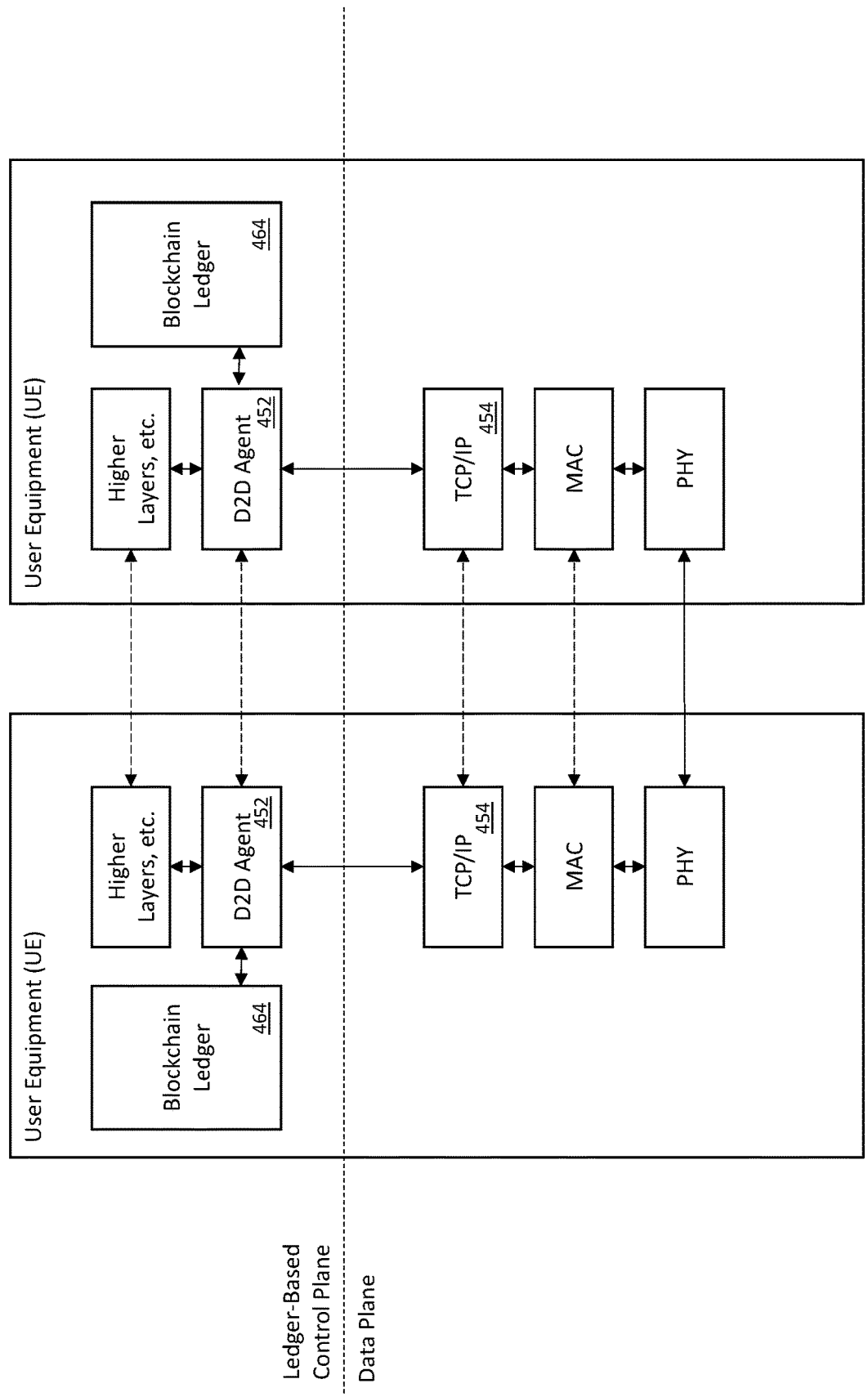

As shown in FIG. 4B, the communication stack includes: the D2D Agent layer 452, the TCP/IP layer 454, the MAC layer, the PHY layer. Additionally, the D2D Agent layer 452 has access to a distributed ledger 464.

In one exemplary embodiment, the D2D agent layer 452 can be implemented as a software agent over existing IEEE communication stack. Unlike the foregoing 3GPP communication stack of FIG. 4A, the IEEE communication stacks assume some degree of contention based access, and are not subject to the same resource planning and allocation issues as is commonly used within 3GPP networks.

As shown therein, the TCP/IP layer 454 controls lower layers to send and receive data using TCP/IP packets. The TCP/IP layer 454 packs and unpacks data into/out-of TCP/IP and presents the data in buffers associated with a "network socket" for the D2D Agent 452. The D2D Agent 452 can read and write data without any consideration of the underlying networking technology (e.g., IEEE 802.3, IEEE 802.11, IEEE 802.16, etc.) In one exemplary embodiment, the D2D Agent layer 452 may include ledger-based control plane data to open and/or transact data through, or on behalf of, a peer device.

As previously described, the D2D Agent layer 452 receives a data structure that identifies the various opportunity costs and benefits associated with service provisioning in the fog network. In some cases, such information may be provided within existing IEEE messaging. For example, manifests may be provided within an Information Element block (IE) that is broadcast, multicast, or unicast via the fog network to new participants. Once the device has a manifest of services and capabilities, the higher layer software can request and receive the provided service from a peer device of the fog network. Similarly, responsive to a beacon or other signaling from another device's higher layers requesting services, the device can determine whether or not the device can provide service to the peer device of the fog network.

Still other communications stack architectures maybe substituted with equivalent success by artisans of ordinary skill in the related arts. For example, other networking technologies may provide higher level connectivity (e.g., via secure tunneling at higher layer software) or even lower level connectivity (e.g., via MAC and/or data link layer signaling such as Ethernet frames). In fact, blockchain technologies are inherently error-tolerant and could be modified to operate even with very low reliability connections; for example, a device may re-submit failed transactions, corrupted transactions and/or transactions that were never received.

The foregoing discussions have described how user participation tokens may be credited and/or debited within a blockchain ledger for various communication technologies. Once the user participation is recorded within the blockchain, other parties can rely on the blockchain ledger as a trusted history of the user's participation even without having ever authenticated the user. In other words, the blockchain ledger can be used to provide a trusted account of the user's participation in the fog network's activity, without any knowledge or requirement from the user. For example, the user's participation can be inspected at a later point by interested parties (such as a network provider or another fog network) to provide the user with appropriate compensation.

The following discussions are provided with regard to specific advantages and benefits of fog network participation.

Opting In & Out of Participation—

A user of a client device (e.g., mobile user device, user equipment) within a 5G-enabled direct peer-to-peer network may have concerns about power usage and/or security. That is, the user may not want anyone else in the mesh to use the device's resources (computational, bandwidth, etc.) because it will burden the charge level on the battery that could be used for the user's own usage. Similarly, the user may not want anyone else in the mesh to access the device for security reasons.

Previous attempts to encourage user participation have been based on a mandatory required participation. For example, one such solution used by private torrent tracker websites give their users credit for uploading data via a personal computer, and impose a ratio requirement for the user to stay a member of the private website. A user of the private website must maintain a minimum upload/download ratio (e.g., 0.6) to be in good standing and continue to have access to exclusive torrents. This incentivizes the user to allow other users of the private tracker to download from him, while limiting his own downloads to meet or exceed the ratio requirement.

However, the foregoing mandatory participation scheme has several problems. For example, verification of crediting and power consumption are centralized and not under the user's direct control. For example, an untrustworthy administrator of a private tracker may arbitrarily adjust a user's ratio, or the tracking system may fail to detect the correct amount of upload traffic from the user and thereby fail to credit the user properly. Additionally, "torrenting" files is generally performed in conjunction with regular usage of the PC; this degrades the user's performance. Moreover, allowing the PC to torrent when it is not being used by the user is a significant power burden. Furthermore, torrent credits are only limited to bandwidth contributions within a specific community of users and are not fungible or usable in other communities or networks of users.

One solution to unwanted power consumption and privacy concerns is that users may directly opt in or out of participating in the D2D fog ("mesh") network. In one embodiment, a user or subscriber to a network operator may be given an option to log into an account profile (e.g., on a mobile application acquired from the network operator, DU, or wireless service provider) and disable participation in the mesh. Opting-out would resolve power and privacy concerns; however, the user also would not gain access to advantageous speeds and latency provided by the fog network.

In one variant, the user opts-in by default, and the user must opt out manually. Default opt-ins would raise participation levels and allow the mesh to operate more efficiently with more users participating. In another variant, the user may opt into the mesh to participate in the fog network and gain its benefits. As noted above, these benefits may include faster data rates and lower latency. In addition, the user may have the opportunity to earn credits toward their bill, or even make additional monetary rewards on top of that.

Incentivization Schemes—

A wireless service provider typically charges a recurring fee based on the type of services provided to the user. Network service providers have previously tried to compensate users for altruistic behaviors. For example, network service providers might incentivize altruistic fog network participation, only if the user's client device was open to receiving and sending traffic between other client devices in the vicinity. Given the unpredictable nature of network usage, such schemes could be easily fooled by users using third-party accessories that physically prevent radio waves from entering or leaving the client device. In other words, network service providers could not verify whether or not they were receiving the benefits of their bargain with the user.

In contrast, the distributed blockchain ledger scheme provides the concrete proof that the user has provided services to other users. Consequently, the service provider can reliably charge its customers based at least in part on how much or how little bandwidth the customer contributed back to the fog network according to the blockchain ledger. In particular, the wireless service provider can review the blockchain ledger once a month (during the billing process) and extract the user's credits and debits. The resulting credits and debits can be used to adjust the user's bill.

For example, a client device that is configured to allow other devices to access its resources (e.g., as an intermediate node to another device, as a partial storage space, for processor cycles) may gain monetary credit toward the user's bill. Greater participation may translate to greater credits (i.e., reductions of bill), while a non-participant's bill would remain as is normally charged. In another example, the participating user may gain access to premium features from the service provider (e.g., additional email accounts, mobile bandwidth, enhanced voicemail), or priority to certain services or content (e.g., exclusive or paid video content). In one variant, tokens may also be gained for access to exclusive features such as those noted above; that is, access to exclusive features may be on a temporary basis as long as tokens remain. In another variant, multiple levels of access to premium or exclusive features may be granted on the basis of the amount or length of token held by a user's account. Each level could grant a user access to different tiers (having e.g., varying data rates or amount of bandwidth) or different types of service. In another variant, the service provider may require the user to have met a quota in a previous billing cycle to grant access to at least some of the premium or exclusive features.

In one exemplary embodiment, the customer or user may acquire monetary compensation or tokens, alternatively or in addition to saving a portion of the bill as described above. In this model of user incentivization, the user receives monetary compensation in exchange for resources (bandwidth, computational, memory, etc.) provided to the mesh network. In fact, the more the user can contribute, the more the user makes in financial gains, capped only by the demands of the network. These financial gains may be acquired in cash currency (e.g., dollars), tokens that may be exchanged for the products or services that are normally accessible through purchase from the service provider (such as those described above), or tokens that may be exchanged for services from other users of the network (as will be described elsewhere below).

In one variant of the above embodiment, the user participates as a dedicated node in the mesh infrastructure, effectively acting as a base station (acting as, e.g., a small cell or femtocell) in an area that has sparse coverage. Particularly useful implementations would include a user premise or an office environment where a client device stays in one location (at least for periods of time, e.g., during work time) or is installed into the premises itself. Another variant may involve a user who carries a mobile device "on the go" equipped with sufficient power (e.g., multiple battery packs) wherever they may be.

In one exemplary embodiment, users may optionally set a threshold participation fee during times of heavier network demand, which may vary the amount of tokens or earnings associated with participation during those times. In other words, the user may only choose to participate when it is "worth his while." In one variant, automatic price changes may be determined by the user device, other user devices, or a managing entity of the network (e.g., DU, CU, core entity) based on the device's capabilities, available bandwidth, reliability, proximity, etc. Similarly, in some embodiments, the network operator may ratchet up/down compensation to adjust the fog network activity. A hybrid approach may be taken, where the community of users and the network operator may each set threshold prices, and the fog network will settle on an equilibrium point for the cost/bandwidth market.

In various embodiments, a user can limit fog network participation depending on the status of the client device with respect to power usage, radio usage, rate of charging, hardware or software capabilities, position or mobility of the device, criticality or popularity of data, the network to which the device is subscribed, etc. For example, the client device may be set to not participate in a peer-to-peer fog network if, at a given time, the client device is using an inefficient or undesirable radio configuration. Examples include a wireless protocol with a modulation and coding scheme below a predetermined threshold, 3GPP-based traffic is using an undesirable QCI (QoS Class Identifier), the spectral efficiency of the radio waves below a threshold, or the client device is too far away from another node (e.g., another client device, a network node or base station). In one implementation, the client device may stop broadcasting its SSID (service set identifier) to advertise its presence on the network. In another implementation, the client device may throttle its data rate. In another implementation, the client device may disable peer-to-peer 5G communications and instead "downshift" to another 3GPP-based protocol (e.g., 4G LTE) or WLAN.

In some implementations, criticality or popularity of the data may also be considered. For example, the client device may prioritize offloading any critical or popular data to another client device upon detecting a battery level below a threshold. In another implementation, the online state of the client device (e.g., user shuts down the client device) or the radio communication protocol it is switching to (e.g., disabling all 5G communications and enabling Wi-Fi only) may be taken into account as well. If the user attempts to turn off the device or disconnect from the mesh for any reason, the device may immediately force critical or popular data to be offloaded to any available nearby nodes. In some cases, the device may prompt the user to offload before proceeding with the shutdown. Forced offloading may last a short period of time (e.g., one second) dedicated to offloading critical data before the client device actually turns off or disconnects. In some variants, data may be offloaded to a fog network which relays (possibly at a later time) the data to cloud-based backup drives. This advantageously introduces redundancy to critical or popular data even under very low coverage scenarios.

In a different implementation, the rate of charging may be taken into account. A client device may be not charging, slow charging (e.g., plugged into a USB slot of another device such as a laptop, plugged into a mobile power source such as a cigarette lighter of a vehicle, using an inductive charger), or fast charging (e.g., plugged into a socket on a wall). A client device may thereby scale its participation level according to the rate of charging, which is indicative of reliability of power. For instance, a client device that is plugged into the wall may participate in the fog network more than a client device that is not being charged, assuming all other factors are equal.

In some embodiments, participation of the client device in a fog network may depend on hardware or software capabilities of the client device. A device having a higher processing power or memory may be more suitable for participation given its ability to relay or store data more effectively than another device with less of such resources. Examples of capabilities that a client device or a controlling network entity may examine to determine participation include, but are not limited to, memory capacity (e.g., size of DRAM or processor cache), processor capabilities (e.g., number of cores, clock speed), number of antennas on the device, and type or version of operating system or kernel (i.e., newer OS may have more features or efficient code).

In one embodiment, participation of the client device may depend on the position or the mobility (change of position) of the client device. In one such variant, if the client device or the fog network determines that it is moving (based on GPS signals, accelerometer readings, roundtrip transmission times with a network entity, etc.), the client device or the fog network may then determine that the device should not participate (or limit participation) as a node in the network. That is to say, a handover to another network or another base station may be necessitated soon, and hence, the device is less valuable to the fog at that point in time. In another such variant, the client device may have a higher value as a node based on where the device is moving to. For example, if the device is moving to a low-density area where there is a relatively lower concentration of 5G-enabled nodes, then the device may be highly valued to increase coverage there. On the other hand, if the device is moving to a high-density area, its presence is less valuable since there may already be a sufficient number nodes (5G-enabled client devices, base stations, etc.) within the fog network. What the client device or the service provider considers to be a sufficient number of nodes may be determined by a predetermined or dynamically set number based on, e.g., the quantity of 5G-enabled nodes detected within a vicinity of the client device (based on, e.g., quantity of SSIDs detected by the client device), and/or the quantity of nodes detected in an area managed by a network entity (e.g., a DU may monitor which devices are in vicinity of its service range, or a set of GPS signals collected from the vicinity matching devices registered with the service provider). The dynamic threshold may be changed depending on time of day, level of demand for bandwidth or storage needs, demand for computational resources from participating client devices, etc.

In another example, the value of the client device may increase in response to a determination that the device is moving to or away from an area where its content is needed. For example, the current network may determine that its client devices should download the high-demand content before the moving client device leaves the network. Alternatively, the network that the client device is moving toward may require additional copies of the high-demand content and thus place higher value on the client device that is arriving from a different network.

In yet another variant, the client device may consider its subscription to (or subscription level of) the network service provider. In one implementation, if a given client device has a choice between an in-network connection (i.e., another client device that is also a subscriber of the same network as the given client device) and an out-of-network device subscribed to another managed network operator, the given client device may prefer the in-network connection due to preferential treatment by its own service provider. Alternatively, the device may be incentivized to use the out-of-network device to e.g., offload congestion from the current network.

It will be appreciated that the various foregoing factors may be considered individually or considered together in any desired combination. In some embodiments, the client device may have access to software (e.g., mobile application, operating system) configured to manually toggle some or all of each factor by a user. In other embodiments, the client device or a network entity (core network component, CU, DU, etc.) may automatically consider one or more of the aforementioned factors based on the needs of the user and/or the peer-to-peer network.

A user of a direct peer-to-peer 5G network (via a wireless service provider) may have reasons other than pure compensation to participate in the 5G network. More specifically, while one user may be incentivized by lower bills, gaining of tokens, access to premium privileges, etc., another user may move in response to charitable causes, benefit to another, relief and aid, high-demand events, etc. while paying the full bill to the service provider.

For example, in one embodiment, the user may have an option to donate the difference between the full bill amount and the amount the user would have saved via one or more of the incentive mechanisms described above. The user may choose to automatically deliver some or all the difference in amount to a charity or an organization; the service provider may transfer the amount on the user's behalf.

In another embodiment, a user may select to enable connections from other 5G-capable peer client devices in the network during times of urgency, such as a natural disaster, emergency, or other events that call for immediate connectivity. In some variants, enabling during urgent situations may be toggled automatically upon particular situations. For example, when an AMBER Alert™ is detected within a set radius around the client device of the user, the device may allow connections to be made with other devices in the network so as to enable exchange of data where it may otherwise not occur (e.g., in remote locations without a robust wireless infrastructure, e.g., highways, rural areas). As another example, during events of natural disasters that limit traditional access to communications (e.g., phone lines or cell towers are damaged), the client device may allow connections with peer client devices so as to facilitate rapid communication with responders and others in the vicinity.

In another embodiment, a client device may provide an option (via, e.g., an application running on the client device, or the operating system of the device) to participate in the fog network with no incentive. In the modern information economy, many users derive a sense of contribution from participating. Wikipedia™ is one well-known example of volunteer users (many of whom are anonymous) consolidating their knowledge, expertise, and niche insights into a wealth of information accessible by anyone with an Internet connection. Similarly, online gamers are often drawn to games that have social proof, such as a robust community or following or number of players on a server. Likewise, a user may choose to participate in the fog network simply for the sake of participating or for some other non-monetary benefit, especially in networks that have a large number of users. In other words, a service provider may simply provide an option to participate in a peer-to-peer 5G network without providing any incentives as discussed previously, as long as the user received other benefits including significantly faster data rates and lower latency attributable to the participation of the user in the mesh.

In another embodiment, a service provider may implement a type of "gamification" in which users are incentivized by social proof. Consider the Google Local Guides™ review and recommendation program, which allows users to earn points, badges, and levels for contributing information to publicly accessible tools and databases accessible via the Google Maps™ mapping service, such as images or helpful or missing information about an establishment. Exemplary incentives for participating in fog networks according to the present disclosure may include virtual "badges" or "achievements" or other types of rewards that are earned through participation and actions performed over the network (e.g., providing a certain amount of bandwidth, storage, computational power, etc.). As will be further described below, fungible virtual tokens (or other countable units representing an exchangeable value among users of the network) may be generated and accounted for each user by a decentralized ledger that requires, among other things, "proof of work" performed for other users and devices in the fog network.

Decentralized Ledger Data Structures—

Fog networks ideally enable numerous devices to connect to any number of other peer devices in a variety of different transaction types. Consequently, the decentralized ledger data structure must flexibly record user transactions without any centralized management scheme. Thus, in one exemplary embodiment, the decentralized ledger data structure is a blockchain ledger.

As used herein, a "blockchain" refers to data structure that is composed of a chain of records that are encapsulated in "blocks." Each block includes the data record and a proof-of-work (POW) which requires entropy to generate (e.g., processor work, memory searches, bandwidth, etc.). Records cannot be changed without also changing the corresponding POW, thus the chained POW accumulates entropy on scales that are physically impractical for malicious parties to attack. In one exemplary embodiment, a copy of the blockchain is individually held by each member of a community of pseudonymous parties without a trusted authority (e.g., a server).

Figure 5:
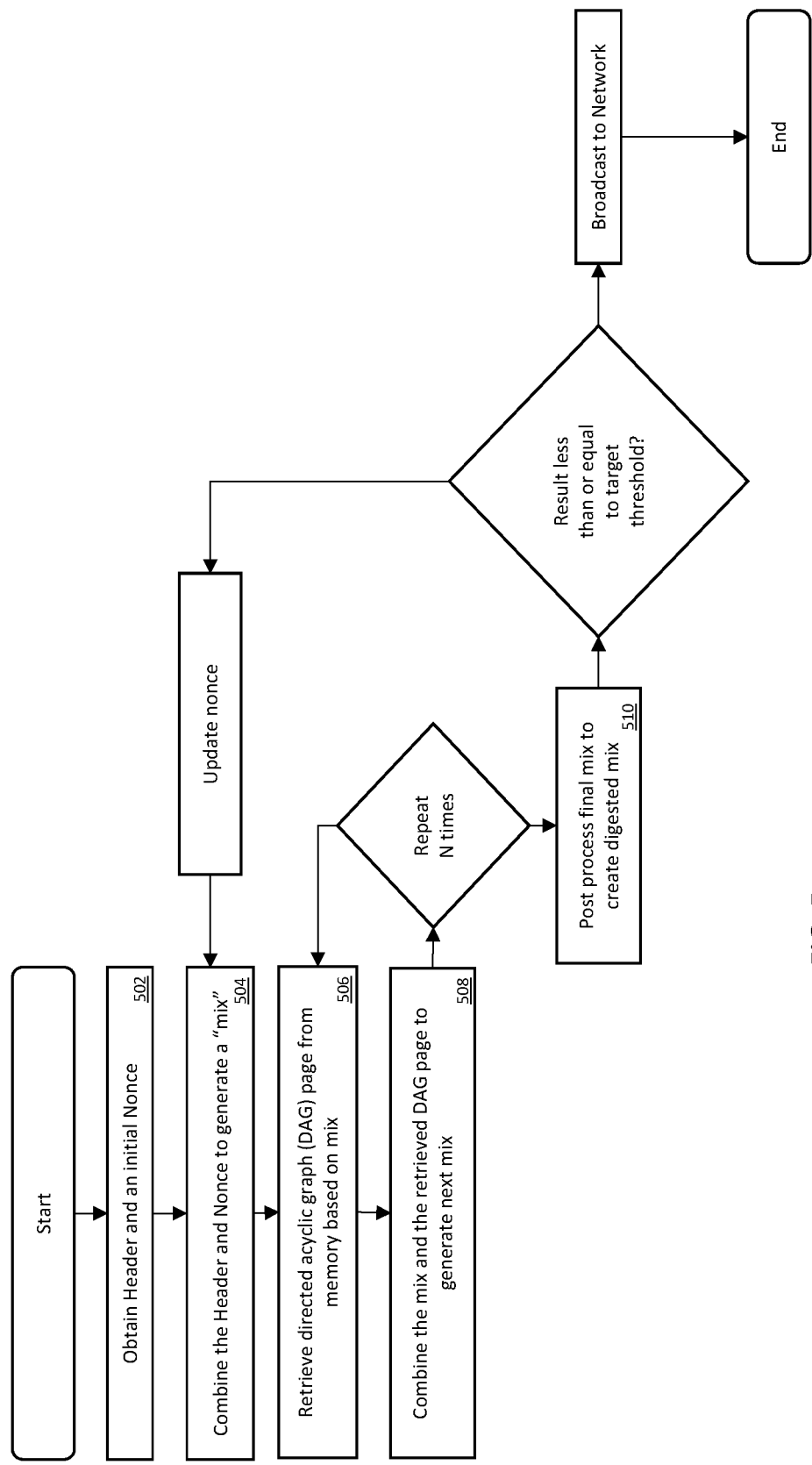
FIG. 5 is a logical flow diagram of an exemplary method for "memory hard" proof-of-work (POW) mining, useful to illustrate various aspects of the present disclosure.

In one exemplary embodiment, the blockchain is "memory hard". FIG. 5 is a logical flow diagram of an existing method for "memory hard" proof-of-work (POW) mining.

At step 502, the device (or a POW "miner" for the device) generates a short binary blob (binary large object) "nonce"; a nonce is data that is only used once (e.g., to avoid playback type attacks). Within the context of the present disclosure, the nonce serves as an input to a mixing process and algorithm. The device combines the nonce with unique header metadata (including timestamp and software version) derived from the latest block of the blockchain. A hash algorithm is used to combine the pre-process header and nonce to create an initial "mix" (step 504).

At step 506, the mix is used to identify a page to retrieve from memory based on a specific directed acyclic graph (DAG). As a brief aside, a DAG provides a pseudorandom memory data set that is computationally straightforward to generate. The DAG dataset is generated as a linear function of the blockchain length, and is regenerated periodically (a so-called "epoch"). Retrieving memory pages from the DAG stored in memory is physically constrained by memory bandwidth; thus, the periodically changing DAG provides a source of memory hardness.

Referring back to FIG. 5, once the page is retrieved from the DAG, it is combined with the initial mix, yielding a new mix (step 508). The new mix is then utilized to identify another DAG page to retrieve. Once that new DAG page is retrieved, it is combined with the new mix to generate yet another mix. This process is performed N times (e.g., 64 times, etc.). After the mixing, the resulting mix is then post-processed to generate a digested mix (step 510).

The digested mix is compared against a predefined target threshold. If the digested mix is less than or equal to the target threshold, then the current nonce is considered valid, and can be broadcast with the header as a POW to the network. If the target threshold is not met, the current nonce is considered invalid, and the algorithm is re-run with a different nonce (either by incrementing the current nonce, or picking a new one at random).

While not expressly shown in FIG. 5, it should be emphasized that searching for a nonce and header combination that will result in a digested mix that satisfies the target threshold may require many attempts; in other words, searching for a valid nonce requires a substantial amount of physical entropy in the form of memory bandwidth. However, once a nonce is successfully found, any peer entity can straightforwardly verify that the nonce indeed results in a value that satisfies the target threshold, by checking that the header/nonce combination and DAG lookups to generate the digested mix. Moreover, since each header and nonce combination can only be used once, the algorithm ensures that only new nonce searches can be added to the blockchain.

While the foregoing discussion is presented in the context of memory hard POW, other forms of POW may be substituted with equal success. For example, a processor hard POW may chain hashed data blocks. As is known in cryptography, a "hash" is a one-way function that takes an input and returns a fixed string. The one-way hashed data is, by design, infeasible to invert back to its original form (to be distinguished from "encryption," where encrypted data may be decrypted back to plain data using a decryption key). That is, it is relatively easy to calculate a hash for a given piece of data but extremely difficult to calculate a string that has a given hash. A so-called Merkle tree may enable devices to verify large data structures by hashing combinations (e.g., concatenations) of prior hashes.

Moreover, while the present disclosure is primarily directed to proof-of-work (POW), other techniques may be substituted with equivalent success. Common examples include proof-of-stake algorithm (e.g., where conservation is imposed by ownership of tokens), proof-of-authority (e.g., where conservation is inferred from authority), proof-of-space (e.g., where conservation requires memory), proof-of-bandwidth (e.g., where conservation requires bandwidth), etc.). More generally, artisans of ordinary skill in the related arts will readily appreciate that the laws of physical conservation can be imposed by imposing any number of practical limitations on operation.

As used herein, the term "participation" may refer to any transaction that includes on one or more factors, such as, but not limited to: (i) length of time spent connected to the "fog" (i.e., at least one other device in the direct peer-to-peer 5G network), (ii) amount of uplink data (i.e., transferred to a peer device or another network entity), (iii) amount of downlink data (i.e., received from a peer device or another network entity), (iv) amount of bandwidth provided to the fog network, (v) the number of devices simultaneously connected through the device during a data connection session with the fog, (vi) a total number of devices connected, (vii) an amount of storage or cache space offered by the device to at least one peer device in the network, (viii) an amount of computational resources on the client device consumed on behalf of another device or vice versa, and/or (ix) amount of traffic exchanged during periods of network demand above or below a particular threshold. It will be appreciated that myriad other factors may be tracked in order to properly credit (or in some cases, debit) a user account or a client device associated therewith for its level of participation.

In one exemplary embodiment, the blockchain ledger is useful for verifying and recording participation by a client device, where participation may include performing computations, transmissions, etc. In some cases, various forms of participation may be recorded in a single blockchain ledger; in other cases, different blockchain ledgers are used for different participation and can be exchanged there between according to exchange rates.

In one exemplary embodiment, the transaction is requested and recorded only after a device has rendered service (similar to a unilateral contract). In other embodiments, the devices in the network may transact services by recording transactions into the blockchain and binding the parties thereafter (similar to a bilateral contract). Completion of work may result in a fungible asset (e.g., a token, credits, points). As previously noted, each party to the transaction immediately publishes their proposed addition to the blockchain to the fog network. Immediate publication ensures that the proposed blockchain reaches consensus validation (and is added to the blockchain ledger) faster than a malicious party could generate a malicious version of the transaction. In this manner, no party can attack the ledger by e.g., crediting itself multiple times ("double spending"), demanding compensation for access for the work, manufacturing proof of work without doing the work, etc.

Figure 6:
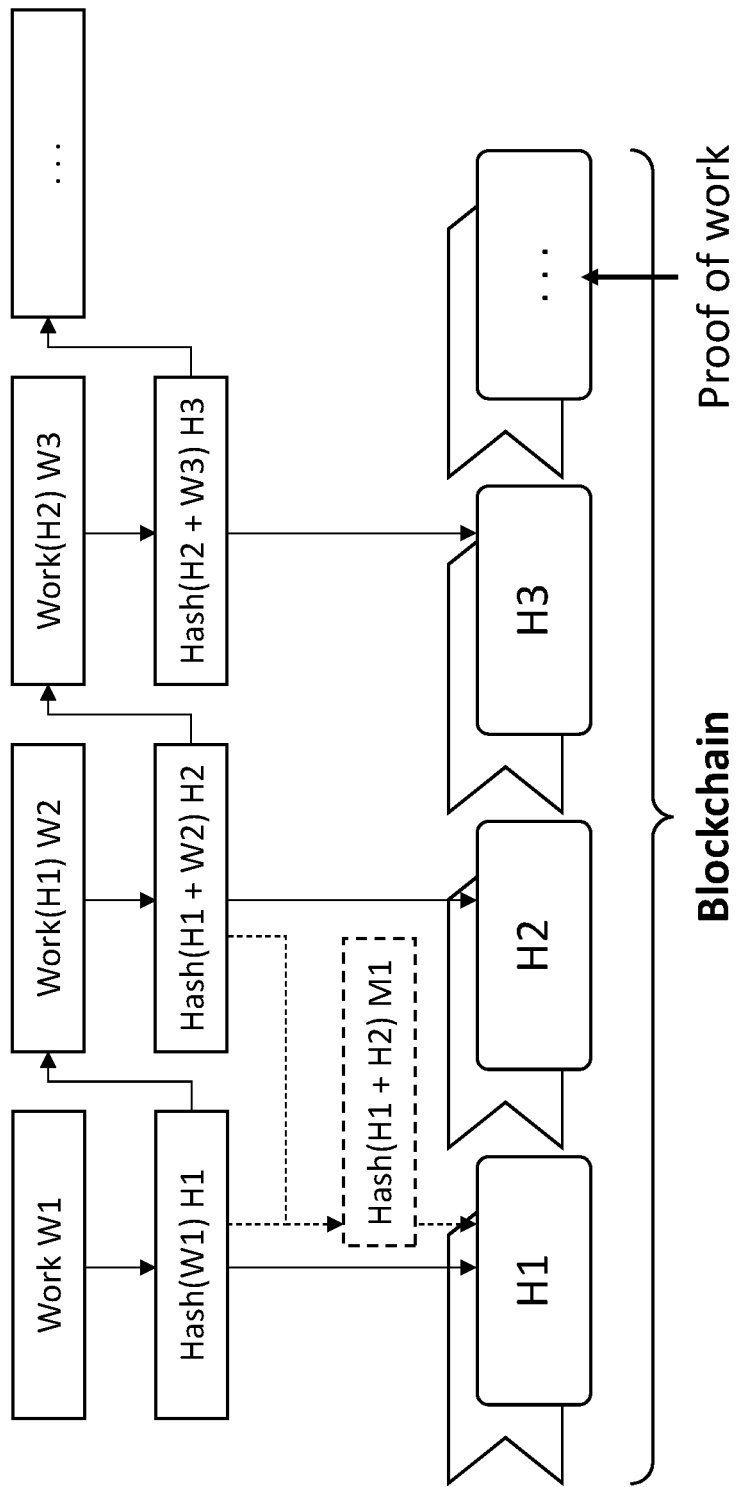
FIG. 6 is a logical flow diagram of the addition of records to a blockchain ledger, useful to illustrate various aspects of the present disclosure.

FIG. 6 is useful to illustrate the addition of records to a blockchain ledger. In the illustrated embodiment, some work (W1) is performed by a device, e.g., transmission of data. A record associated with the work (e.g., amount of work, type of work, recipient of work, etc.) is one-way hashed to create a hash value (H1). As an example, if a device transmits approximately 25.29 MB of data to another device in the network, the byte value (25,290,460 bytes) may be hashed using a hashing algorithm (e.g., SHA-256 or other members of the SHA-2 family, MD5, PBKDF2, bcrypt, or scrypt) to create a unique signature.

In some variants, one or more salts may be added to further improve collision resistance (i.e., "collisions" are two or more inputs producing the same output). As known in cryptographic arts, a "salt" is an extra, random input to a one-way hashing function. The salt may be concatenated to the data before the combined string is outputted as a "salted hash."

Returning to FIG. 6, the resultant hash value is recorded onto a public ledger that can be downloaded by any other device in the peer-to-peer network. For subsequent work, the hash of the performed work (H1) may be combined with the subsequent work (W2) via a transitive hash function to create a subsequent hash (H2). This hash is added onto the ledger, creating a digest of all recorded transactions that is permanent (with copies on many devices) and unalterable.

As the ledger grows in size, so does its veracity; a party (e.g., a node or user client device) that downloads a blockchain may verify that the ledger has not been modified over numerous transactions. One way to verify is to perform each hash to the end of the ledger, and match the calculated hash with an expected value. In one embodiment, the expected value is calculated and retrievable from the device that performed the work. Hence, if there is a match between the calculated hash and the expected hash, the performed work (amount of data transmitted, integrity of the data itself, etc.) is in fact what it purports to be. Advantageously, this allows a decentralized peer-to-peer network to keep itself accountable without server communication. Moreover, since the work can be verified, a client device or user thereof may take any obtained tokens for the work performed to other networks or other service providers (which may use a different ledger), as the amount of work can be proven via the original ledger, regardless of any "exchange rate" associated with credit earned and unit of work performed.

A simple Merkle tree optimization is also illustrated in FIG. 5. As shown by the dashed arrows, a hash of two hashes creates a new "top-level" hash (M1). Rather than verifying an entire chain of entries (which may grow at an exponential rate), a device may verify one or more top-level hashes instead. Since any change or tampering of data anywhere in the hashing processes will change subsequent hashes, a top-level hash that matches the expected value may be determined as being a genuine transaction.

Example Relay Transaction—

Figure 7:
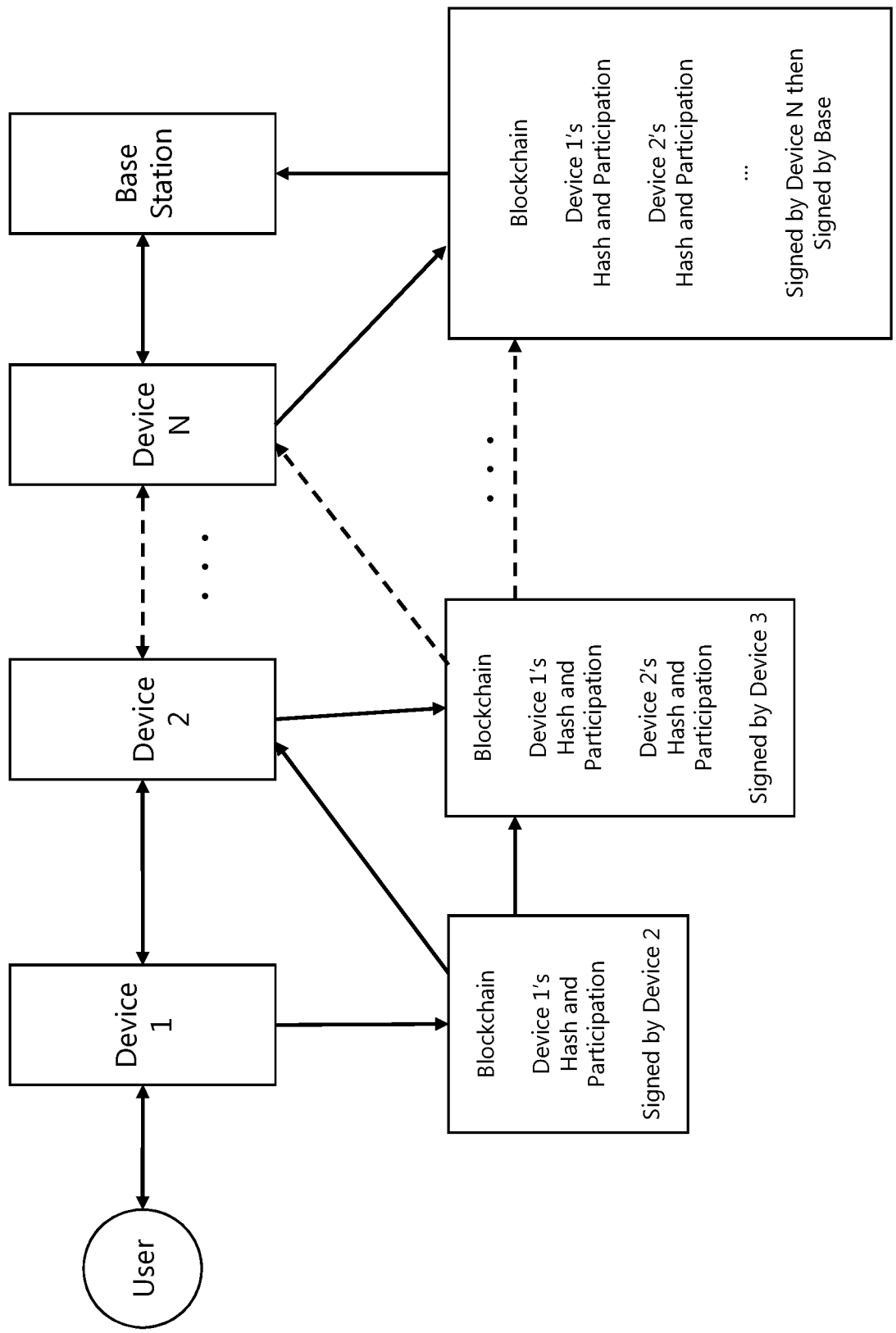
FIG. 7 is a logical flow diagram of an exemplary accounting for the various levels of participation by user devices and relay devices within a fog network, useful to illustrate various aspects of the present disclosure.

FIG. 7 illustrates an exemplary operation for accounting for the various levels of participation by user devices and relay devices within a fog network. Specifically, multiple participating nodes in the fog may participate in data relay and record their participation in a blockchain ledger.

In one exemplary embodiment, relay devices (Devices 1, 2 . . . N) and a base station relay data to/from the user. A relay device may include any device in the fog network configured to exchange data another relay device and to process data (e.g., perform hash calculations), including but not limited to, user devices, external radio access points, DU apparatus, routers, etc.

Each of these relay devices gathers participation information (e.g., amount of bandwidth utilization, storage, time spent as node), and creates a proposed block to be added to the blockchain. The proposed block contains the record of the transaction and the requisite POW for the digitally distributed ledger structure (e.g., a blockchain) generated in accordance with the present disclosure as described above. For example, Device 1 measures the quantity of its bandwidth utilization (e.g., some amount of gigabytes) for a given session, and then generates the record for addition to the blockchain. If it is successfully validated, then the resulting updated blockchain (including additional block recorded by Device 1) is updated by another device (Device 2), etc.

Moreover, it is further appreciated that every device of the fog is participating in the blockchain ledger validation. In other words, when a device attaches its hash to the block, it has verified all of the prior transactions. For example, when Device 2 receives the updated blockchain containing Device 1's hash, Device 2 verifies the blockchain and validates the recorded value in the final entry. Validation of the recorded value may include a comparison of the hash of previous entries (including Device 1's entry) with an expected value generated and shared by Device 1. In another embodiment, validation of the recorded value hash previous entries (including Device 1's entry). Device 2 then updates the blockchain with its hash result, and transmits the updated blockchain to the next relay device (Device N), which repeats the process until the blockchain is received at a base station. The base station validates the entries in the same way as the foregoing.

It will be appreciated that the blockchain may include multiple consecutive records by a given device e.g., a given user device may record multiple blocks in a row. Additionally, not all devices are necessarily required to record their own contributions in the blockchain. For example, a device may not record negligible amounts of participation, or if the device is purely altruistic in operation.

It is further appreciated that even though fog networks do not require central node management, central nodes may still be very useful. For example, the base station may act as a storage device for a blockchain ledger so as to quickly distribute the blockchain to new user devices. Under these circumstances, it may be faster for the user device to authenticate to the base station and bulk download the blockchain ledger (rather than receiving the blockchain from an unknown party and verify the entire chain to ensure that it is not potentially malicious.) Additionally, it is appreciated that the base station may assist the fog network to augment the fog network. For example, the base station can perform the hashing calculations, to offload computational resources and reduce power usage at the user devices of the fog network.

Figure 8:
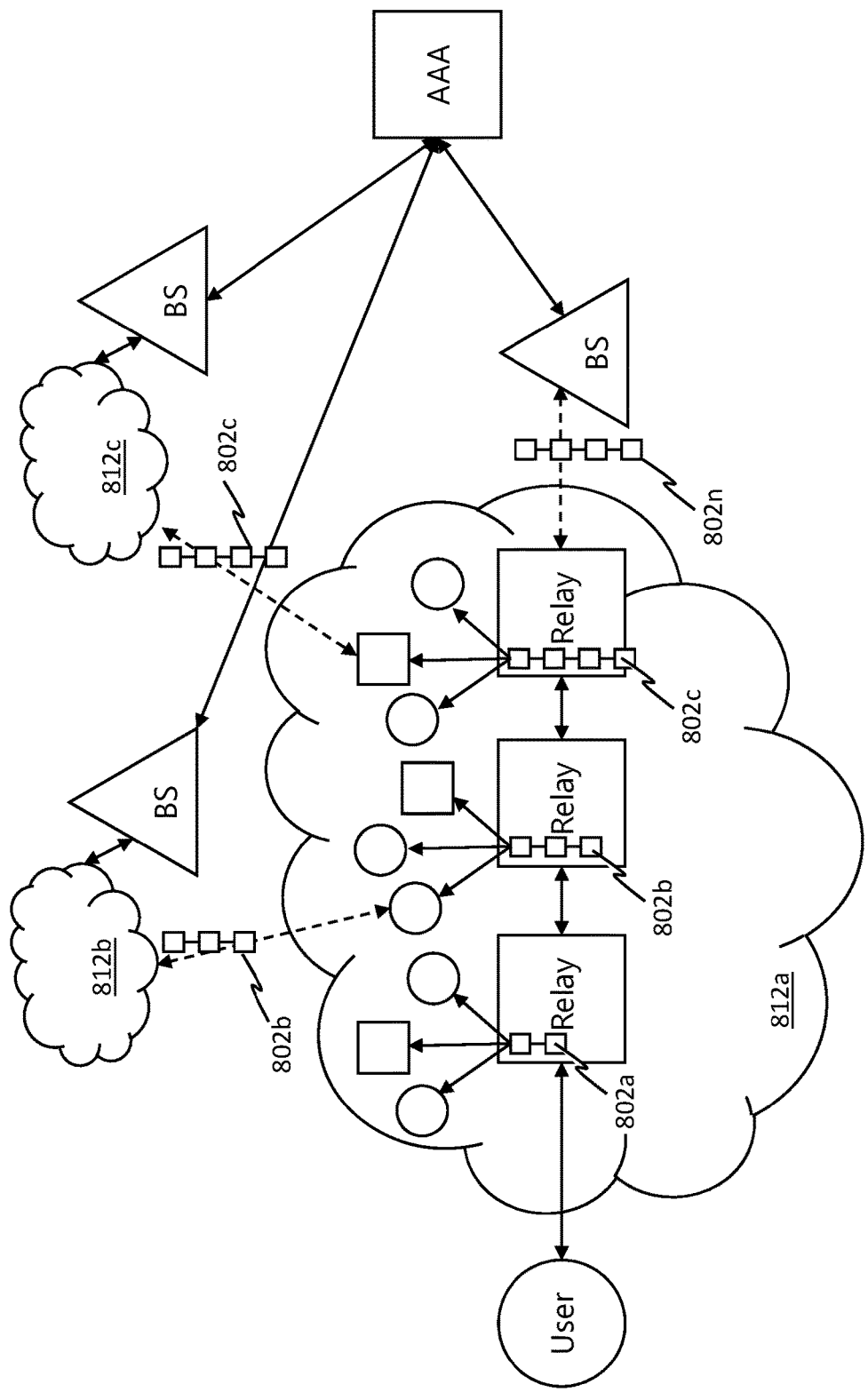
FIG. 8 is a logical block diagram of blockchain validation in an exemplary fog network, useful to illustrate various aspects of the present disclosure.

The foregoing discussion of FIG. 7 illustrates a single chain for simplicity. FIG. 8 illustrates how blockchain validation operates in the context of fog networks (where many nodes are connected to multiple other nodes). As shown therein, propagation of each resultant blockchain 802*a*, 802*b*, 802*c* is broadcast and extends to other nodes in the fog network 812*a*. That is, the first resultant blockchain 802*a* is transmitted to other relay nodes (including user devices), each of which may further transmit to yet other relay nodes. The same transmissions may occur at each relay device as more records (i.e., hash results based on previous entries) are added to the blockchain. The blockchain is validated with each hash performed by each relay node or user device, and the base station eventually receives the last-updated version of the blockchain 802*n*.

Additionally however, since some of the relay devices may be connected to other fog networks, the blockchains may also be broadcast to other devices in other fog networks. For example, blockchain 802*b* is received in fog network 812*b*, similarly blockchain 802*c* is received in fog network 812c. As previously noted, receiving earlier valid versions of the blockchain do not impose a significant burden to verify and/or ignore; however, multiple valid copies of the blockchain do substantially increase the difficulty for malicious attacks (since creating a false blockchain requires that every element of the chain is changed). In other words, even if a malicious attacker successfully attacked fog network 812a; he could not possibly hope to also attack the earlier (but still valid) versions of the blockchains in fog networks 812b and 812c.

As shown in FIG. 8, the base station may forward the last-updated version of the blockchain 802n (containing proof of work by participating user devices) to a central entity, such as a server disposed on the backend of the core network 202, an AAA (authentication, authorization and accounting) entity, or other centrally accessible storage location. The transactions between the BS and AAA are trusted, and thus need not be further protected. The central entity may maintain a centralized ledger e.g., for billing purposes and/or distribute the received information to other different locations (e.g., distribute it to other devices in the originating network and/or other networks).

As previously noted, other network entities (such as a base station or access node at another portion of the fog network) may access the blockchain ledger's records. Hence, if a user device enters another portion of the network or a different fog network, the user device may use tokens associated with its participation and resources contributions to its previous fog network. It is appreciated that larger business methods may control; for example different network operators may not honor the other's subscriber balances, and/or may charge exchange rates.

Methods for Earning Tokens—

The following discussion describes methods for accounting for participation of a device in a direct peer-to-peer fog mesh network. These methods are useful for creating incentives for users to participate in a fog network and commit resources (computational, network, bandwidth, storage, etc.) to the fog network through creation and accrual of tokens that may be used to exchange for various benefits such as those described above and elsewhere below.

Figure 9:
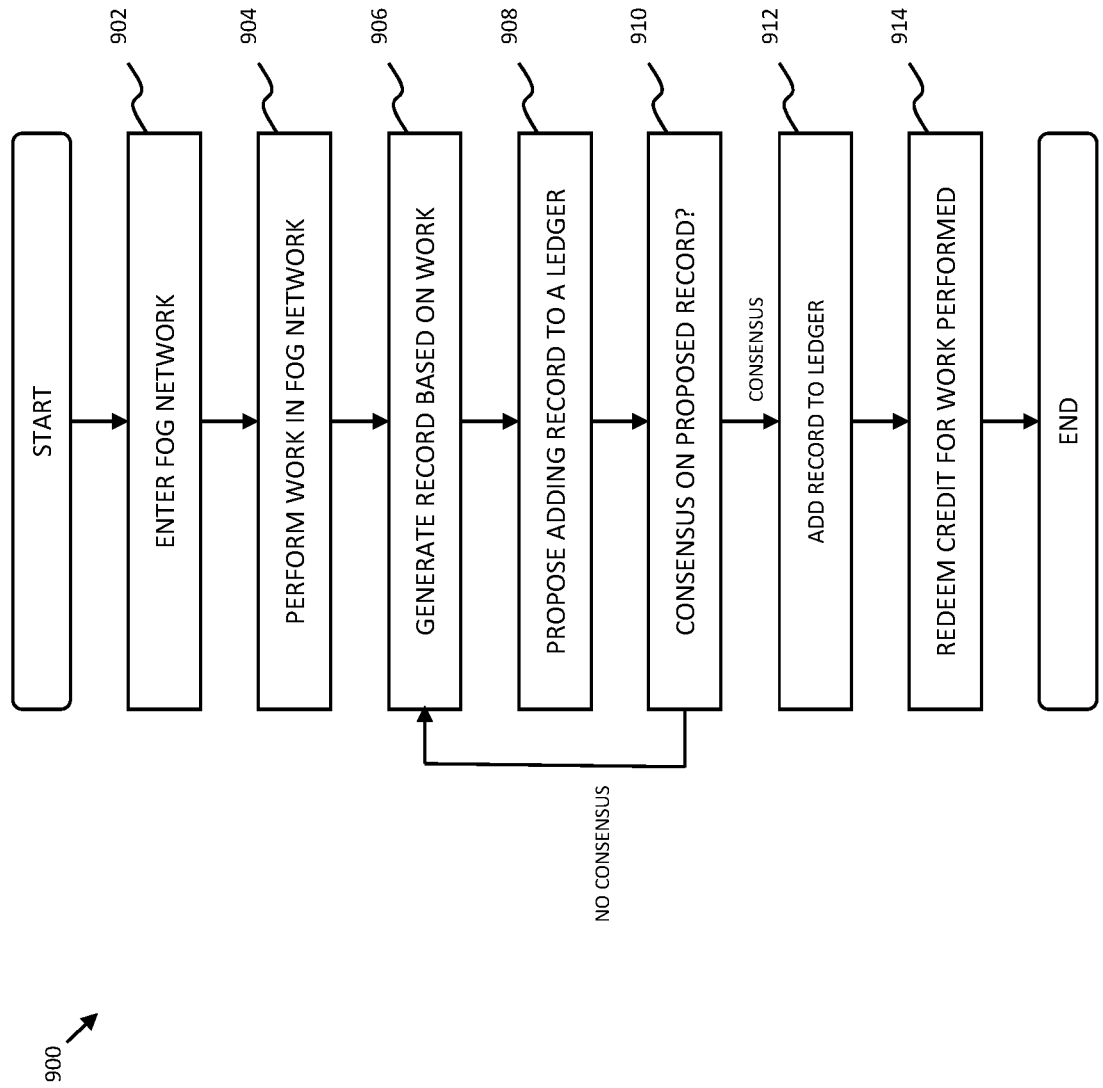
FIG. 9 is a logical flow diagram of one exemplary method for performing tasks via a client device within a decentralized network, in accordance with various aspects of the present disclosure.

FIG. 9 illustrates an exemplary method 900 for performing tasks via a client device within a decentralized network and receiving tokens for contributions to the network based on a computerized data structure indicative of proof of work.

At step 902, a client device enters or attempts to enter a decentralized network. In one exemplary embodiment, the client device is a mobile device that is capable of direct data communication with another client device enable to do the same. The client devices may communicate via short-range or long-range wireless communication protocols. Such communication protocols include but are not limited to WLAN (e.g., Wi-Fi or based on other IEEE Std. 802.11), Bluetooth (including Bluetooth Low Energy (BTLE)), cellular (e.g., 4G LTE, 5G NR, or hybrid 4G/5G), infrared, radio-frequency identification (RFID), near-field communication (NFC), and Global Positioning System (GPS).

In the exemplary embodiment, 5G cellular communication by the devices is useful for communication with one another in short-range a direct, peer-to-peer network, without a central "cloud"-based server to communicate with first. Interconnected devices in the 5G network (down in the "fog" mesh as opposed to the "cloud") are appropriate given that 5G connectivity utilizes a higher frequency signal, from 450 MHz to 6 GHz with a maximum bandwidth of 100 MHz ("FR1") to 24 GHz and beyond with a maximum bandwidth of 400 MHz ("FR2" or "mmWave"), and thus, it may transmit radio signals to a distance of up to approximately 150 to 200 meters. In other embodiments, client devices may communicate via "hybrid" 4G/5G two-antenna array that is capable of covering operating in bands allocated to GSM850/900/1800/1900 MHz, UMTS2100 MHz and/or LTE2300/2500 MHz, among others. 5G antenna or antenna array may be capable of further covering the 3400-3600 MHz and beyond, e.g., C band in the range of 4 to 8 GHz.

In some embodiments, a user must be authenticated to enter the network. For example, the user must provide credentials to a network service provider (e.g., mobile network operator) before being able to access the network. In one variant, the user may store credentials on the device which are transferred to a small cell or other radio access network that detects the presence of the client device of the user. In another variant, the user may log into an authenticated or trusted device, e.g., another client device (or modem or gateway device) that has already provided proper credentials). In one implementation of the above variants, the user automatically transmits credentials to gain access to the network when the user enables 5G connectivity on the device. In another implementation, the user must request access via the client device. In another implementation, another network entity (e.g., small cell, another client device, modem) continually monitors for the presence of 5G-capable client devices, or a request therefrom, or an attempt to gain access, and then provides the proper response of authenticating and allowing the client device into the network, or denying access if credentials are incorrect or the user does not have a valid account or subscription to the network.

In another embodiment, the user may gain access by authenticating with other client devices on the network without involving the network service provider. As will be described further below, a separate transaction ledger may be used to verify ownership of the client device by a user as well as good standing with the network.

Referring back to the exemplary embodiment, the user may also select an incentive for participation before or upon connecting to the network, as described above: receiving a credit on the service bill, earning compensation for the user's work, etc. In some cases, the user may direct the tokens elsewhere to another account owned by the user, another user, or use them access premium content or features, or redeem or exchange them for other forms of credit, e.g., in another network. In another embodiment, the user may change the type of incentive received while connected to the network. Thus, the user may have different types of tokens. In some variants, the user may redeem all the tokens for a common denomination (e.g., dollars).

At step 904, the client device performs work in the network. In the illustrated embodiment, a device renders work or service and later receives credit (e.g., at step 912 described below) similar to a unilateral contract. In another exemplary embodiment (not shown), the devices in the network may transact services by recording agreements to perform transactions into the blockchain that bind the parties thereafter (similar to a bilateral contract). Artisans of ordinary skill in the related arts will readily appreciate the variety of different schemes for negotiating work-for-credit.

In one exemplary embodiment, the agreement may be between two devices of the fog network. For example, two devices may agree to exchange tokens for work performed. In other embodiments, the agreement may be between a device and the fog network. For example, a device may agree to exchange tokens for work performed for the fog network (e.g., any of the community members). In still other embodiments, the agreement may be between a device and a service provider. For example, a device may agree to provide work in exchange for tokens from a service provider. Moreover, while the foregoing is presented in the context of a two-party exchange, such arrangements are purely illustrative. Any number of parties may negotiate agreements. In some variants, hybrid agreements may be pieced together from other constituent agreements. For example, a device may provide bandwidth to a set of devices in exchange for tokens provided by both the devices as well as the service provider.

In one exemplary embodiment, the "work" includes transfer of data. Consider a scenario in which a particular video stream is currently in demand in the network, e.g., a new episode of a popular show available via over-the-top media services or application programs (Netflix®, Hulu™, Amazon Prime Video™, iTunes®, Twitch™, etc.). Rather than wait for buffering times, or wait for traffic congestion to clear up during in-demand viewing times, a user in the network may choose to receive the data from more immediate and local sources, i.e., from the working client device and/or other client devices in the network. In one variant, in order to allow another client device to access the in-demand media, the working client device receives the digital data from elsewhere. In some implementations, the client device may receive it via traditional server-based means, i.e., connecting to a server via a modem (e.g., cable WLAN over backhaul) or cellular means (e.g., 3G or 4G cellular signals) while reserving the in-demand transmission for local 5G signaling. In other implementations, the data may be retrieved from one or more other client devices in the local mesh that the requesting client device is too far to access. The working client device may have to go through one or more intermediary client devices as well, and the intermediary client devices may in turn be credited for providing the bandwidth and/or providing the data.

In another variant, the data is accessible at an external storage device, which may communicate with the client device via wired or wireless means (including via a 5G connection). Growing Internet of Things ("IoT") implementations may enable one or more consumer devices to wirelessly provide or receive data.

In another variant, the data has already been stored in the client device using one or more of the foregoing means, and the data is ready to transmit immediately. However, it is appreciated that retrieving the data first poses little to no appreciable delay in delivery given the ultra-high data rates and ultra-low latency of 5G-based communication.

Data transfers may be measured in various ways, for example, in terms of the total size of data transmitted, respective sizes of data received and transmitted (which may differ if the client device has compressed or encrypted the data before transmitting), or rate of data transmitted per unit time.

In another exemplary embodiment, the work includes storage of digital data. Specifically, the client device may be one of many storage locations for a piece of data. Distributing the data throughout the network may protect it from being exposed to unauthorized access (via, e.g., hacking) or lost. Useful storage of data may be measured in terms of, for example, size of memory occupied by data on behalf of one or more other client devices, or duration of time the client device stored a unit of data (e.g., a set amount of megabytes or gigabytes) on behalf of each of one or more client devices.

In another exemplary embodiment, the work includes provision of bandwidth. For example, desired data is located on a remote storage device (on the "cloud") or a remote client device. However, such remote devices may not have access to the Internet via traditional server-based connections. Similarly, a client device may not have access to the remote storage device except by way of 5G peer-to-peer connection (i.e., does not have access to WLAN access point or cellular data, e.g., via 3G or 4G connectivity). Nonetheless, a user who wishes to access the data (or upload data) may do so via the 5G-enabled peer-to-peer network. An intermediary client device that acts as a node to receive data from and/or transfer the data to the requesting user may be acknowledged for the work done, i.e., amount of bandwidth provided, and given commensurate tokens. Bandwidth may be measured in terms of, for example, number of client devices served, amount of data transferred between devices, number of packets transferred or received, level of availability to other devices (e.g., time spent being available), or rate of transfer of data or packet to or from other client devices.

In yet another exemplary embodiment, the work includes provision of computational power. For example, a mobile device may be able to offload computational power to a nearby server in exchange for tokens. Computational burden may be measured in terms of, for example, number of processes performed, amount of data processed, processing complexity, time spent processing, and/or priority for processing.

More generally, work performed by the client devices correlates to participation in the fog network and may include data transmitted to other devices via 5G communication (via 5G antennae in a 5G- or 4G/5G-capable mobile device), data stored on behalf of other users or devices, time spent acting as a network node, provided bandwidth, provided computing, and/or other activities as described elsewhere herein.

At step 906, the working client device (which has performed some type of work as described in step 904) generates a record for addition to a distributed ledger.

In the exemplary embodiment, the record includes participation information and a proof-of-work (POW). In one variant, the POW is a memory hard memory search through a directed acyclic graph (DAG) based on nonce and/or salt. In another variant, the POW is a processor hard hashing algorithm based on nonce and/or salt. In still other variants, the POW is bandwidth hard based on e.g., obtaining network tokens based on nonce and/or salt.

In the exemplary embodiment, to reduce the burden of calculating a hash based on large numbers of records, a top-level hash based on an approach using a Merkle tree, or intermediate hashes between the top-level hash and the base hash in the Merkle tree, may be calculated instead. As discussed with above, this results in a condensed hash that still depends on all previous hashes. This approach may be used as the blockchain ledger grows to reach a prohibitively large size, which may be determined by a threshold length (or a multiple or an exponent thereof) of the ledger that automatically triggers the need to implement, e.g., an additional level in the Merkle tree for some or all of the prior records. In one variant, a threshold length of time that the ledger has existed may trigger implementation of another level in the Merkle tree.

At step 908, the client device proposes adding the record to the digital ledger. In the context of the present disclosure, a "ledger" is a blockchain in which a set (or "block") of digital data may be recorded by a computing device (personal computer, mobile device, etc.), where other computing devices may cumulatively record additional sets of digital data, creating a chain of records that build from previous entries.

In one variant, the data structure may be public and available for any computing device to read and/or propose changes to (subject to aforementioned consensus requirements); i.e., it may be freely distributed within a given network of devices. This creates an immutable historical record of work performed by the client device as well as any other client devices in the network, which may be useful for crediting/debiting from a total amount of work performed by the client device and received from other client devices over time.

In an exemplary embodiment, the public ledger includes a distributed blockchain having a series of blocks describing work performed by another client device on the network. The blockchain may reside in and be duplicated in various devices in the network. For example, the blockchain may be accessed at a different client device or a network entity (memory apparatus in, e.g., gNB, backend server). The blockchain includes the entire record of work (which has been previously validated) in the fog network and the recorded proof of work for verification.

In some variants, additional data may be included with the record, including time and date of the work performed, location of the device, type of the device (e.g., model, manufacturer), serial number of the device, subscriber identification module (SIM) identification number, version of OS running on the device, media access control (MAC) address, etc. In another variant, the previous hash may be recorded with the newly added hash. In some variants, "merkleized" transactions (i.e., records added based on a Merkle tree, e.g., top-level hash, base hash, intervening hash) or data related thereto may be added along with the record.

In the exemplary embodiment, writing or recording data onto the ledger requires that a population of client devices in the network must achieve "consensus" (step 910). In one such variant, consensus is achieved when a simple majority (more than 50%) of devices have validated a block for adding to the blockchain. Various other mechanisms may be substituted with equivalent success (e.g., weighted voting, supermajority voting, etc.) Once recorded, the blocks of data are permanent and may not be altered; only further entries may be created. This process of validating POW must be performed until enough devices have reached consensus. Once consensus is obtained, the block can be added to the blockchain ledger. Thereafter, other devices in the network that read the blockchain ledger can trust the ledger contents.

In one embodiment, the other client device evaluates the proposed block received from the client device, and validates the corresponding proof-of-work (POW). As previously noted, validating a POW can be done quickly (many magnitudes of time faster than generating a POW). The other client device may additionally "sign" the ledger; such a signature may take various forms, e.g., another entry recorded in the ledger as a hash or a plaintext value, a timestamp, or other metadata about itself.

In some embodiments, a client device can validate the multiple blocks (but not the entire blockchain) e.g., via a Merkel tree. In other embodiments, the other client device determines whether the POW is valid in the context of the entire blockchain. In one implementation, the POW validation must include a validation of all previous entries. In another implementation, the POW validation must include not just the POW, but also other data that may be included in the ledger, e.g., a concatenation of the measured work value and metadata associated with the client device such as SIM identification number, MAC address and/or other device identifiers.

In another embodiment, at least a threshold number or percentage of multiple other client devices must validate the record in order to reach consensus; i.e., a consensus must be reached for the recorded ledger entry to be added. For example, a new entry by the client device may require at least three other devices to validate the record. As another example, the new entry may require over 50% of the devices in the fog network to validate the record. In some variants, a percentage of only a subset of the network need verify the record. In one implementation, the subset may be an area determined by physical distance from the client device based on, e.g., a radius determined by GPS signaling. In another implementation, the subset may be a local network, e.g., an office or enterprise intranet, or subscribers connected to a particular WLAN.

In one exemplary embodiment, when a device validates a proposed block, it immediately broadcasts the valid block to other devices to validate. In this manner, a proposed block is quickly propagated throughout a network and validated faster than would be possible by only the originating client device. More directly, by broadcasting valid blocks, the entire network can quickly achieve consensus and minimize further propagation.

Once consensus is received, the proposed record is added to the distributed ledger at step 912. In some embodiments, the client device and any devices that have received the ledger add the proposed block to their current copy of the ledger. In some variants, the updated ledger is stored onto a network component (e.g., DU, radio access device, small cell). In some variants, the ledger may also be propagated into other networks by devices that are part of the other network. In other variants, the ledger may be recorded onto a central network entity (e.g., a server, core network, back-end apparatus) for other networks or client devices to access.

At step 914, if the client device receives credit/debits from the blockchain. In some embodiments, one or more fog network entities (e.g., DU, CU, a dedicated node, some device associated with the network service provider) may hold and track the tokens in one or more memory modules thereof, and issue them to client devices that have earned them. In another variant, the tokens are issued and/or tracked at a central server location. Tokens may also be generated or minted by a blockchain, e.g., by using the hash output and/or a message corresponding to the verification as input. In still other variants, tokens may be issued by the network service provider, a network component (e.g., DU, CU), a central manager (e.g., backend server), or some client device associated with the network service provider. Tokens may also be held in a memory of the foregoing devices, akin to an escrow.

The tokens may be received, recorded, and accumulated in a global user account, e.g., in a list or tabular format (e.g., client device A, 150 tokens). Additionally or alternatively, the tokens may be received, recorded, and accumulated in the client device (e.g., in a memory or a file therein). In another embodiment, the network service provider receives the indication and reflects the total amount of tokens received per time period (e.g., monthly or daily cycle).

In another embodiment, the tokens may be recorded in a separate ledger, e.g., blockchain or other data structure residing on a network apparatus, e.g., base station, DU, CU. In the case where earned tokens of each client device in the network are publicly visible, this data could be used as a factor for determining which client device(s) to commission to perform work. For example, a client device that has accumulated large amounts of credit (given, e.g., a leaderboard or other ways to sort based on amount of credit) may be considered a reliable provider of services or work (e.g., storage, transfer and/or processing of data).

The credit may be in currency amounts (e.g., x dollars or cents saved from the bill of the service provider, y dollars or cents earned for cash back, z dollars or cents donated to a user-chosen charity organization), in terms of time (e.g., t amount of time accumulated to access premium content), or other ways of compensating the user for its participation and work performed on behalf of other users, e.g., u amount of bandwidth accumulated for use in a different mesh network as will be further described below, v number of fungible reward points convertible to other forms of credit (e.g., proof of data transmission by client device redeemable for commissioning other devices to compress other data for the client device), w amount of cellular data eligible to be gifted or applied to other members of another service plan (e.g., phone or 4G LTE service), or r amount of adjustment to an uplink/downlink data transfer ratio.

In some embodiments, the amount of credit may vary depending on myriad factors. For instance, when demand for participation of devices is higher, the amount of tokens earned or required for services may also be higher ("surge pricing") and vice versa. Credit may increase or decrease also in response to whether the requested client device is in demand, how much charge remains in a client device (e.g., depending on a threshold battery level), rate of charging, whether the client device has a stable power source (e.g., plugged into an outlet), density of client devices in an area, position or mobility of the client device, hardware or software capabilities of the client device (e.g., memory capacity, processor, number of antennas, OS type and version), efficiency of radio antennas, distance from other client devices or nodes, availability of alternate communication links (e.g., WLAN connectivity for uploading to remote storage), bandwidth overhead and usage by a client device, criticality or popularity of the data, whether the client device is a subscriber to the network service provider, any state of alert (e.g., presence of natural disaster, AMBER Alert™), etc. In some embodiments, users may also set their own bidding and asking prices.

In the exemplary embodiment, this credit is redeemable for various services (e.g., from the network service provider) or device functionality from other users of the network. For example, the client device may request upload services by another client device in exchange for a certain amount of tokens (as established by the other client device or a going market rate), where the first client device may neither have sufficient cellular data transfer (e.g., via 4G LTE) allotment from its service provider nor other means of transferring data (e.g., not near a WLAN access point) but the second client device does. In fact, if the second client device has unlimited available bandwidth, the second client device may specialize in data transfers. In one variant, the device may set a preference (e.g., via a downloadable mobile application from the network service provider) to automatically accept service requests from other client devices. In another variant, the device may choose to accept a request from, e.g., a list or chart of available requests, akin to a list of bounties. In some implementations, a user of the device may sort available requests by bounty, type of work requested, type and capabilities of the device (e.g., manufacturer, data rate), reputation of the requesting user (as rated by, e.g., other users of the network), etc.

Services or work by entities in data communication with the fog network (that includes the "working" client device) may be redeemed using earned tokens. For example, a client device may exchange tokens with a central data server to play, download and/or stream music, where normally a user might have to pay in dollars to purchase the right to play a music track a la carte (e.g., iTunes®) or based on a subscription (e.g., Spotify™) In other variants, tokens may be exchanged for other types or forms of token usable in a different fog network.

Thus, users of peer-to-peer networks are given incentive to participate and contribute their network, bandwidth, computational and/or storage resources. As more users participate, the more trustworthy, important, and valuable the tokens become.

Transferring Tokens—

A given fog network may be a "pocket" of interconnected devices, and may not be able to verify the validity of credits obtained for participation and work performed for another fog network (another pocket of interconnected devices that do not see the other pocket). However, client devices may be mobile, leaving and entering different networks. Hence, a mechanism to use credits earned in one network in a different network may be useful in incentivizing users to participate in any fog network, as the fungibility and flexibility of earned tokens will make them more valuable.

In some embodiments, each fog network may have its own blockchain. As a result, tokens earned in a first fog network may need to be transferred into a second fog network before being redeemable in the second fog network. Moreover, as previously noted, fog networks may not have access to centralized network accounting, thus both the client device and the fog network cannot reliably trust one another. In other words, the client device cannot trust the fog network ledger until the fog network ledger has been validated, nor can the fog network trust the client device's ledger until the client device's ledger has been validated. The following discussion describes methods for utilizing or exchanging participation in one network (e.g., work performed) to receive network services in another network.

In one such implementation, transferring tokens from a first fog network to a second fog network is performed via a "two-way peg" that locks tokens of the first fog network blockchain to create tokens in the second fog network blockchain; thereafter, the tokens of second fog network can be transacted without affecting the first fog network. Second fog network tokens can be converted back to the first fog network by locking the second fog network tokens and unlocking the first fog network tokens. When either the first fog network or second fog network re-establishes connection with a network service provider, the exchange can be completed (e.g., the service provider can appropriately credit/debit user accounts and/or cause user accounts in another service provider to be credited/debited accordingly).

Figure 10:
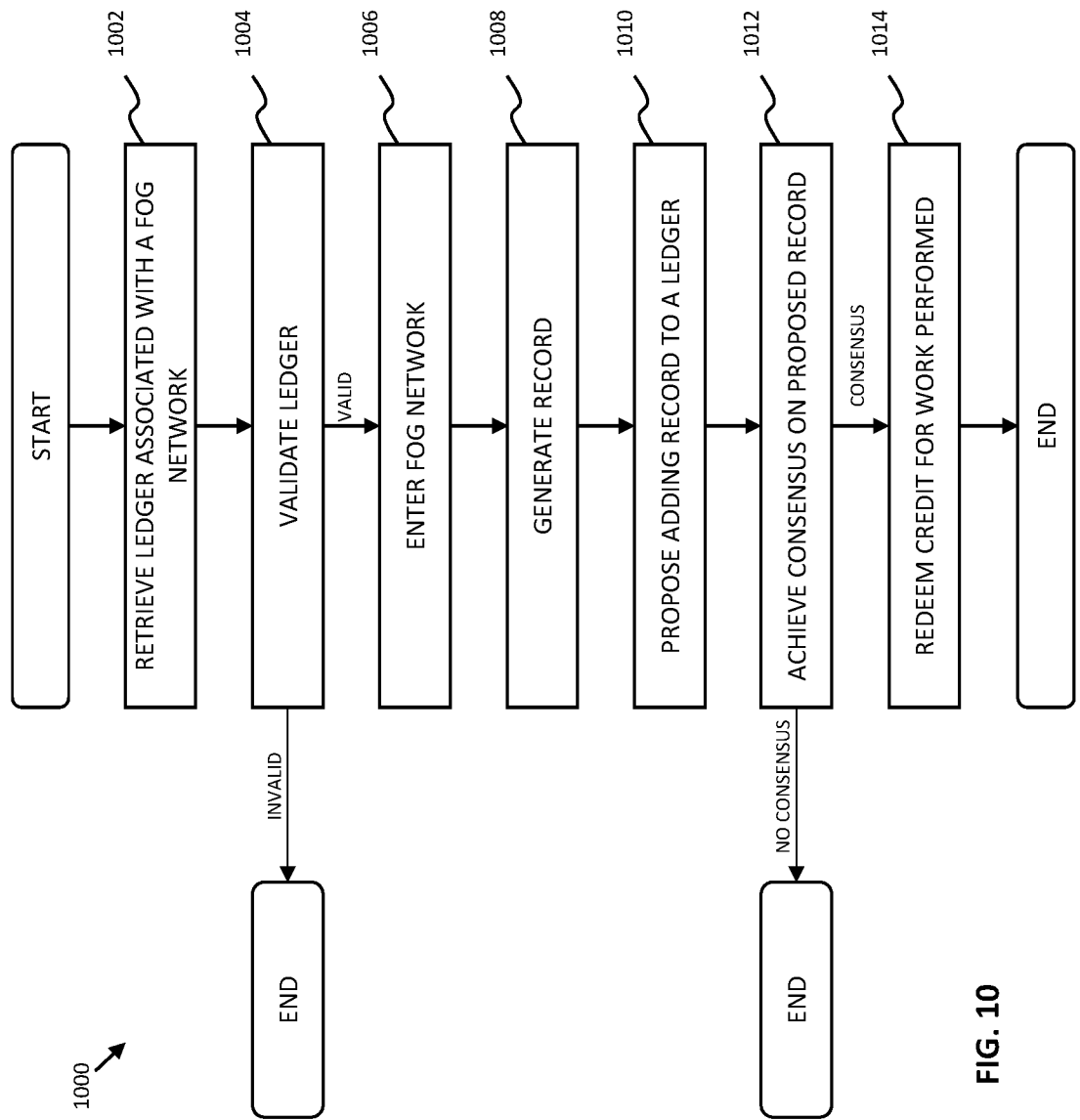
FIG. 10 is a logical flow diagram of one exemplary method for transferring tokens from a first fog network to a second fog network, in accordance with various aspects of the present disclosure.

FIG. 10 illustrates an exemplary method 1000 for transferring tokens from a first fog network to a second fog network.

At step 1002, the client device retrieves a ledgering data structure associated with the second fog network. In one embodiment, the client device can download the ledgering data structure from any member of the second fog network; e.g., the ledgering data structure is openly held for any member of the public. In situations in which the second fog network is a logically closed network (such that other client devices are restricted from accessing the network despite being in close proximity to client devices that are members of the network), keeping the location of the blockchain, despite its typically public nature, discourages rapid propagation of its location or even knowledge of its existence. In such implementations, the client device can download the ledgering data structure from e.g., a URL or other data repository associated with second fog network.

At step 1004, the client device validates the ledgering data structure. As discussed supra, the blockchain may be composed of a series of one-way memory searches or hashes. In one embodiment, the memory searches or hashes may be based on a proof-of-work (POW) scheme selected from a set of known POW schemes. In other embodiments, the fog network may identify or specify how the POW schemes are calculated. In one such variant, the client device may further determine whether the fog network's POW scheme is sufficiently difficult to assure that the ledger is valid. In other words, the blockchain POW must be sufficiently asymmetric (i.e., a solution is difficult to find, but very easy to verify).

As a related corollary, the fact that a blockchain accumulates entropy means that the rate at which entropy is being added to a community is a "proof of cooperation" without any central organizer. Specifically, one computer is only capable of adding a certain about of entropy, but a million computers working together generate entropy additively (a Poisson process). In other words, the largest pool of entropy is considered the valid state of the network (the consensus of the community), and the largest pool of entropy can only be generated by the network as a whole; it cannot be generated by a single attacker or even a subset of the pool. Thus, the ability to measure consensus or cooperation is as simple as validating the amount of entropy of the system.

In some cases, the client device may consider various other factors in determining whether to join a fog network. For example, the client device may consider the capabilities that it can offer to the fog network, and/or the fog network's capabilities to augment the client device's own operation. In some cases, the client device may consider factors such as e.g., exchange rates, and/or ongoing rates for network participation. Still other factors may include e.g., mobility considerations and/or client device considerations (e.g., remaining battery life, current processing and/or bandwidth loads, and/or availability of other backup alternatives, etc.).

If the ledgering data structure is valid and meets the client device's other considerations, then the client device can enter the fog network at step 1006 of the method 1000. In one embodiment, the client device may need to meet certain requirements of the fog network. For example, the fog network may require that the client device can complete a valid transaction or otherwise pays an entry fee. In one such variant, the client device may transmit a request for access to the second fog network including e.g., payment of an entry fee.

Once the client device has successfully entered the fog network, the client device may then participate by exchanging data through other participating client devices, and gaining tokens as desired (discussed above). Additionally however, the client device may wish to transfer tokens from previous fog networks to the second fog network.

At step 1008 of the method 1000, the client device generates a record for transferring tokens from a first fog network into tokens of a second fog network. In the exemplary embodiment, the record is a two-way peg and a proof-of-work (POW). As previously noted, a two-way peg locks tokens of the first fog network blockchain to create tokens in the second fog network blockchain. In one exemplary embodiment, In one variant, the POW is a memory hard memory search through a directed acyclic graph (DAG) based on nonce and/or salt. In another variant, the POW is a processor hard hashing algorithm based on nonce and/or salt. In still other variants, the POW is bandwidth hard based on e.g., obtaining network tokens based on nonce and/or salt.

Artisans of ordinary skill in the related arts will readily appreciate that the foregoing two-way peg is purely illustrative and any form of conversion may be substituted with equivalent success. For example, a second fog network with access to a core network entity may directly convert foreign tokens to its native tokens. Similarly, a client device may be able to convert tokens via a core network. Still other techniques may use e.g., escrow accounts, smart contracts, and/or other intermediary brokers that charge conversion fees.

In some cases, the client device may select only a portion of its tokens to transact. For example, it is appreciated that any currency exchange can be "lossy", thus a client device may only seek to convert over the tokens that it needs. By similar extension, a client device could perform various hedging and/or arbitrage activities. For example, if the client device determines that the second fog network will pay profitable rates for the client device's tokens, then the client device may (in some instances) be able to sell more tokens than it has (drawing into a negative balance). While somewhat counterintuitive, such transactions may be desirable where e.g., the first and second fog networks regularly exchange tokens and/or hedge for fluctuating token values.

In one embodiment, the credits received from the originating fog network (as well as from any other fog network that the client device has participated in) may be converted to an interchangeable, standardized, global "token" that is usable and/or convertible to credits used in any fog network, including the second fog network. In some variants, the "token" includes another type of credits that are usable in any fog network and/or convertible to any form of credit. In another variant, given the globally applicable nature of these standardized tokens, they may be tracked in a centrally located ledger (or blockchain), e.g., located on a server apparatus controlled by a network service provider. In one implementation, the tokens may simply be listed in a constantly updated tabular form rather than in a blockchain form, since in this case, they need not be verified (again) or tracked by the self-accrediting mechanism of decentralized ledgers. In another implementation, the global tokens are recorded and accumulated in the client device (e.g., in a memory or a file therein). However, in another variant, the global tokens may be recorded in a decentralized blockchain in similar fashion to the abovementioned methods for verification of work so as to ensure trustworthiness of the global tokens across fog networks.

In some variants, an "exchange rate" dictates how one form of credit is equivalent to another. For example, fog networks may implement preferential exchange rates so as to incentivize an influx of participants. Alternatively, fog networks may implement usurious exchange rates so as to de-incentivize participation and/or even encourage an exodus of unnecessary participants. In some cases, exchange rates may be based on different types of tokens and/or the origination of tokens. For example, some fog networks may preferentially reward or penalize different directions of geographic movement.

At step 1010, the client device proposes adding the record to the digital ledger. As previously noted, writing or recording data onto the ledger requires that a population of client devices in the network must achieve "consensus". In one such variant, consensus is achieved when a simple majority of the second fog network (more than 50%) of devices have validated a block for adding to the blockchain. Various other mechanisms may be substituted with equivalent success (e.g., weighted voting, supermajority voting, etc.)

In one embodiment, the second fog network evaluates the proposed block received from the client device, and validates the corresponding proof-of-work (POW). As previously noted, validating a POW can be done quickly (many magnitudes of time faster than generating a POW). The second fog network reaches consensus when at least a threshold number or percentage of multiple other client devices validate the record. In one exemplary embodiment, when a device of the second fog network validates a proposed block, it immediately broadcasts the valid block to other devices of the second fog network to validate. In this manner, a proposed block is quickly propagated throughout the second fog network.

Once consensus is received, the proposed record is added to the distributed ledger at step 1012. In some embodiments, the client device and any devices that have received the ledger add the proposed block to their current copy of the ledger. In some variants, the updated ledger is stored onto a network component (e.g., DU, radio access device, small cell). In some variants, the ledger may also be propagated into other networks by devices that are part of the other network. In other variants, the ledger may be recorded onto a central network entity (e.g., a server, core network, back-end apparatus) for other networks or client devices to access.

At step 1014, the client redeems the converted tokens in the second fog network. The second fog network may have services available that are similar to those of the original fog network. In various embodiments, the client device may request of another client device, or the client device may continue to earn additional credits, which may be used in exchange for various incentives as discussed throughout the present disclosure.

The foregoing methods may be useful for "performance arbitrage" in which credits accumulated in a less-stable, lower-performance network can be preferentially exchanged in stable, high-performance networks to gain access to better resources. For example, a fog network that has low-quality network characteristics, such as sparse quantity of nodes, lack of infrastructure (e.g., sporadic cellular towers, lack of public WLAN access points for hybrid 4G/5G capability), low data rates, etc. may incentivize a client device to augment the network's functionality. This can be rewarded at profitable rates. Thereafter, when the client device enters a fog network with high-quality network characteristics, then the client device can spend its tokens to obtain priority service. Notably, the service provider can offer improved services in even its most remote fog networks with minimal capital outlay, while at the same time participating client devices receive priority treatment in high performance networks. In other words, the more participating and contributing peers in a peer-to-peer network, the better performance for all.

In some embodiments, network service providers may issue credits or tokens to client devices in exchange for "real" cash currency, e.g., dollars. These credits, once obtained by a client device, may then be used to access services by other client devices in different fog networks.

Exemplary Apparatus—

Figure 11:
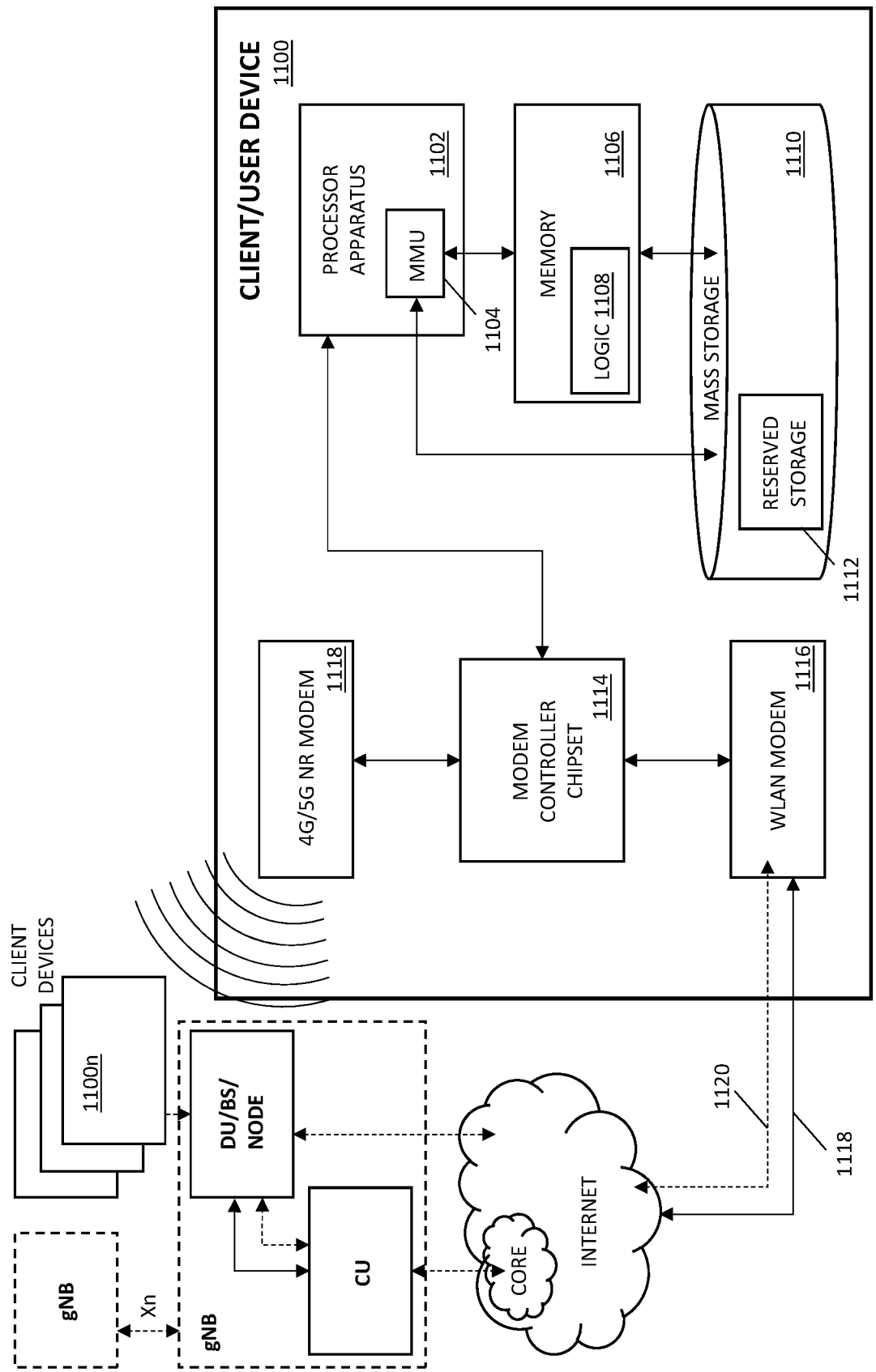
FIG. 11 is a logical block diagram of one exemplary client device, in accordance with various aspects of the present disclosure.

FIG. 11 illustrates an exemplary client device 1100 according to the present disclosure.

In one exemplary embodiment as shown, the client device 1100 includes, inter alia, at least one processor apparatus or subsystem 1102, a memory management unit (MMU) 1104, a memory apparatus 1106 (e.g., DRAM) with program(s) or logic disposed 1108 thereon, a mass storage device 1110 (e.g., HDD, SSD, NAND flash) with at least one reserved portion 1112 (e.g., to provide volatile and/or non-volatile storage space for other users or client devices in the network, separate from system files, reports, and the like for the operation of the client device).

In the exemplary embodiment, the processor may be in data communication with non-transitory computer-readable medium configured to store computer-readable instructions for execution. Storage media may be non-volatile memory (e.g., a flash memory) that is configured to store computer-readable instructions and/or other data, and retain the stored computer readable instructions without power. Such computer-readable instructions may alternatively or additionally be stored on a local cache associated with at least one of the processors.

Any process required by the client device may be executed by the processor apparatus 1102, dedicated hardware, and/or any other form of logic that performs logical operations. Examples of processing alternatives include, without limitation, reduced instruction set computer (RISC) processors, complex instruction set computing (CISC) processors, field-programmable gate arrays (FPGAs), application specific integrated circuits (ASICs), digital signal processors (DSP) and programmable logic devices (PLDs). The processor apparatus 1102 may run computer-executable instructions from logic 1108 or other programs stored in memory apparatus 1106 or mass storage device 1110. In one embodiment, the processor 1102 may also include an internal cache memory, and in one variant, is in data communication with a separate and dedicated MMU 1104 by which the processor apparatus accesses the logic and instructions residing on memory subsystem or device 1106. The memory subsystem may implement one or more of DMA-type hardware, so as to facilitate data accesses as is well known in the art. The memory device 1104 may contain computer-executable instructions and/or logic 1108 which are executable by the processor 1102 to implement data transactions, collection, storage, analysis, evaluation, management, etc. as described elsewhere herein. A processor may also be implemented as a combination of computing devices (e.g., a combination of a digital signal processor (DSP) and a microprocessor, multiple microprocessors, one or more microprocessors in conjunction with a DSP core, or any other such configuration).

The exemplary client/user device 1100 may further include a modem controller chipset 1114 (e.g., an independently operable processor apparatus or a standalone modem device). The modem chipset may be in data communication with a separate WLAN modem 1116 with interfaces communicable with a network and/or a separate 3GPP-capable RF device 1118 having, e.g., 3G, 4G, 5G, 4G/5G wireless antenna(s) and/or digitally controlled RF tuner(s). WLAN interfaces may include one or more physical communication interfaces 1118 (including wireless antenna(s)) and one or more logical interfaces 1120 to the network, each capable of wireless or wired data transmissions. The 3GPP-capable modem may include one or more antennas, e.g., 4G and 5G antennas, to communicate with wireless base stations including small/femto cells, other client/user devices 1100*n*, and/or other fog network components, e.g., DU or any other edge radio access node. The aforementioned RF antenna(s) are configured to detect and transceive signals from radio access technologies ("RATs," e.g., WLAN, cellular) in the service area or venue. The antenna(s) may include multiple spatially diverse individual elements in, e.g., a MIMO- or MISO-type configuration, such that the spatial diversity of transceived signals can be utilized.

The modem controller chipset 1114 controls and manages wireless data communication, and may include a separate processing apparatus or vice versa (i.e., another processor apparatus that includes the controller). The modem controller chipset is configured to communicate with a wireless network via, without limitation, New Radio technology (including 5G NR and hybrid 4G/5G as specified by 3GPP Release 15 or beyond), Long Term Evolution/Advanced technology (including LTE, LTE-A, LTE-U, LTE-LAA, 4.5G, hybrid 4G/5G), IEEE Std. 802.11 (any variants thereof), PAN technology such as, e.g., Bluetooth (IEEE Std. 802.15.1) or IEEE Std. 802.15.4, ZigBee, Short Messaging Service (SMS), near field communication (NFC) or radio-frequency identification (RFID), WiMAX (IEEE 802.16), WMANs, 3G cellular (e.g., WCDMA, 3GPP, 3GPP2, and GSM and improvements thereon, and ISM band networks). Additional unlicensed, licensed, or quasi-licensed air interfaces may also be used via the shown network architecture, including, e.g., Wi-Fi, CBRS (Citizens Broadband Radio Service)-based LTE, and non-CBRS-band LTE.

Returning to the 4G/5G modem 1118, transmitted data may include, as discussed above, records for a distributed ledger data structure, metadata about the client device 1100 or one or more other client/user devices 1100n, decentralized ledgers, etc. as discussed above. In other embodiments, the client device may communicate with other network apparatus or components thereof, e.g., small/femto cells, base stations, external radio access node, memory apparatus storing data related to decentralized ledgers, to transmit or retrieve necessary data, or cause the network components to store such data in their respective memory devices.

Figure 12:
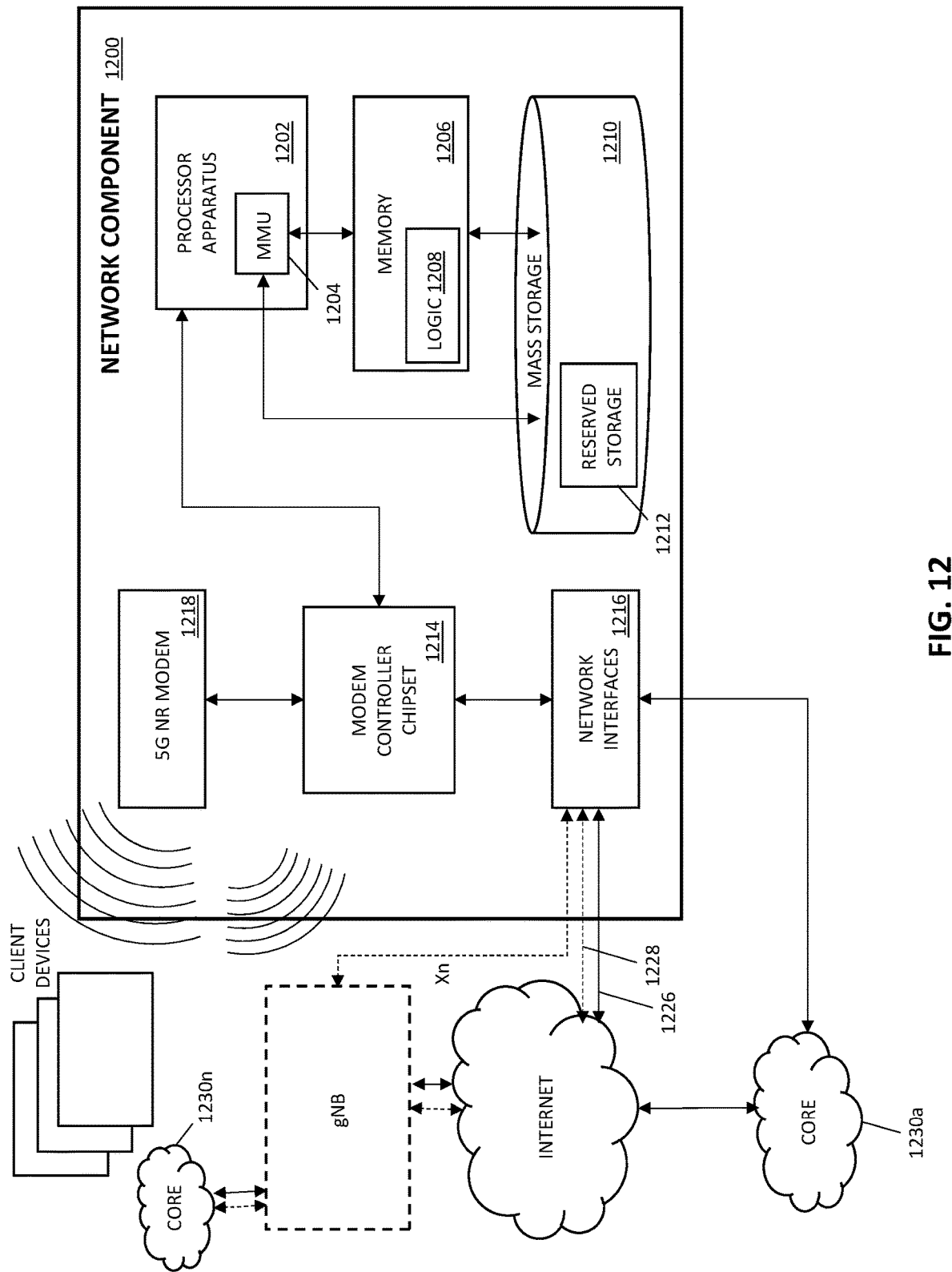
FIG. 12 is a logical block diagram of one exemplary network component, in accordance with various aspects of the present disclosure.

FIG. 12 illustrates an exemplary network component 1200 according to the present disclosure. In various embodiments, the network component may be a distribution unit (DU) entity, a central unit (CU) entity, a Node B or similar base station (gNB, eNB, NB, etc.), an external radio access node, a small or femto cell, or base station close to the "edge" of the network, each in physical proximity to client devices in the "fog."

In one exemplary embodiment, the network component 1200 includes, inter alia, at least one processor apparatus or subsystem 1202, a memory management unit (MMU) 1204, a memory apparatus 1206 (e.g., DRAM) with program(s) or logic disposed 1208 thereon, a mass storage device 1210 (e.g., HDD, SSD, NAND flash) with at least one reserved portion 1212 (e.g., to provide volatile and/or non-volatile storage space for other devices in the network, separate from system files and the like for the operation of the client device). In one embodiment, the processor 1202 may also include an internal cache memory, and in one variant, is in data communication with a dedicated MMU 1204 by which the processor accesses the logic and instructions residing on memory subsystem or device 1206.

The exemplary network component 1200 may further include a modem controller chipset 1214 (e.g., an independently operable processor apparatus or a standalone modem device). The modem chipset may be in data communication with various network interfaces 1216 communicable with a network (e.g., the Internet, backend servers), another fog network entity (e.g., a centralized unit or controller unit) and/or another gNB (and/or another DU and CU that are logically and functionally grouped). In some embodiments, each of these networks and network entities may be accessible via one another.

Network interfaces 1216 may include one or more physical communication interfaces 1226 and one or more logical interfaces 1228 to the network, each capable of wireless or wired data transmissions. The network component 1200 may further include a 5G RF device 1218 having 5G-capable antenna(s) and/or tuner(s) configured to communicate with client devices with 5G antenna(s), another gNB component (e.g., another DU or CU), wireless base stations including small/femto cells, or other fog network components, e.g., any other edge radio access node.

In some embodiments, each core 1230a, 1230n is operated by a network service provider (e.g., MNO or MSO) that provides control and user-management functionalities, and may have multiple gNBs associated therewith. The aforementioned 5G RF antenna(s) are configured to detect and transceive signals from radio access technologies (RATs), particularly with network devices (e.g., client devices) using 3GPP-based cellular connectivity (e.g., 5G or 4G/5G-based communication) in the service area or venue.

Communications may be exchanged between the fog network components to transmit and receive data related to records for a distributed ledger data structure, metadata about the client device 1200, etc. Such data may be stored at the memory device 1206 and/or mass storage 1210. In some variants, distributed data (e.g., partial or whole files) is stored on reserved storage 1212 on a relatively permanent basis (e.g., to be stored longer than a threshold amount of time, e.g., overnight) so as to separate it from operational-critical data such as system files required to operate the network component.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. Furthermore, features from two or more of the methods may be combined. All such variations are considered to be encompassed within the disclosure disclosed and claimed herein.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

The functions described herein may be implemented in hardware, software executed by a processor, firmware, or any combination thereof. If implemented in software executed by a processor, the functions may be stored on or transmitted over as one or more instructions or code on a computer-readable apparatus (e.g., storage medium). Computer-readable media include both non-transitory computer storage media and communication media including any medium that facilitates transfer of a computer program from one place to another. A non-transitory storage medium may be any available medium that can be accessed by a general purpose or special purpose computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

What is claimed is:

1. A computerized method for performing, at a first computerized client device, tasks within a decentralized network, the computerized method comprising:
    receiving data representative of a request for one or more tasks from a second computerized client device via resource control layer signaling, the resource control layer signaling being independent of a control plane;
    performing, at the first computerized client device within the decentralized network, the one or more tasks on behalf of second computerized client device within the decentralized network and in direct data communication with the first computerized client device, the performing comprising utilizing the resource control layer signaling for time or frequency resource allocations, the time or frequency resource allocations necessary for the performing of the one or more tasks;
    generating, at the first computerized client device within the decentralized network, data representative of a record for the one or more tasks within a digital ledger that is accessible by at least the first computerized client device and the second computerized client device of the decentralized network;
    causing the data representative of the record to be validated by the decentralized network; and
    based on a validation of the data representative of the record by the decentralized network, receiving one or more tokens for the one or more tasks performed at the first computerized client device.

2. The computerized method of claim 1, further comprising generating a manifest of the one or more tasks that can be performed for other computerized client devices of the decentralized network for the one or more tokens.

3. The computerized method of claim 1, wherein the causing the record to be validated by the decentralized network comprises transmitting a cryptographic value determined by the first computerized client device to an additional device within the decentralized network; and
    causing a comparison of the cryptographic value determined by the first computerized client device and a cryptographic value determined by the additional device within the decentralized network.

4. The computerized method of claim 3, wherein the cryptographic value determined by the first computerized client device comprises a result of a memory search performed by the first computerized client device.

5. The computerized method of claim 1, wherein the receiving of the data representative of the request for the one or more tasks from the second computerized client device via the resource control layer signaling comprises receiving, at the first computerized client device, a data structure that identifies (i) one or more capabilities of a 3GPP (Third Generation Partnership Project) 5G (Fifth Generation)-based device-to-device (D2D) network connection, (ii) one or more 5G-based D2D network connection establishment and release functions, and (iii) a paging notification from the second computerized client device.

6. The computerized method of claim 1, wherein:
    the resource control layer comprises a 3GPP (Third Generation Partnership Project) device-to-device (D2D) RRC (Radio Resource Control) layer; and
    the resource control layer signaling is utilized based at least on an unavailability of the control plane.

7. A first computerized client device comprising:
    a processor apparatus;
    one or more wireless network interfaces coupled with the processor apparatus and configured to perform data communication in a first decentralized network;
    a non-transitory computer-readable apparatus comprising a storage medium having at least one computer program thereon, the at least one computer program comprising a plurality of instructions configured to, when executed by the processor apparatus, cause the first computerized client device to:
        receive data representative of a request for one or more tasks from second computerized client device of the first decentralized network;
        generate data representative of a record for the one or more tasks on behalf of the second computerized client device in direct data communication with the first computerized client device;
        based on the record for the one or more tasks being validated by a community of computerized client devices of the first decentralized network, perform the one or more tasks on behalf of the second computerized client device in direct data communication with the first computerized client device;
        receive one or more tokens for the one or more tasks; and
        establish, via an resource control function connection, data communication with a second decentralized network different from the first decentralized network, wherein the first computerized client device is configured to maintain two or more function connections at a time so as to concurrently operate in both the first and second decentralized networks.

8. The first computerized client device of claim 7, wherein the plurality of instructions are further configured to, when executed by the processor apparatus, cause the first computerized client device to:
perform control plane signaling to establish a data plane communication based on a distributed ledger data structure.

9. The first computerized client device of claim 8, wherein the control plane signaling to establish a data plane communication is transmittable without prior authentication.

10. The first computerized client device of claim 7, wherein the plurality of instructions are further configured to, when executed by the processor apparatus, cause the first computerized client device to:
receive and locally store a distributed ledger data structure associated with the community of computerized client devices of the first decentralized network.

11. The first computerized client device of claim 10, wherein the plurality of instructions are further configured to, when executed by the processor apparatus, cause the first computerized client device to:
validate the distributed ledger data structure; and
register within the first decentralized network based at least in part on a validation of the distributed ledger data structure.

12. The first computerized client device of claim 7, wherein:
the community of computerized client devices of the first decentralized network is untrusted; and
the one or more tokens may be redeemed at a trusted service provider for the first computerized client device.

13. A non-transitory computer-readable apparatus comprising a storage medium having at least one computer program thereon, the at least one computer program comprising a plurality of instructions configured to, when executed by a processor apparatus disposed within a network component, cause the network component to:
receive a distributed ledger data structure, the distributed ledger data structure comprising data representative of a record;
wherein the data representative of the record comprises data indicative of one or more tasks performed on behalf of a first computerized client device by a second computerized client device;
validate the data representative of the record in view of the distributed ledger data structure; and
credit the second computerized client device with one or more tokens and debit the first computerized client device the one or more tokens in accordance with the data representative of the record based at least in part on determining that the validation;
wherein the second computerized client device is selected to perform the one or more tasks on behalf of the first computerized client device based at least on a value associated with the second computerized client device in relation to a 3GPP (Third Generation Partnership Project) 5G (Fifth Generation)-based peer-to-peer network used to perform the one or more tasks.

14. The non-transitory computer-readable apparatus of claim 13, wherein the plurality of instructions are further configured to, when executed by the processor apparatus disposed within the network component, cause the network component to:
provide the data representative of the record to an accounting entity of a service provider associated with either the first or the second client device.

15. The non-transitory computer-readable apparatus of claim 13, wherein the plurality of instructions are further configured to, when executed by the processor apparatus disposed within the network component, cause the network component to:
notify an accounting entity of a service provider associated with at least one of the first computerized client device or the second computerized client device of either the credit to the second computerized client device or the debit to the first computerized client device.

16. The non-transitory computer-readable apparatus of claim 13, wherein the plurality of instructions are further configured to, when executed by the processor apparatus disposed within the network component, cause the network component to:
allocate one or more network resources to the first computerized client device or the second computerized client device; and
wherein the one or more tasks performed on behalf of the first computerized client device by the second computerized client device consume the one or more network resources.

17. The non-transitory computer-readable apparatus of claim 16, wherein the one or more network resources comprises network bandwidth.

18. The non-transitory computer-readable apparatus of claim 17, wherein the one or more network resources are reused to service one or more other computerized client devices.

19. The non-transitory computer-readable apparatus of claim 13, wherein the plurality of instructions are further configured to, when executed by the processor apparatus disposed within the network component, cause the network component to:
determine a network resource usage;
credit the second computerized client device with the one or more tokens based on the network resource usage; and
debit the first computerized client device with the one or more tokens based on the network resource usage;
wherein the credit of the second computerized client device is provided at least to incentivize the second computerized client device to participate in a 3GPP (Third Generation Partnership Project) 5G (Fifth Generation)-based device-to-device (D2D) network.

20. The non-transitory computer-readable apparatus of claim 13, wherein the value associated with the second computerized client device in relation to the 5G-based peer-to-peer network is based on one or more of (i) a mobility state, or (ii) a change of position of the second computerized client device in relation to the 5G-based peer-to-peer network.

21. The non-transitory computer-readable apparatus of claim 20, wherein the value associated with the second computerized client device in relation to the 5G-based peer-to-peer network is further based on a quantity of nodes detected in an area of the 5G-based peer-to-peer network.

* * * * *